(12) United States Patent
Araga et al.

(10) Patent No.: US 7,380,858 B2
(45) Date of Patent: Jun. 3, 2008

(54) SUN VISOR FOR AUTOMOBILE AND SOUND ABSORBING STRUCTURE FOR AN AUTOMOBILE

(75) Inventors: Toshitaka Araga, Nagoya (JP); Mitsuo Hosokawa, Nagoya (JP); Naoya Kodama, Nagoya (JP)

(73) Assignee: Hayashi Engineering Inc., Nagoya-shi, Aichi (JP)

(*) Notice: Subject to any disclaimer, the term of this patent is extended or adjusted under 35 U.S.C. 154(b) by 0 days.

(21) Appl. No.: 11/515,616

(22) Filed: Sep. 5, 2006

(65) Prior Publication Data

US 2007/0007788 A1    Jan. 11, 2007

Related U.S. Application Data

(63) Continuation of application No. PCT/JP2005/003373, filed on Mar. 1, 2005.

(51) Int. Cl.
*B60R 13/01*    (2006.01)
(52) U.S. Cl. .................................................... 296/39.3
(58) Field of Classification Search ............... 296/39.3, 296/39.1
See application file for complete search history.

(56) References Cited

U.S. PATENT DOCUMENTS

| | | | | |
|---|---|---|---|---|
| 5,322,722 | A * | 6/1994 | Rozenberg | 428/40.1 |
| 6,145,617 | A | 11/2000 | Alts | |
| 6,986,547 | B2 * | 1/2006 | Parrish | 296/193.07 |
| 7,108,313 | B2 * | 9/2006 | Forrester et al. | 296/146.7 |

FOREIGN PATENT DOCUMENTS

| | | |
|---|---|---|
| JP | 61-27797 Y2 | 8/1986 |
| JP | 03-8016 U | 1/1991 |
| JP | 04-11854 Y2 | 3/1992 |
| JP | 04-339046 | 11/1992 |
| JP | 06-845 U | 1/1994 |
| JP | 06-008025 U | 2/1994 |
| JP | 06-40296 | 2/1994 |
| JP | 06-286530 | 10/1994 |
| JP | 08-142776 | 6/1996 |
| JP | 2002-87179 | 3/2002 |

(Continued)

OTHER PUBLICATIONS

International Search Report and Written Opinion for PCT/JP05/003373 dated May 31, 2005.

*Primary Examiner*—H Gutman
(74) *Attorney, Agent, or Firm*—Peter Ganjian

(57) ABSTRACT

A sound absorbing structure for an automobile having a seating portion, an upper surface of which serves as a passenger seating surface in the cabin, the structure includes an interior base material provided on a cabin side of a body panel; the interior base material forming a side face when seen from a passenger seated on the seating portion; the interior base material having a recessed portion formed in the cabin side of the interior base material; the recessed portion formed on an upper side of the seating surface; and a sound absorbing material buried in the recessed portion. An automobile sun visor includes a plate-form core material; an air-permeable cushioning material covering a surface of the core material; and the plate-form core material having a large number of air holes penetrating in a thickness direction formed in a dispersed manner.

14 Claims, 33 Drawing Sheets

FOREIGN PATENT DOCUMENTS

| | | |
|---|---|---|
| JP | 2002-356184 | 12/2002 |
| JP | 2004-090829 | 3/2004 |
| JP | 2005-075254 | 3/2005 |
| JP | 2005-104196 | 4/2005 |
| WO | WO-98/16409 A1 | 4/1998 |
| WO | WO-98/18657 A1 | 5/1998 |

* cited by examiner

THICKNESS DIRECTION D1

VEHICLE EXTERIOR SIDE ←→ CABIN SIDE

VEHICLE EXTERIOR SIDE ←→ CABIN SIDE

VEHICLE EXTERIOR SIDE ←→ CABIN SIDE

VEHICLE EXTERIOR SIDE ←→ CABIN SIDE

VEHICLE EXTERIOR SIDE ←→ CABIN SIDE

SUN VISOR FOR AUTOMOBILE AND SOUND ABSORBING STRUCTURE FOR AN AUTOMOBILE

CROSS-REFERENCES TO RELATED APPLICATIONS

This Application is a continuation of the prior International Application No. PCT/JP2005/003373, with an international filing date of Mar. 1, 2005, which designated the United States, the entire disclosures of which Application is expressly incorporated by reference herein.

BACKGROUND OF THE INVENTION (1) Field of the Invention

The present invention relates to a sun visor for an automobile having a sound absorbing structure, and a sound absorbing structure for an automobile in which an interior base material is provided on the cabin side of a body panel.

(2) Description of Related Art

Typically, the body of an automobile is constituted by a plurality of panels which are press-molded and welded to form the outer shape of the automobile and various interior spaces such as a passenger cabin, an engine compartment, a luggage compartment, and so on. The body is basically formed by partially welding a panel on the vehicle exterior, known as an outer panel, and a panel on the vehicle interior, known as an inner panel, such that a space remains therebetween. The formed body is submerged in a rustproofing liquid to form an undercoating, subjected to drying processing in a furnace, and then finished by applying a coating thereto a plurality of times. Various functional components are then attached to the body, and various interior materials are carpeted so as to cover the inner panel on the cabin interior side of the body. The interior material is typically formed by covering a thick base material made of a thermoplastic resin having excellent thermal moldability with a designed surface material. An interior base material is molded into a three-dimensional shape corresponding to the shape of the inner panel in a carpeting position, carpeted onto the inner panel, and engaged with the inner panel using an engagement tool such as a resin clip.

Further, a light-shielding sun visor is installed in the passenger cabin of the automobile for preventing glare on the eyes of a passenger caused by direct sunlight or the lights of an opposing vehicle. In this type of sun visor, a plate-form core material is covered with a surface material such as fabric or leather to enhance the design quality thereof. An L-shaped spindle is fixed in a position near the front window on the ceiling of the automobile cabin, and one side edge of the sun visor is inserted into the spindle so as to be supported rotatably. The passenger sets the sun visor in a horizontal state when not in use so that the sun visor is stored in a storage position parallel with the ceiling of the vehicle. To block sunlight or the like coming from the direction of the windshield, the sun visor can be rotated about a horizontal central axis in the direction of the front window, and to block sunlight or the like coming from the side window, the sun visor can be rotated further about a vertical central axis in the direction of the side window. By having the passenger rotate the sun visor manually while holding a part of the sun visor by hand in this manner, the sun visor can be positioned freely and used in the position in which it is disposed.

The sun visor described above must possess a certain degree of rigidity to ensure that it does not bend or become deformed when the passenger applies force thereto in order to perform a rotation operation. Accordingly, a sun visor main body (sun visor core) employs a plate-form core material having a constant rigidity such as a wooden board, a thermoplastic resin molded body, or a resin particle foam-molded body. Further, the core material is covered in a surface material made of various types of fabric or leather to provide the sun visor with a design quality suited to the interior material of the passenger cabin.

FIG. 7 shows a cross-section of an automobile sun visor 900 disclosed in Japanese Utility Model Publication H6-845. In this sun visor 900, a frame 904 is formed in advance by bending a metal wire made of steel wire or the like into the desired outer peripheral shape of the sun visor. A plate-form core material 902 made of comparatively rigid cardboard or the like is fitted into the frame 904 and fixed with tape, for example. The integrally-formed frame and reinforcing plate are sandwiched on both sides by a padding material 906 made of slab urethane or the like and serving as a cushioning layer. A surface layer 908 knitted into a bag form having an interior space corresponding to the core material 902 is provided on the outside of the padding material 906.

As described above, a space is provided between the outer panel and inner panel of the body of the automobile, and hence many locations are formed to be hollow. Since these locations are basically cavities, various noises such as road noise, engine noise, and wind roar generated as the automobile travels along a road propagate through the cavities and leak through the inner panel into the passenger cabin in which the passengers are seated, or reach the passenger cabin through the luggage compartment, engine compartment, and so on adjacent to the passenger cabin, thereby impeding passenger comfort. To make the passenger cabin quieter, various proposals have been made for securing sound absorbency and sound insulation in the carpeting material for carpeting the cabin interior side.

In Japanese Unexamined Patent Application Publication H6-286530, a pillar garnish made of a synthetic resin and having a hollow portion formed into a surface-shape is used, and sound insulation is achieved by means of the hollow portion, which is a completely closed space.

In Japanese Examined Patent Application Publication 2000-516175, sound insulation is achieved by fixing a noise-reducing assembly package comprising a hard layer having minute pores to a flat, surface-shaped body part.

Japanese Unexamined Patent Application Publication 2004-90829 describes a sun visor comprising a plate-form core material having a constant rigidity and a constant air permeability, and a surface material having a constant air permeability which is disposed so as to cover the surface of the plate-form core material.

With the technique of Japanese Utility Model Publication H6-845, infiltrating sound such as road noise infiltrating the cabin interior is reflected by the sun visor and enters the ears of the passenger, and hence it is assumed that infiltrating sound which infiltrates the cabin interior is not reduced.

With the technique of Japanese Unexamined Patent Application Publication H6-286530, infiltrating sound is reflected on the cabin side surface of the pillar garnish and enters the ears of the passenger, and hence it is assumed that infiltrating sound which infiltrates the cabin interior is not reduced.

In the technique of Japanese Examined Patent Application Publication 2000-516175, the noise-reducing assembly package must be fixed to the surface-shaped body part, and therefore, in order to achieve a favorable design quality, the assembly package must be fixed to the entire surface of the cabin interior. Therefore, the material cost of the assembly package is high, and the operation to install the assembly package takes time, leading to an increase in the cost of the operation. Accordingly, there is room for improvement in terms of cost reduction.

With the technique of Japanese Unexamined Patent Application Publication 2004-90829, infiltrating sound entering the ears of the passenger is reduced to a certain extent. However, it is desirable to reduce the infiltrating sound which enters the ears of the passenger even further.

Note that the technique described in Japanese Unexamined Patent Application Publication 2002-356184 refers to a working vehicle rather than an automobile, and therefore cannot be applied to the present invention. As shown in FIG. 4 of Japanese Unexamined Patent Application Publication 2002-356184, in this document a sound absorbing sheet is formed by laying a sound absorbing material on the underside of a step mat having a large number of holes punched therein, and a silencing effect is obtained by carpeting or affixing the sound absorbing sheet onto parts of the cabin interior excluding the window portions. However, since the sound absorbing sheet is provided on all surfaces of the cabin interior excluding the window portions, the material cost of the sound absorbing sheet is high, and the operation to install the sound absorbing sheet takes time, leading to an increase in the cost of the operation. Accordingly, there is room for improvement in terms of cost reduction.

Furthermore, in Japanese Unexamined Patent Application Publication 2002-356184, a resonance chamber requiring a space portion which is independent from the cabin interior is provided in the ceiling wall portion of the cabin interior of the working vehicle, and a silencing effect is obtained by providing a pipe from the resonance chamber to the cabin interior such that the resonance frequency component of the engine noise which diffuses through the cabin interior is reduced through attenuation by frictional resistance with the periphery thereof As shown in FIGS. 9 to 12 of the document, however, the resonance chamber is attached to the ceiling wall portion as a downwardly-protruding separate member, and hence there is particular room for improvement in terms of design and safety with respect to an automobile for traveling at high speed.

BRIEF SUMMARY OF THE INVENTION

As a result of analysis performed by the inventor of the present application of the acoustic field environment in the cabin of an automobile, and particularly the noise that is transmitted to the ear position of a passenger sitting in the cabin in each location of a body panel, it was found that the body panel includes locations which propagate external noise easily and locations in which external noise is unlikely to be propagated. It was also found that when the techniques described above were applied to a body panel which propagates external noise easily, transmitted noise was greater than the noise that was blocked, and infiltrating sounds such as road noise entering the ears of the passenger could not be reduced effectively.

An advantage of some aspects of the invention is to provide an automobile sun visor which effectively reduces infiltrating sound entering the ears of a passenger while maintaining favorable rigidity and a high level of safety, thus enabling an improvement in quietness while traveling.

Another advantage of some aspects of the present invention is to provide an automobile which effectively reduces infiltrating sound entering the ears of a passenger at a low cost while maintaining favorable rigidity and a high level of safety, thus enabling an improvement in quietness while traveling.

One aspect of the present invention provides an automobile sun visor disposed in a cabin for protecting a passenger from glare, comprising a plate-form core material, an air-permeable cushioning material covering a surface of the core material, and a large number of air holes penetrating in a thickness direction formed in a dispersed manner in the plate-form core material.

When the cushioning material is not air-permeable, sound traveling toward the sun visor is reflected by the cushioning material and enters the ears of the passenger. When the air permeability of the core material is insufficient, sound entering the sun visor is reflected by the core material and enters the ears of the passenger. The cushioning material used in the present invention is air-permeable, and hence infiltrating sound infiltrating the cabin interior is either not reflected by the cushioning material or at least unlikely to be reflected. Further, the core material used in the present invention is formed with the air holes, and hence infiltrating sound infiltrating the cabin interior is unlikely to be reflected by the core material. Therefore, infiltrating sound entering the sun visor is taken into the interior of the sun visor easily, and the energy of the infiltrating sound that is taken in is converted into frictional heat by the cushioning member such that the sound gradually attenuates. As a result, noise entering the ears of the passenger can be reduced.

Furthermore, the large number of air holes are formed in the core material in a dispersed manner, and hence a favorable degree of rigidity is maintained. Moreover, the surface of the favorably rigid core material is covered by the cushioning material, and hence safety is also favorable.

According to the automobile sun visor of the present invention described above, infiltrating sound entering the ears of the passenger can be reduced effectively while maintaining a favorable degree of rigidity and a high level of safety, thus enabling an improvement in quietness while traveling.

The plate-form core material may be formed from at least one of a pulp base material and a synthetic resin, and an opening ratio thereof may be set between 2 and 30%. Here, the opening ratio is the ratio of the total area of the projected area of the through holes to the projected area of the core material when projected in the thickness direction. As a result, the favorable rigidity of the sun visor can be maintained more securely, and a favorable sound absorption effect can be obtained.

A metallic frame body attached to an outer periphery of the core material so as to surround the outer periphery in a perpendicular direction to the thickness direction may also be provided. In so doing, the favorable rigidity of the sun visor can be maintained easily.

An air-permeable surface material covering the surface of the cushioning material may also be provided. When the surface material is not air-permeable, sound traveling toward the sun visor is reflected by the surface material and enters the ears of the passenger. The surface material used in the present invention is air-permeable, and therefore infiltrating sound infiltrating the cabin interior is either not reflected by the surface material or at least unlikely to be reflected. As a result, the appearance of the sun visor can be improved while maintaining a favorable sound absorption performance.

An optional aspect of the present invention provides the automobile sun visor, wherein the cushioning material has an air permeability, defined by JIS L1096, of no less than 6.0 cc/cm2/sec.

Another optional aspect of the present invention provides the automobile sun visor, wherein the surface material has an air permeability, defined by JIS L1096, of no less than 2.0 cc/cm2/sec.

Another optional aspect of the present invention provides the automobile sun visor, wherein the plate-form core material is a perforated sound absorbing material constituted by a material which is capable of absorbing sound, in which a large number of air holes penetrating in the thickness direction are formed in a dispersed manner.

Another optional aspect of the present invention provides the automobile sun visor, wherein the perforated sound absorbing material is a sound absorbing material manufactured by forming a large number of the air holes at a diameter of 0.5 to 10 mm in the thickness direction of a material which is capable of absorbing sound; and wherein the material which is capable of absorbing sound, has a sound absorption characteristic which does not peak at a frequency between 400 and 4000 Hz, and is not formed with the air holes.

Another optional aspect of the present invention provides the automobile sun visor, wherein the perforated sound absorbing material is formed from at least one of a material produced by foaming a synthetic resin and a material produced by gathering synthetic fibers.

Another optional aspect of the present invention provides the automobile sun visor, wherein the perforated sound absorbing material is a sound absorbing material having a density of 0.25 to 0.40 g/cm3 and formed with a large number of the air holes in the thickness direction at a diameter of 0.5 to 10 mm.

The plate-form core material may comprise a lattice portion having a lattice shape in which a large number of air holes penetrating in the thickness direction are formed in a dispersed manner, and a frame portion formed integrally with an outer periphery of the lattice portion so as to surround the outer periphery in a perpendicular direction to the thickness direction.

Cavities are formed in-plane in the core material, and hence infiltrating sound infiltrating the cabin interior is unlikely to be reflected by the core material. Therefore, infiltrating sound entering the sun visor is taken into the interior of the sun visor easily, and the energy of the infiltrating sound that is taken in is converted into frictional heat by the cushioning material such that the sound gradually attenuates. As a result, noise entering the ears of the passenger can be reduced.

Further, the part of the core material surrounded by the frame portion is formed in a lattice shape, and hence a favorable degree of rigidity is maintained. Moreover, the surface of the favorably rigid core material is covered by the cushioning material, and therefore safety is also favorable.

Another optional aspect of the present invention provides the automobile sun visor, wherein the cushioning material has a thickness of no less than 3 mm, a compressibility, defined by JIS L1096, of 5 to 25%, and a compressive elasticity modulus, defined by JIS L1096, of no less than 70%.

Another optional aspect of the present invention provides the automobile sun visor, further comprising: an air-permeable surface material covering a surface of the cushioning material; the cushioning material formed from a nonwoven fabric using a needle punching method in which needling is performed at a comparatively low density; the surface material is formed from a nonwoven fabric using a needle punching method in which needling is performed at a comparatively high density; and the cushioning material and surface material are laminated together and integrated.

Another aspect of the present invention provides a sound absorbing structure for an automobile in which an interior base material is provided on a cabin side of a body panel and a seat having a seating portion, an upper surface of which serves as a passenger seating surface, is provided in the cabin, the structure comprising a recessed portion formed in the cabin side of the interior base material, which forms a side face when seen from a passenger seated on the seating portion, on an upper side of the seating surface, and a sound absorbing material buried in the recessed portion.

The sound absorbing material buried in the recessed portion formed in the interior base material, which forms a side face when seen from a passenger seated on the seating portion, on the upper side of the seating surface attenuates sound, and therefore infiltrating sound such as road noise which infiltrates the cabin interior is effectively absorbed and reduced to the side of the passenger in a position near the ears of the passenger. As a result, the need to dispose the sound absorbing material on the entire surface of the cabin interior is eliminated, and hence the material cost of the sound absorbing material can be reduced. Moreover, an operation to dispose the sound absorbing material on the entire surface of the cabin interior is not required, and hence the cost of this operation can also be eliminated. Also, the sound absorbing material is inserted into the recessed portion in the interior base material, and hence a favorable design quality and a high level of safety are obtained. Therefore, infiltrating sound such as road noise and wind roar entering the ears of a passenger in an automobile can be reduced effectively at a low cost while maintaining a favorable design quality and a high level of safety, enabling an improvement in quietness while traveling.

The interior base material, which forms a side face when seen from a passenger seated on the seating portion, may be a member provided on at least one of a door trim interior material and a pillar garnish interior material, and the recessed portion may be formed in the cabin side of the interior base material on the upper side of the seating surface. As a result of acoustic field analysis performed on the automobile, it was found that cavities exist in these interior materials, and noise from the vehicle exterior propagates through these cavities, infiltrates the cabin interior, and is transmitted to the ears of the passenger. By providing the recessed portion and sound absorbing material described above in these interior materials, the sound absorption effect can be improved, enabling a further improvement in quietness while traveling.

The sound absorbing material may be a perforated sound absorbing material manufactured by forming a plurality of through holes linking the cabin side and the vehicle exterior side at a diameter of 0.5 to 10 mm (preferably 1.0 to 5.0 mm) in a material which is capable of absorbing sound, has a sound absorption characteristic which does not peak at a frequency between 400 and 4000 Hz, and is not formed with through holes linking the cabin side and the vehicle exterior side. By forming through holes of this diameter in a material having a sound absorption characteristic which does not peak between 400 and 4000 Hz, a peak occurs in the sound absorption characteristic peaks between 400 and 4000 Hz, and hence a favorable sound absorption quality is obtained in a wide frequency range. As a result, a favorable sound absorption quality can be obtained in a wider frequency range than that of a case where sound is absorbed by a sound absorbing material in which through holes linking the cabin side and the vehicle exterior side are not formed.

Further, the sound absorbing material may be formed from at least one of a material produced by foaming a synthetic resin and a material produced by gathering synthetic fibers, neither of which is formed with a through hole linking the cabin side and a vehicle exterior side on the opposite side of the cabin side, and may have a density of 0.02 to 0.25 g/cm$^3$. When a non-perforated sound absorbing material not formed with a through hole linking the cabin side and the vehicle exterior side is used, a favorable sound absorption effect can be obtained by the non-perforated material, which has a favorable degree of hardness.

Another aspect of the present invention provides an automobile sun visor disposed in a cabin for protecting a passenger from glare, comprising a core material formed to be flat and having an interior space, and a large number of air holes connecting the interior space to the outside formed in a dispersed manner in the flatly-formed core material.

When the air permeability of the core material is insufficient, sound entering the sun visor is reflected by the core material and enters the ears of the passenger. The core material used in the present invention is formed with the air holes, and therefore infiltrating sound infiltrating the cabin interior is unlikely to be reflected by the core material. Hence, infiltrating sound entering the sun visor is taken into the interior of the sun visor easily, and the interior space formed in the core material causes the sound that enters through the air holes to resonate such that the sound attenuates in accordance with Helmholtz resonator theory. As a result, noise entering the ears of the passenger can be reduced.

Furthermore, the large number of air holes are formed in the core material in a dispersed manner, and hence a favorable degree of rigidity is maintained. Moreover, the surface of the favorably rigid core material is covered by the surface material, and hence safety is also favorable.

According to the automobile sun visor of the present invention described above, infiltrating sound entering the ears of the passenger can be reduced effectively while maintaining a favorable degree of rigidity and a high level of safety, thus enabling an improvement in quietness while traveling.

The core material may be molded into a shape including the interior space by subjecting a material possessing plasticity to blow molding such that sound entering through the air holes is caused to resonate within the interior space. In so doing, a sun visor exhibiting a favorable sound absorption effect can be formed easily, and the sound absorption performance of the sun visor can be further improved.

An optional aspect of the present invention provides the automobile sun visor, wherein a diameter of the air holes is 0.5 to 5.0 mm; and wherein a ratio of a total area of a projected area of the air holes to a projected area of the core material when projected in a thickness direction of the flatly-formed core material is set between 2 and 30%.

Another optional aspect of the present invention provides the automobile sun visor, wherein the air holes are formed at the same time as the blow molding or immediately after the blow molding.

Another optional aspect of the present invention provides the automobile sun visor, further comprising: a surface material covering a surface of the core material; and the surface material having an air permeability, defined by JIS L1096, of no less than 2.0 cc/cm2/sec and no more than 140 cc/cm2/sec.

Another aspect of the present invention provides a sound absorbing structure for an automobile in which an interior base material is provided on a cabin side of a body panel, the structure comprising a recessed portion formed in the cabin side of the interior base material, and a resonance member formed with a through hole, inserted into the recessed portion from the cabin side, and disposed so as to form a hollow portion in the recessed portion, in which sound entering through the through hole is caused to resonate.

The resonance member formed with the through hole is inserted into the recessed portion in the interior base material from the cabin side so as to form the hollow portion in the recessed portion, and sound entering through the through hole is caused to resonate in the hollow portion such that the sound attenuates in accordance with Helmholtz resonator theory. As a result, infiltrating sound such as road noise which infiltrates the cabin interior is reduced. Moreover, the resonance member is inserted into the recessed portion in the interior base material, and hence a favorable design quality is obtained and safety is also favorable. Therefore, infiltrating sound such as road noise and wind roar entering the ears of a passenger in the automobile can be reduced effectively while maintaining a favorable design quality and a high degree of safety, enabling an improvement in quietness while traveling.

When a sound absorbing material is disposed on the cabin side of the resonance member, a favorable sound absorption quality is obtained over a wide frequency range. The frequency characteristic of the sound absorbed by the hollow portion and the frequency characteristic of the sound absorbed by the sound absorbing material differ from each other due to different sound absorption principles. Therefore, a favorable sound absorption quality can be obtained over a wider frequency range than that of a case where sound is absorbed by the hollow portion alone.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purpose of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

DETAILED DESCRIPTION OF INVENTION

Figure 1:
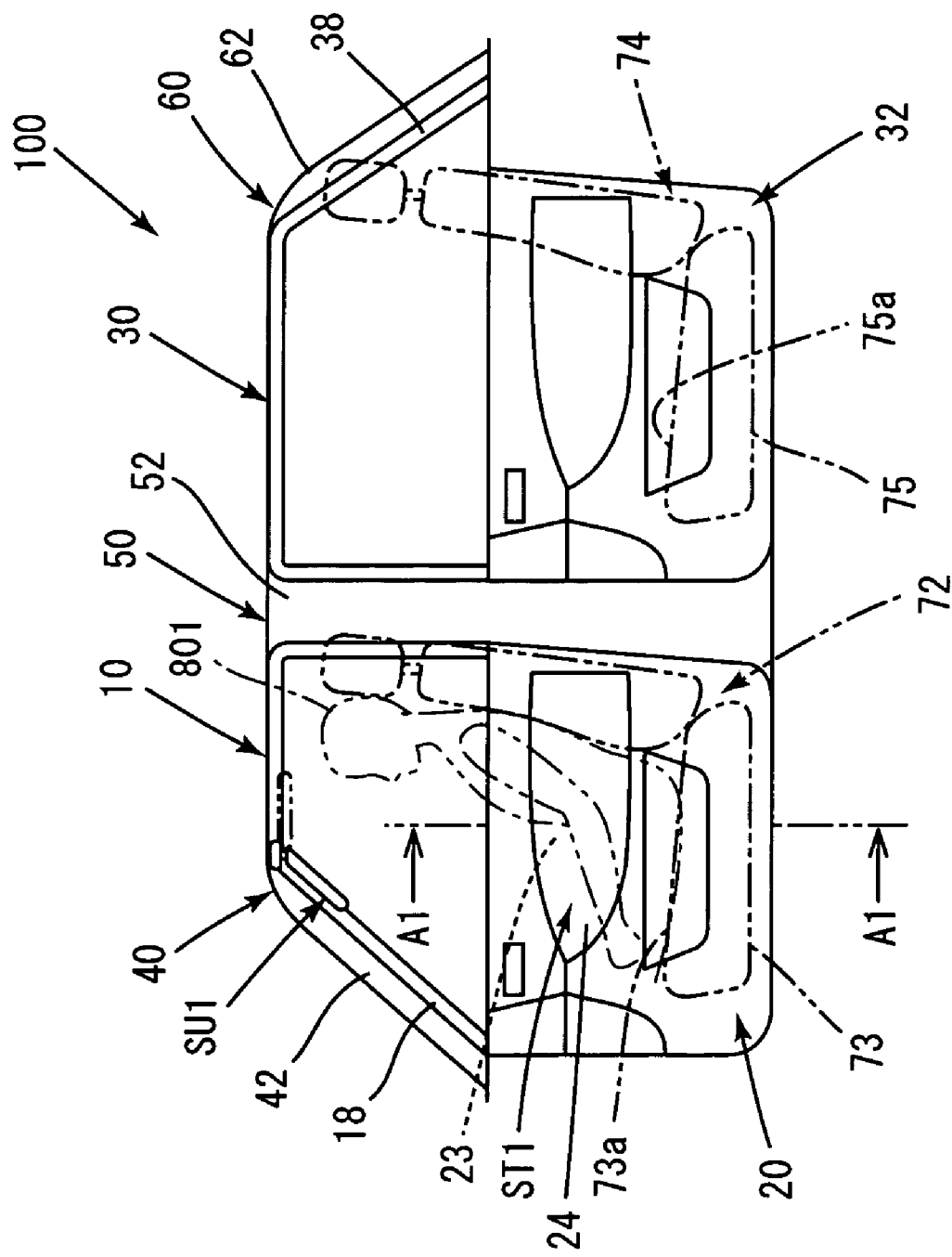
FIG. 1 is an exemplary illustration of a side view showing the main parts of the interior of an automobile 100 employing a sound absorbing structure ST1 and a sun visor SU1 according to a first embodiment.

The detailed description set forth below in connection with the appended drawings is intended as description of presently preferred embodiments of the invention and is not intended to represent the only forms in which the present invention may be constructed and or utilized.

(1) FIRST EMBODIMENT (1-1) Constitution of Sound Absorbing Structure for Automobile In a driving seat door 10 of the road-running automobile, an interior base material 22 is provided on a cabin side of body panels 12, 14, and a recessed portion 23 is formed on the cabin side of the interior base material 22. A sound absorbing structure ST1 of the automobile is constituted by forming the recessed portion 23 on the cabin side of the interior base material 22, which forms a side face when seen by a passenger 801 sitting on a seating portion 73, on the upper side of the seating surface 73, and burying a sound absorbing material 26 capable of absorbing sound in the recessed portion.

An automobile sun visor SU1 for protecting a passenger from glare is provided rotatably in the cabin interior. A spindle member 620 of the sun visor SU1 is attached and fixed to the ceiling of the cabin above the front window on the side window side. The spindle member 620 comprises an L-shaped metallic spindle 620a and a base portion 620b which supports the spindle rotatably. A sun visor main body 600 is supported rotatably on the spindle at an upper end portion 600a which forms an upper end during glare protection, and takes a flat plate form having a length in the up-down direction which is shorter than the length in the left-right direction during glare protection. The L-shaped spindle 620a is rotatable relative to the base portion 620b fixed to the ceiling about the part of the spindle 620a that is set in the vertical direction, and therefore the sun visor main body 600 is rotatable about the part of the spindle 620*a* that is set in the horizontal direction and also rotatable about the vertical direction.

The road-running automobile 100 is provided with a front door 10, a rear door 30, a front pillar (front side pillar) 40, a center pillar (intermediate pillar) 50, and a rear pillar (rear side pillar) 60 in positions on the side face of the cabin interior when seen from the perspective of a seated passenger 801. The front pillar 40 is provided upstanding on the front side of a window panel 18, the center pillar 50 is provided upstanding in a position sandwiched between window panels 18, 38, and the rear pillar 60 is provided upstanding on the rear side of the window panel 38. The cabin interior is also provided with a front seat 72 and a rear seat 74 having seating portions 73, 75, the upper surfaces of which serve as passenger seating surfaces 73*a*, 75*a*.

Pillar garnish interior material 42, 52, 62 is an interior material carpeted onto the cabin side of the pillars 40, 50, 60 to enhance the design quality. In recent years, this interior material is also expected to function as a shock-absorbing material for absorbing shock generated upon contact with the head portion of the passenger, and in this case, lattice-form ribs or the like are formed on the rear surface of the pillar garnish interior material so that shock is absorbed by the buckling of the ribs. The pillar garnish interior material is formed in a thin film form by injection molding or press molding a thermoplastic resin, and since the material is close to the head portion of the passenger, audio speakers may be provided therein. Note that the surface of the interior base material may or may not be covered by a surface material.

Door trim interior material 20, 32 is carpeted onto the inside of the doors 10, 30 and engaged with the inner door panel 14 by a resin clip or the like. The driving seat door trim interior material 20 comprises an interior base material 22 having a self-shape retaining quality, and a designed surface material 24 which is adhered to the cabin-side surface of the interior base material 22. The door trim interior material other than the driving seat door trim interior material similarly comprises an interior base material and a surface material. A wood base material formed by blending wood fibers with a binder, a resin base material formed by molding a thermoplastic resin plate into a predetermined shape, and so on may be used as the interior base material. A passenger arm rest portion, and pocket shape for inserting small items, and so on are formed on the cabin interior side of the interior base material. Further, the central portion of the door trim interior material and the upper side of the arm rest portion are known as ornamental portions in which a separately-designed padding material may be affixed to the surface material. The sound absorbing structure ST1 of the present invention may be applied to this ornamental portion, for example. The recessed portion 23 is formed in the ornamental portion of the interior base material 22 at a depth which anticipates a thickness L1 of the sound absorbing material 26 from a main surface 22*a*.

Figure 2:
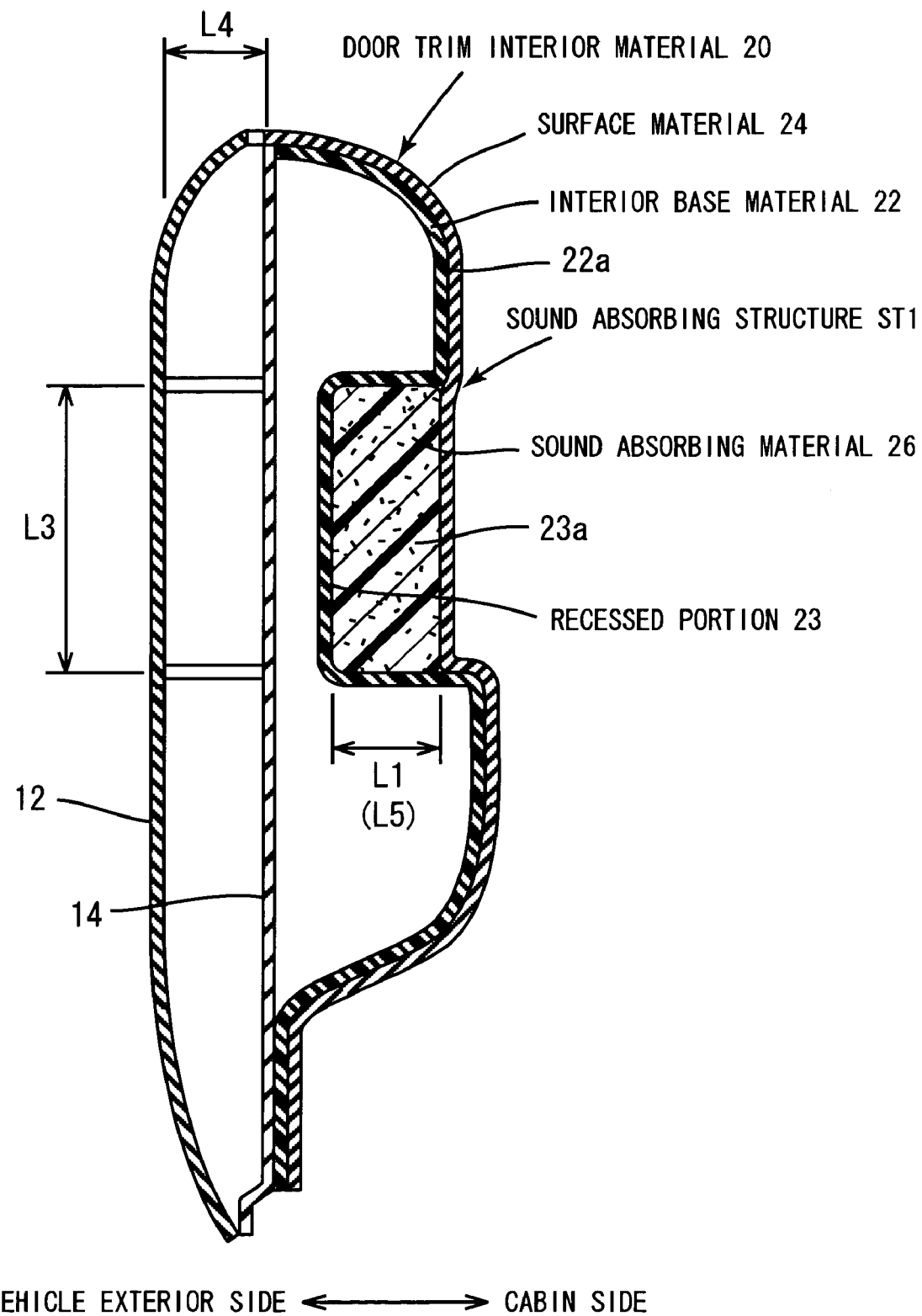
FIG. 2 is an exemplary illustration of a vertical sectional view showing the main parts of a driving seat door 10 from the position of A1-A1 in FIG. 1.

FIG. 2 shows the sound absorbing structure ST1, in which the recessed portion 23 is formed by moving a part of the main surface 22*a* of the interior base material back from the main surface 22*a*, the sound absorbing material 26 is inserted into the recessed portion 23 from the cabin side and buried therein, and the main surface 22*a* of the interior base material and the sound absorbing material 26 are covered continuously by the surface material 24, which possesses high air permeability (low air resistance).

The body panel of this embodiment is constituted by a metallic outer door panel 12, and a metallic inner door panel 14 disposed on the cabin side of the outer door panel. A gap L4 between the two body panels 12, 14 is set at approximately 5 to 100 mm.

As the material of the interior base material 22, a thermoplastic resin (a type of synthetic resin) such as polypropylene (PP) or acrylonitrile butadiene styrene resin (ABS resin), various types of thermosetting resin (a type of synthetic resin), a member formed by binding together wood fibers using a binder such as a synthetic resin, and so on may be used. A predetermined shape having the recessed portion 23 is formed by subjecting the material of the interior base material to press molding, injection molding, or similar, and thus the interior base material is formed.

The thickness of the interior base material 27 may be set between 1 and 10 mm.

In this embodiment, the sound absorbing material 26 is adhered and fixed to the recessed portion 23 by an adhesive. However, a constitution in which the sound absorbing material 26 is adhered and fixed using double-sided tape, or a constitution in which the recessed portion is formed in a shape which is capable of engaging with the outer peripheral portion of the sound absorbing material and the sound absorbing material is engaged and fixed to the recessed portion, may also be employed.

As regards the size of the recessed portion 23 of the interior base material when projected from the cabin side to the vehicle exterior side on the opposite side of the cabin side (i.e. the size of the recessed portion when viewing the vehicle exterior from the cabin interior), a length L2 in the front-rear direction of the automobile may be set at approximately 1300 mm, and a length L3 in the height direction of the automobile may be set at approximately 400 mm. Alternatively, the size of the recessed portion 23 may be determined in accordance with the size of the interior base material within a size range that is smaller than the interior base material. Note that a plurality of small recessed portions may be formed instead of a single large recessed portion.

A depth L5 of the recessed portion 23 of the interior base material may be set at approximately 3.5 to 110 mm, and preferably approximately 3.5 to 70 mm. As the recessed portion becomes shallower, high-frequency sound is more likely to be absorbed, and as the recessed portion becomes deeper, low-frequency sound is more likely to be absorbed.

The gap between the interior base material 22 and the inner door panel 14 may be set at approximately 0 to 60 mm at the main portion, and approximately 0 to 30 mm at the recessed portion.

Woven fabric, nonwoven fabric, knitted fabric, various types of leather having a large number of minute air holes, and so on may be used as the material of the surface material. The surface material 24 is highly air-permeable, having an air permeability (according to the Frazier method defined in JIS L1096; likewise hereafter) of at least 2.0 cc/cm$^2$/sec (preferably at least 6.0 cc/cm$^2$/sec). The surface material 24 is disposed on the cabin side of the interior base material 22 so as to seal an opening portion 23*a* of the recessed portion 23. Infiltrating sound infiltrating the cabin interior, such as road noise and wind roar, enters the sound absorbing material 26 through the highly air-permeable surface material 24, where the energy thereof attenuates such that the sound is absorbed.

When the air permeability of the surface material is set to at least 2.0 cc/cm$^2$/sec (preferably at least 6.0 cc/cm$^2$/sec), the sound absorbency of the sound absorbing material 26 does not decrease, and hence the design quality of the cabin can be enhanced while maintaining a favorable sound absorption quality. Note that the term "maintaining the sound absorption quality" infers that almost no sound waves traveling from the cabin interior to the sound absorbing material are reflected, and hence the energy of the sound is sufficiently absorbed by the sound absorbing material.

The sound absorbing material 26 may be any material having a sound absorption effect, and a porous sound absorbing material may be used. When a porous sound absorbing material is used, a favorable sound absorption effect is obtained. A material formed by gathering synthetic fibers such as synthetic felt, a material formed by foaming a synthetic resin such as a thermoplastic resin or thermosetting resin, a combination thereof, or another material may be used as the material of the sound absorbing material. PET fibers, PP fibers, wool fibers, a combination thereof, or other fibers may be used as the synthetic felt. An air-permeable foamed resin body, a molded bead body, a combination thereof, or another material may be used as the foamed synthetic resin material. A foamed synthetic resin formed by gathering and foaming a large number of tubular synthetic resin particles may also be used. The individual tubular resin particles impregnated with a foaming material may be formed in a cylindrical shape having an inner diameter d of approximately 2 to 4 mm, an outer diameter D (D>d) of approximately 4 to 6 mm, and a length L of approximately 3 to 6 mm. These parameters affect the sound absorption performance of the sound absorbing material, and by setting the inner diameter d, outer diameter D, and length L within these ranges, the sound absorbing material exhibits an extremely favorable sound absorption performance. PEPP (porous EPP), manufactured by JSP Corporation, may be used as the tubular resin particles. Needless to say, the tubular resin particles may take a form other than a cylindrical form, such as a form having a cross-section which is flattened into a substantially elliptical shape.

The thickness L1 of the sound absorbing material 26 in a direction linking the cabin side and the vehicle exterior side is preferably no greater than the thickness L5 of the recessed portion 23 and no less than 3 mm. Accordingly, the thickness L1 of the sound absorbing material may be set at approximately 3 to 110 mm, and preferably approximately 3 to 70 mm. By making L1 at least 3 mm, a sufficient sound absorption performance is obtained.

The size of the sound absorbing material 26 (length in the front-rear direction×length in the height direction) may be determined in accordance with the size of the recessed portion 23 in the interior base material (length L2 in the front-rear direction×length L3 in the height direction).

The sound absorbing material 26 of this embodiment is formed from at least one of a foamed synthetic resin material and a gathered synthetic fiber material having no through holes linking the cabin side and the vehicle exterior side, and has a density of 0.02 to 0.25 g/cm$^3$. By setting the density to at least 0.02 g/cm$^3$, a favorable hardness is obtained, and by setting the density to no more than 0.25 g/cm$^3$, a favorable sound absorption effect is obtained.

Further, the sound absorbing material 26 of this embodiment, formed in the material described above, has a Shore hardness according to a spring type hardness testing machine type C (the Shore C hardness hereafter) between 10 and 70. By setting the Shore C hardness to 10 or more, a favorable hardness which does not dent when pressed is obtained, and by setting the Shore C hardness to 70 or less, the sound absorbing material 26 can be made sufficiently lightweight and a favorable sound absorption effect is obtained. Note that when the sound absorbing material has an appropriate degree of softness, it is assumed that a cushioning effect will be exhibited whereby sound waves are less likely to be reflected and the sound absorbency is enhanced.

Various well-known methods may be employed to form the sound absorbing material 26. For example, the sound absorbing material 26 may be formed by supplying a heater-equipped injection molding machine with a particulate thermoplastic resin raw fabric and a foaming agent, heating and melting the raw fabric using the heater while mixing the two components, injecting the molten, foamed thermoplastic resin into a predetermined die in the shape of the sound absorbing material 26, and cooling the die to harden the resin. When the sound absorbing material 26 is formed using a thermosetting resin, it may be formed by injecting a liquid thermosetting resin and a foaming agent into the predetermined die and then heating the die so that the resin is foamed and hardened, or by adding a foaming agent and a curing agent to a liquid thermosetting resin, injecting the mixture into the die, and leaving the resin to foam and harden for a predetermined time period. Needless to say, the sound absorbing material 26 may also be formed through press molding or the like.

To adjust the density and Shore C hardness of the sound absorbing material 26, the proportions of the resin and foaming agent may be adjusted to adjust the expansion ratio. When the proportion of the foaming agent is increased, the expansion ratio increases and the density decreases, leading to a reduced Shore C hardness. The density and Shore C hardness of the sound absorbing material may also be adjusted by adjusting the foaming temperature.

Incidentally, in a road-running automobile which travels on roads at high speed, a comparatively large amount of road noise, wind roar, and so on are generated in comparison with an automobile which travels on surfaces other than roads at comparatively low speeds. As a result of an experiment, it was found that road noise generated on a road surface infiltrates the cabin interior and reaches the ears of the passenger principally along the paths indicated by the solid line and broken line arrows in FIG. 3. Here, the solid line arrow in the drawing indicates a path on which road noise infiltrates the cabin interior through a gap between doors 10, 10' and a floor panel 79, advances upward in the vicinity of the cabin side surface of the doors 10, 10', and thus enters the ears of the passenger. The broken line arrow in the drawing indicates a path on which road noise advances upward through a gap between outer panels 12, 12' and inner panels 14, 14', infiltrates the cabin interior through an upper side edge portion of the body panels 12, 12', 14, 14', and thus enters the ears of the passenger. Tires are provided below the door panels 12, 12', 14, 14', and hence road noise is assumed to infiltrate the cabin interior along these paths. Furthermore, drip holes are provided in the lower side edge portions of the door panels 12, 12', 14, 14', and hence road noise is assumed to infiltrate through the drip holes and propagate upward through the gap between the outer panels 12, 12' and inner panels 14, 14'.

Based on the results of the experiment described above, sound absorbing structures ST1, ST1' are provided in door trim interior materials 20, 20' in the cabin interior by forming the recessed portion on the upper side of passenger seating surfaces 73a, 73a' of seats 72, 72' having seating portions 73, 73', the upper surfaces of which serve as the seating surfaces 73a, 73a', and burying the sound absorbing material in the recessed portion 23, 23'. In so doing, sound is absorbed in the door trim interior material on the upper side of the seating surface, and hence infiltrating sound entering the ears of the passenger can be reduced more effectively, enabling a further improvement in quietness while traveling.

Figure 10:
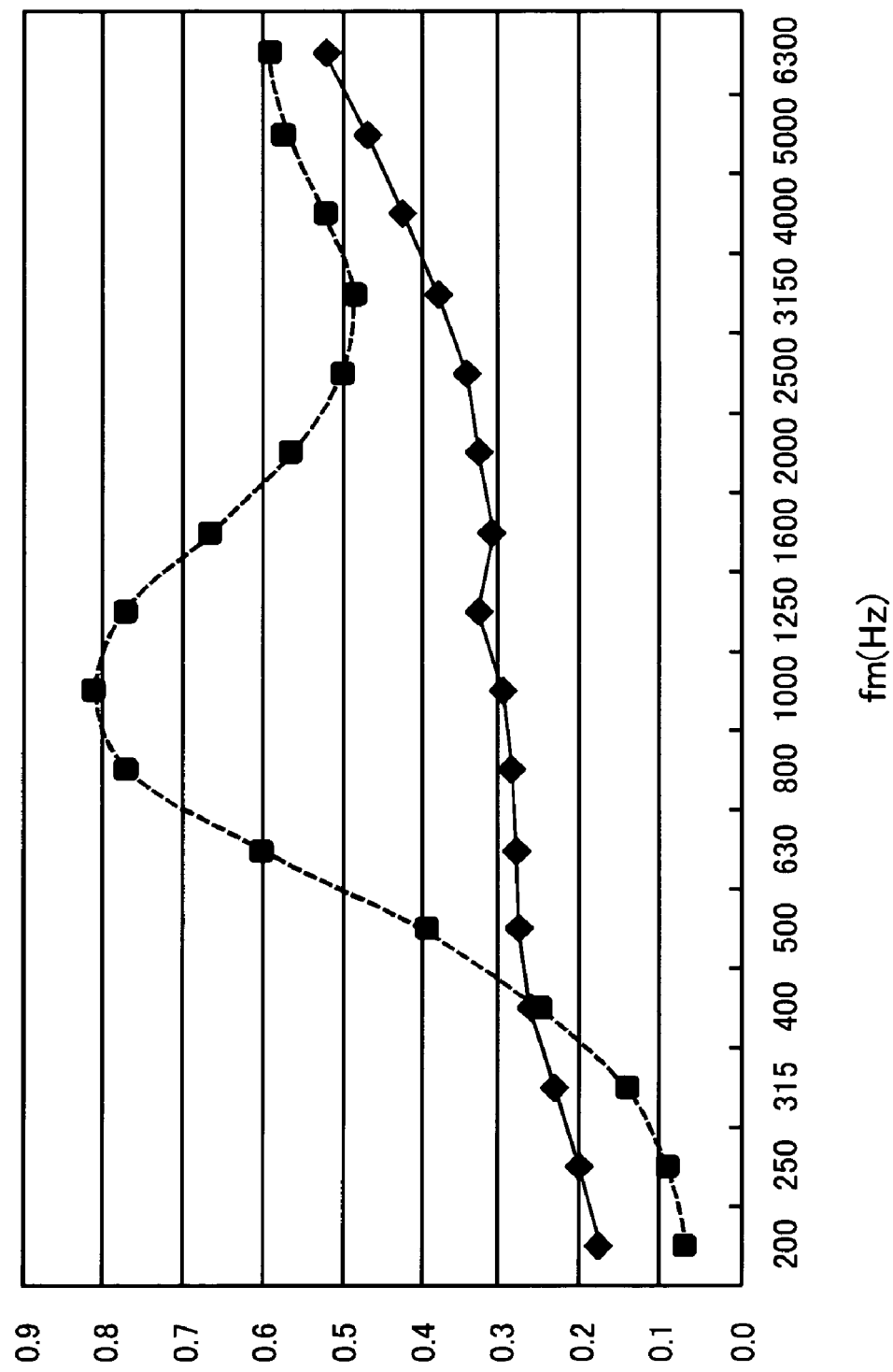
FIG. 10 is an exemplary illustration of a view showing a graph comparing normal incidence sound absorption coefficients.

When the density is lower than 0.25 g/cm³, the sound absorption characteristic of the sound absorbing material 26 has a peak occurring between 400 to 4000 Hz. To describe this using FIG. 10, which compares normal incidence sound absorption coefficients (the ratio of the sound intensity following sound absorption to the sound intensity before incidence) in ⅓ octave frequency bandwidths, when the frequency is varied in every ⅓ octave band, it is assumed that the normal incidence sound absorption coefficient at a peak frequency $F_p$ is greater than the normal incidence sound absorption coefficient at first-stage lower and first-stage higher frequencies $f_{p-1}$, $f_{p+1}$, the normal incidence sound absorption coefficient at the first-stage lower frequency $f_{p-1}$, is greater than the normal incidence sound absorption coefficient at a second-stage lower frequency $f_{p-2}$, and the normal incidence sound absorption coefficient at the first-stage higher frequency $f_{p+1}$, is greater than the normal incidence sound absorption coefficient at a second-stage higher frequency $f_{p+2}$. Note that FIG. 10 is a graph comparing the normal incidence sound absorption coefficients of a non-perforated sound absorbing material which does not peak at 400 to 4000 Hz and a perforated sound absorbing material (second embodiment) manufactured by forming through holes linking the cabin side and vehicle exterior side in the non-perforated sound absorbing material, in ⅓ octave frequency bandwidths (unit: Hz). In this graph, the normal incidence sound absorption coefficient is plotted at the center frequency (fm hereafter) of each ⅓ octave band. The normal incidence sound absorption coefficient was measured using a typical normal incidence sound absorption coefficient measuring method. When the density is greater than 0.25 g/cm³, the sound absorption characteristic of the sound absorbing material 26 is such that a peak does not occur between 400 and 4000 Hz.

When an experiment was conducted using a chip urethane molded body as the sound absorbing material 26, a sound absorption characteristic having a peak occurring between 400 and 4000 Hz was obtained when the density was no more than 0.25 g/cm³, whereas a sound absorption characteristic not having a peak occurring between 400 and 4000 Hz was obtained when the density was greater than 0.25 g/cm³. Here, chip urethane denotes a recycled material obtained by cutting up scraps of urethane foam (foamed urethane) into small pieces and hardening them with a binder.

A favorable sound absorption quality is obtained with a non-perforated sound absorbing material having a density of no more than 0.25 g/cm³.

Note that when a molded body formed by gathering a large number of tubular resin particles as described above is used as the sound absorbing material, the density is typically no more than 0.25 g/cm³ and the sound absorption characteristic of the sound absorbing material 26 has a peak occurring between 400 and 4000 Hz. With a sound absorbing material using tubular resin particles, the sound absorbing material is provided with air permeability by the holes formed in the tubular resin particles, and the cabin side and vehicle exterior side are connected via the holes in the tubular resin particles. As a result, it is assumed that infiltrating sound enters the holes in the tubular resin particles and is reflected repeatedly such that the energy of the infiltrating sound attenuates.

The change in the sound absorption characteristic on the 0.25 g/cm³ density boundary may be assumed to be due to the change in the hardness of the sound absorbing material.

Figure 4:
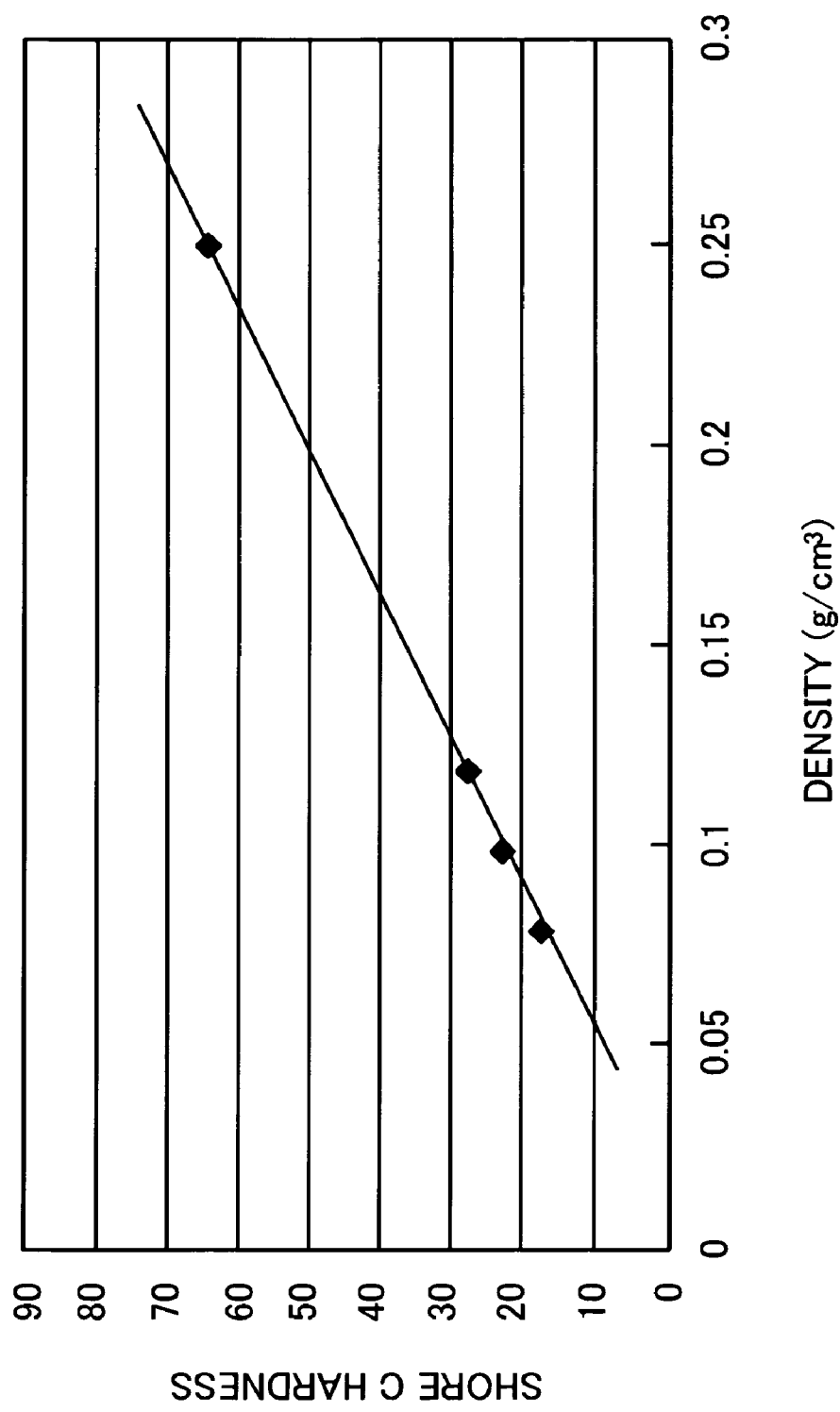
FIG. 4 is an exemplary illustration of a view showing a relationship between density and Shore C hardness in the form of a graph.

FIG. 4 shows the relationship between the density and Shore C hardness of a plurality of sound absorbing materials having different densities in the form of a graph. Note that a similar testing method to that of FIG. 10 described above was used as the testing method. A chip urethane molded body was used as the sound absorbing material 26.

As shown in the drawing, the Shore C hardness is determined by a substantially linear function of the density, and increases as the density increases. When the Shore C hardness is smaller than approximately 70, the sound absorption characteristic of the sound absorbing material 26 has a peak occurring between 400 and 4000 Hz. On the other hand, when the Shore C hardness is greater than approximately 70, the sound absorption characteristic of the sound absorbing material 26 does not peak between 400 and 4000 Hz.

Hence, by setting the Shore C hardness of the sound absorbing material to 70 or less, a favorable sound absorption quality is obtained.

To form the sound absorbing structure ST1, the following method may be employed.

First, the interior base material 22 is molded into a predetermined shape having the recessed portion 23, and then the molded interior base material 22 is mounted on the inner panel 14. The sound absorbing material 26 is then molded into a predetermined shape. Next, the sound absorbing material 26 is buried in the recessed portion 23 and fixed to the recessed portion 23. At this stage, the sound absorbing structure functions as the sound absorbing structure ST1 of the present invention, but in this embodiment, the highly air-permeable surface material 24 is adhered to the cabin side surface of the main surface 22a of the inner base material and the sound absorbing material 26 to form the sound absorbing structure ST1.

(1-2) Actions and Effects of Sound Absorbing Structure for Automobile

Infiltrating sounds infiltrating the cabin interior, such as road noise, wind roar, and engine noise pass through the highly air-permeable surface material 24 directly or following reflection on various components in the cabin interior, and enter the sound absorbing material 26. The sound absorbing material 26 attenuates the energy of the infiltrating sound, and hence the infiltrating sound in the cabin interior is reduced. When a porous sound absorbing material is used, the infiltrating sound enters the narrow holes in the sound absorbing material and is reflected diffusely, causing the energy of the infiltrating sound to attenuate.

Here, the sound absorbing material buried in the recessed portion which is formed on the upper side of the seating surface in the interior base material, which forms a side face when seen from a passenger seated on the seating portion, attenuates the sound, and therefore infiltrating sound such as road noise which infiltrates the cabin interior is absorbed and effectively reduced to the side of the passenger in a position near the ears of the passenger. Hence, the sound absorbing material does not need to be disposed on all surfaces of the cabin interior, enabling a reduction in the material cost of the sound absorbing material, and since an operation to dispose the sound absorbing material on all surfaces of the cabin interior is not required, the cost of the disposal operation is also reduced. Furthermore, the sound absorbing material 26 is inserted into the recessed portion 23 in the interior base material, and hence a favorable design quality and a high level of safety are obtained.

The sound absorbing structure for the road-running automobile is formed simply by inserting the sound absorbing material into the recessed portion in the interior base material, and therefore infiltrating sound such as road noise and wind roar entering the ears of a passenger can be effectively reduced at a low cost while maintaining a favorable design quality and a high level of safety, thus enabling an improvement in quietness while traveling.

Furthermore, the air permeability of the surface material is sufficiently high, and therefore a favorable design quality can be obtained in the cabin interior with no reduction in the sound absorption effect.

Figure 3:
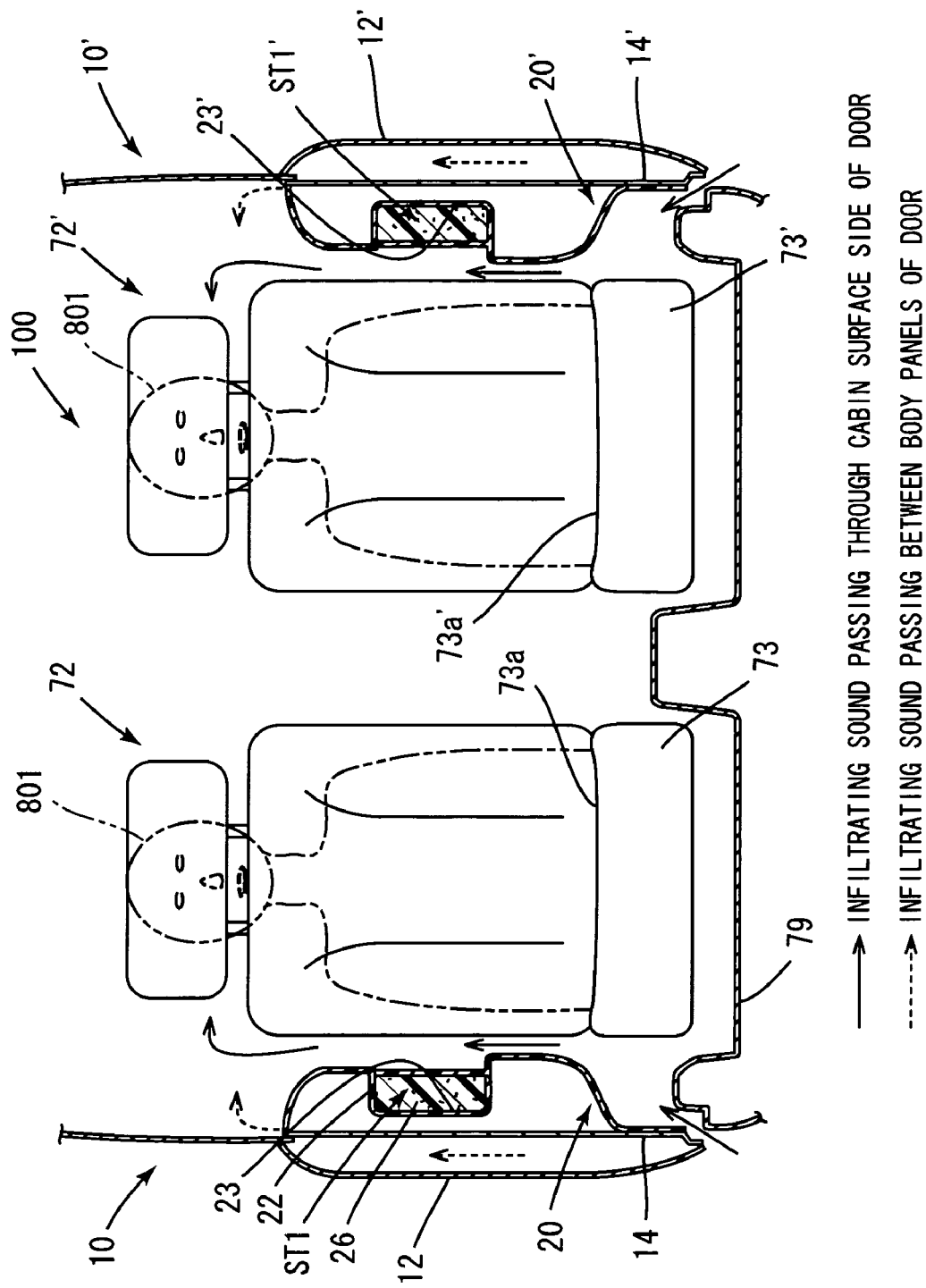
FIG. 3 is an exemplary illustration of a front pattern diagram showing a partial cross-section of the main parts of the automobile 100 and a noise infiltration path from the exterior of the vehicle.

Note that the sound absorbing structure may be provided in locations other than the interior material of the driving seat door trim. As shown in FIG. 3, for example, the sound absorbing structure of the present invention may be provided in the door trim interior material 20' of the front passenger seat, and the sound absorbing structure of the present invention may also be provided in the door trim interior material of the rear seats. The sound absorbing structure of the present invention may also be provided in the pillar garnish interior material 42, 52, 62. The pillars are body panels formed in an elongated tubular shape, and therefore noise propagates easily through the pillar interior while being repeatedly reflected by the tubular pillar-interior so as to infiltrate the cabin interior. Here, the sound absorbing structure of the present invention may be provided only in the pillar garnish interior material, or the sound absorbing structure of the present invention may be provided in both the pillar garnish interior material and the door trim interior material.

(1-3) Constitution of Automobile Sun Visor

Figure 5:
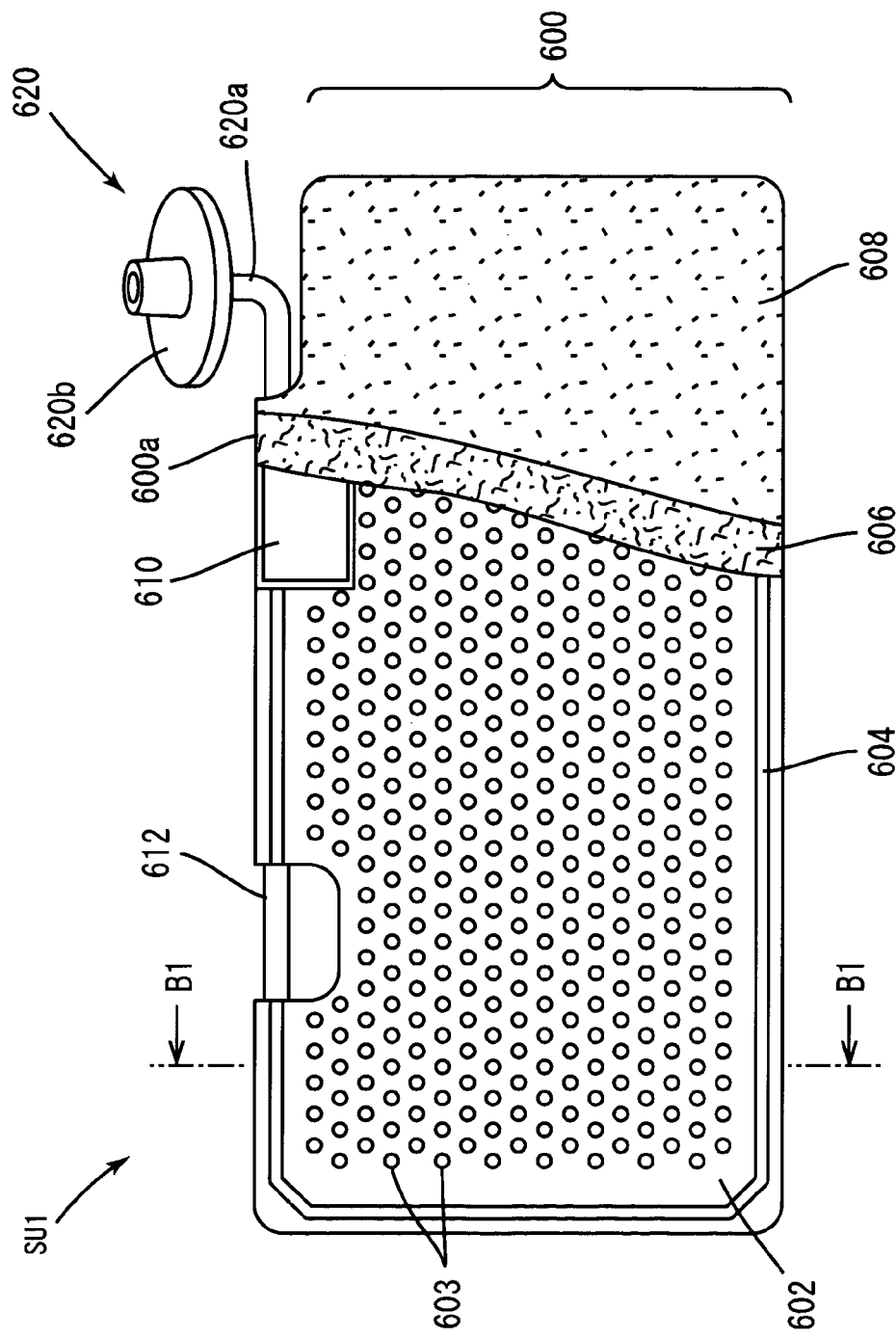
FIG. 5 is an exemplary illustration of a front view showing a partially fractured cross-section of the sun visor SU1.
Figure 6:
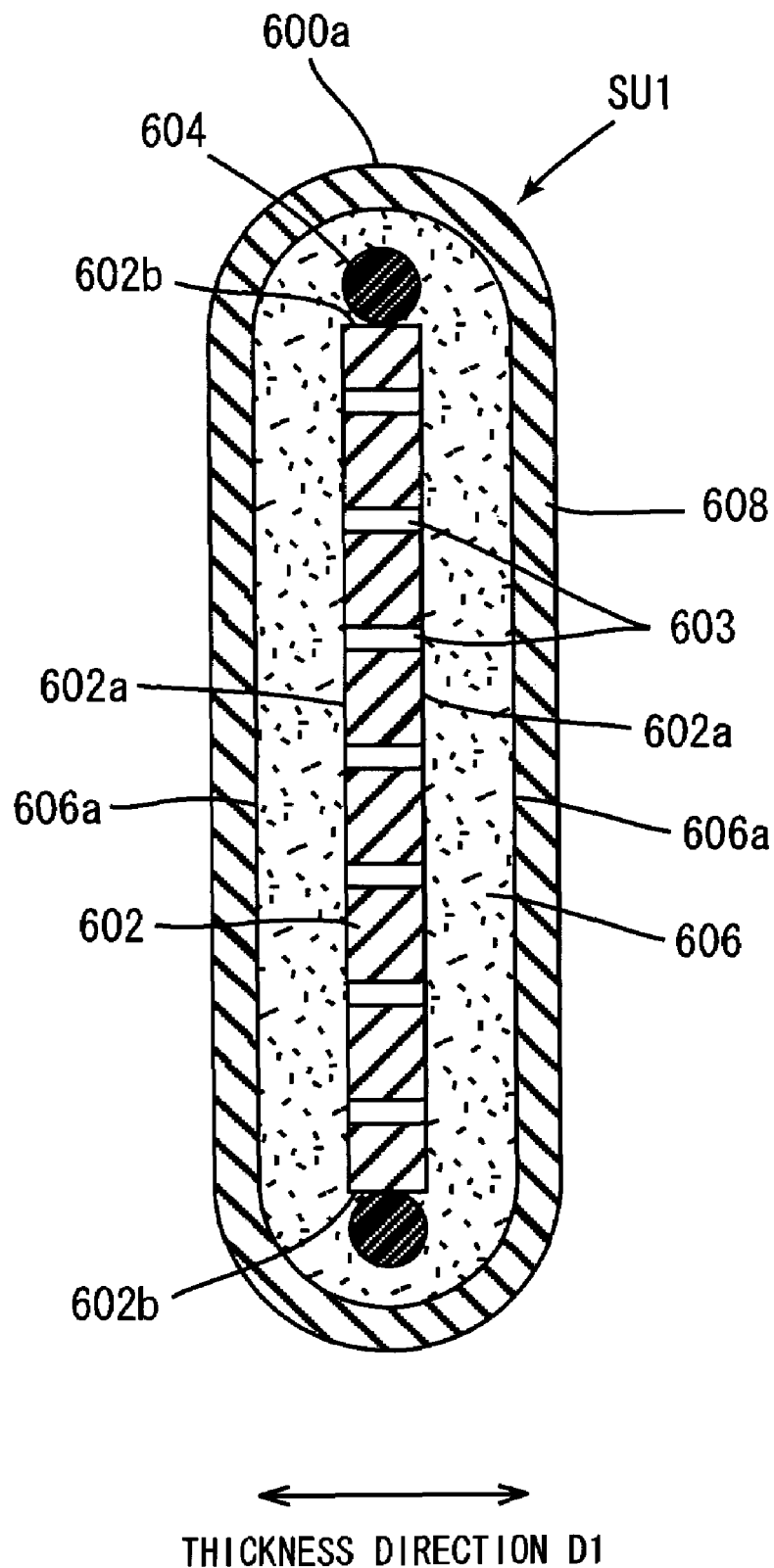
FIG. 6 is an exemplary illustration of a vertical sectional view showing the sun visor SU1 from the position of B1-B1 in FIG. 5.
Figure 7:
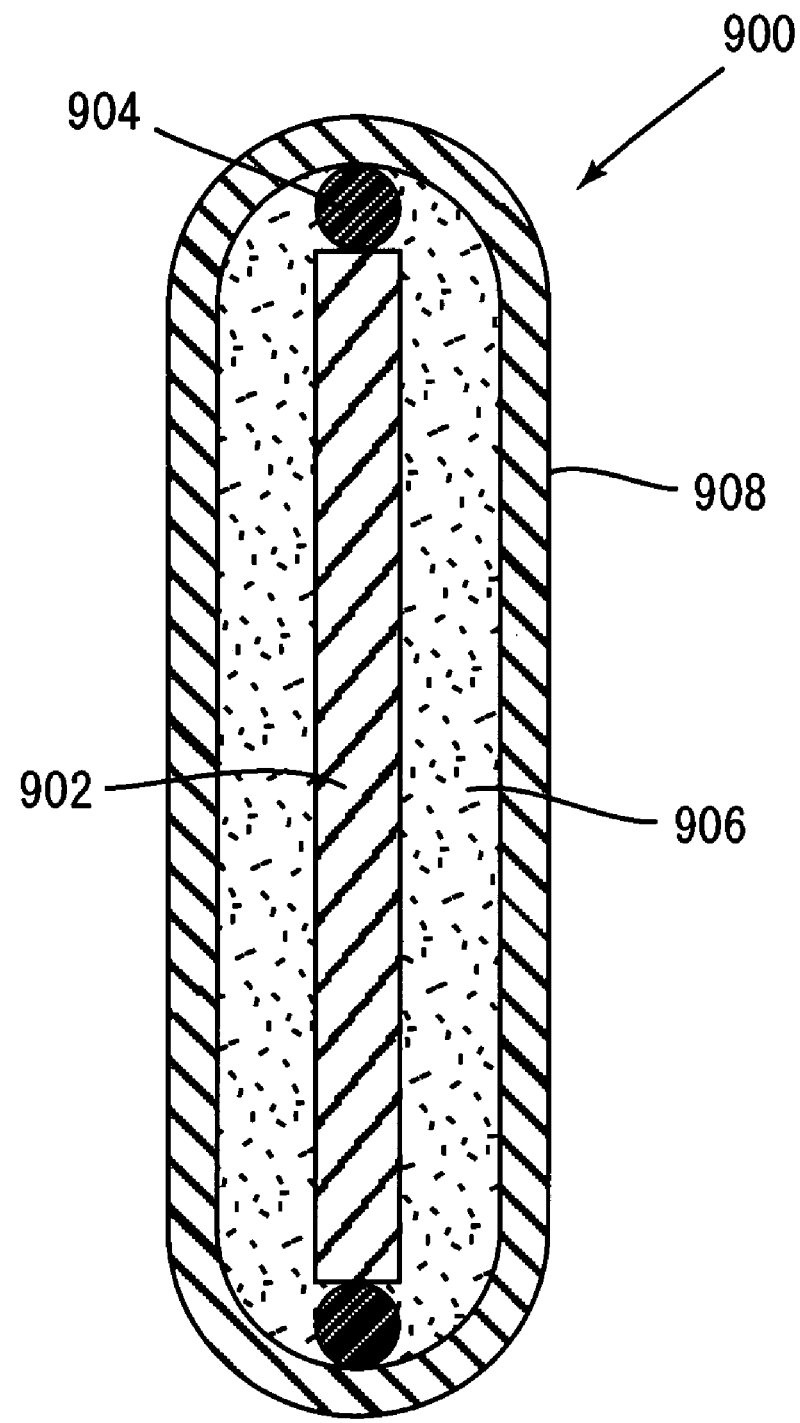
FIG. 7 is an exemplary illustration of a vertical sectional view showing a conventional sun visor from a position corresponding to B1-B1 in FIG. 5.

The automobile sun visor SU1 shown in FIGS. 5 and 6 comprises a core material 602 having a substantially rectangular plate form, and an air-permeable cushioning material 606 covering a surface 602a of the core material 602. A large number of minute air holes (through holes) 603 penetrating the plate-form core material 602 in a thickness direction D1 are formed in the plate-form core material 602 in a dispersed fashion. The sun visor main body 600 of the sun visor SU1 comprises the core material 602, the cushioning material 606, a metallic frame body 604 attached to an outer periphery 602b of the core material 602 so as to surround the outer periphery 602b in a perpendicular direction to the thickness direction D1, and an air-permeable surface material 608 covering a surface 606a of the cushioning material 606. The sun visor SU1 comprises the sun visor main body 600, the spindle member 620 constituted by the L-shaped spindle 620a inserted into the upper end portion 600a during glare protection and the base portion 620b, a U-shaped plate spring (elastic member) 610 which sandwiches the spindle 620a rotatably, and a knob 612 into which the frame body is inserted, and is supported rotatably on the ceiling portion of the automobile cabin interior near the front window via a mounting bracket or the like as appropriate.

The plate-form core material 602 may be formed from a pulp base material such as cardboard (for example, a wooden base material), a synthetic resin such as a thermoplastic resin, a mixture of synthetic resin and a pulp base material, and so on. Polypropylene, polystyrene, noryl, and so on may be used as the thermoplastic resin. The core material is preferably formed in a honeycomb shape to obtain favorable resistance to a compressing force applied in the thickness direction. The core material 602 is molded into a shape that can be accommodated inside the frame body 604. The thickness of the core material 602 is set at approximately 1 to 10 mm. Further, if the ratio of a total area Ss2 of the projected area of the air holes 603 to a projected area Ss1 of the core material 602 when projected in the thickness direction D1 is referred to as an opening ratio ps=(Ss2/Ss1), then the opening ratio ps of the core material 602 is set at 2 to 30% in percentage terms. By setting the opening ratio ps between 2 and 30%, the sun visor SU1 obtains a favorable sound absorption effect while maintaining good rigidity. Note that through experiment, it was confirmed that the opening ratio is preferably no less than 2% so that the air permeability is sufficient to achieve a favorable sound absorption performance, and the opening ratio is preferably no more than 30% so that the rigidity is sufficient to maintain the shape of the core material.

The air holes 603 may take various forms, but are preferably formed in a circular or substantially circular shape so that sufficient rigidity is obtained to prevent the sun visor from bending or deforming when manipulated. The diameter of the air holes 603 is preferably between 0.5 and 10 mm, and more preferably between 1.0 and 5.0 mm. When the diameter is no less than 0.5 mm (preferably no less than 1.0 mm), sound waves enter the air holes easily, ensuring favorable sound-absorbency, and when the diameter is no more than 10 mm (preferably no more than 5.0 mm), the air holes are not see-through and the passenger does not feel any surface irregularities when touching the sun visor.

In this embodiment, the air holes 603 are formed evenly in the core material, but the air holes 603 may be formed in an unevenly dispersed fashion. For example, the opening ratio in a predetermined region of the core material 602 far from the spindle 620a (for example, the left half of the core material 602 in FIG. 5) may be made lower than the opening ratio in a predetermined region near the spindle 620a (for example, the right half of the core material 602 in FIG. 5). When manipulating the sun visor, the passenger often grips the part of the sun visor SU1 far from the spindle 620a, and hence by making the opening ratio of this part comparatively small, the rigidity of the core material 602 in the predetermined region far from the spindle 620a can be raised.

The frame body 604 is formed by bending a metal wire (steel wire or the like) having a diameter of 2 to 10 mm substantially into the outer form of the sun visor, and then attaching and fixing the bent metal wire to the outer periphery 602b of the core material. When a pulp base material such as cardboard is used as the core material 602, favorable rigidity is obtained by attaching the metallic frame body to the outer periphery of the core material 602. Needless to say, synthetic resin or the like may be employed as the material for the frame body.

The knob 612 is formed in a cylindrical shape having a hollow interior using a thermoplastic resin such as polypropylene. The frame body 604 is inserted into and held in the knob 612. The knob 612 is latched to a hook provided on the ceiling portion of the automobile cabin interior, and serves to hold the sun visor SU1 in a stable manner.

The plate spring 610 supports the spindle 620a rotatably by elastically sandwiching and biasing the spindle 620a. Thus, the passenger can grip one end of the sun visor main body and rotate the sun visor about the spindle 620a, thereby placing the sun visor main body in an arbitrary position between a non-use position parallel to the ceiling (the position shown by the dot-dot-dash line in FIG. 1) and a use position between the passenger and the front window (the position shown by the solid line in FIG. 1).

The cushioning material 606 envelops the plate-form core material 602 and the frame body 604. The cushioning material 606 is a highly air-permeable, elastic material such as felt or slab urethane, and the air permeability thereof according to JIS L1096 is at least 6.0 cc/cm$^2$/sec. By increasing the air permeability of the cushioning material, sound waves pass through the cushioning material without being reflected, and hence the sound waves are taken into the interior of the sun visor and absorbed easily. The cushioning material 606 also serves to make the surface irregularities caused by the plurality of air holes 603 formed in the core material less perceptible when the sun visor main body is gripped and manipulated by the passenger. When a highly elastic material is used as the cushioning material, an unpleasant sensation caused by these surface irregularities can be prevented and a suitable texture for an interior material can be provided.

The surface material 608 has an JIS L1096-defined air permeability of no less than 2.0 cc/cm$^2$/sec (preferably no less than 6.0 cc/cm$^2$/sec), and by employing a highly air-permeable material such as a nonwoven fabric or knitted fabric made of polyester fiber or the like, sound waves are taken into the interior of the sun visor easily while maintaining a design quality suited to the interior of an automobile cabin. By increasing the air permeability of the surface material, sound waves pass through the surface material without being reflected, and hence the sound waves are taken into the interior of the sun visor and absorbed easily.

The thickness of the sun visor SU1, or in other words the thickness from the surface material on the front surface of the sun visor main body to the surface material on the rear surface of the sun visor main body, is set at 10 mm or more, and preferably 15 mm or more, to achieve a favorable sound absorption effect and to ensure that the sun visor main body can be gripped easily.

The sun visor SU1 may be manufactured in the following manner.

First, the frame body 604 is formed by bending a metallic wire into a shape substantially corresponding to the outer periphery of the sun visor. At this time, the wire is inserted into the knob 612. Next, the plate-form core material 602 made of cardboard or the like and molded into a shape which fits into the frame body 604 is positioned inside the frame body 604 and fixed to the frame body 604 by tape or the like. Next, a pair of cushioning bodies is formed by cutting a highly air-permeable elastic body made of felt, slab urethane, or the like such that each cushioning body completely covers one side of the frame body 604 and core material 602, whereupon the frame body 604 and core material 602 are sandwiched by the pair of cushioning bodies. Further, a pair of surface materials is formed by cutting a highly air-permeable material such as nonwoven fabric or knitted fabric into a size which completely covers the respective cushioning bodies, whereupon the cushioning bodies sandwiching the frame body 604 and core material 602 are sandwiched by the surface materials. The sun visor main body 600 is formed by joining and cutting the outer periphery in a perpendicular direction to the thickness direction D1 through ultrasonic adhesion. The sun visor SU1 is formed by inserting the spindle 620a of the spindle member into the upper end portion 600a of the sun visor main body.

Note that if low-melting fibers such as low-melting polypropylene fibers are blended with the cushioning material and surface material, the ultrasonic adhesion end processing can be performed more easily. Needless to say, the end processing of the sun visor may be performed using a thermal adhesion method or a sewing and cutting method.

Various accessories such as a vanity mirror, a ticket holder, and a pocket may be added appropriately to the sun visor main body. In this case, the opening ratio of the parts of the core material to which no accessories are added is preferably made larger than the opening ratio of the remaining parts to ensure that the overall absorption coefficient of the sun visor does not deteriorate.

The sun visor SU1 exhibits maximum sound absorbency in the use position (the position shown by the solid line in FIG. 1). When the interior material of the ceiling is sound-absorbent and air-permeable, a synergistic effect is achieved even when the sun visor is in the non-use position (the position shown by the dot-dot-dash line in FIG. 1), leading to an improvement in sound-absorbency, and hence this is preferable.

(1-4) Actions and Effects of Automobile Sun Visor

The cushioning material 606 used in the sun visor is air-permeable, and hence sound infiltrating the cabin interior is not reflected, or at least unlikely to be reflected, by the cushioning material. Further, the air holes 603 are formed in the core material 602, and therefore sound infiltrating the cabin interior is unlikely to be reflected by the core material. Thus, infiltrating sound which enters the sun visor is easily taken into the interior of the sun visor, and the energy of the infiltrating sound that is taken in is attenuated by the cushioning material, enabling a reduction in the noise entering the ears of the passenger.

Further, the air holes 603 are formed so as to be dispersed over the core material, and hence a favorable degree of rigidity is maintained. Moreover, the surface of the favorably rigid core material is covered by the cushioning material 606, and hence a high level of safety is also achieved.

According to the present invention, an automobile sun visor, which conventionally is used only in limited situations when glare protection is required while driving rather than on an everyday basis, is provided with a function for absorbing noise which infiltrates the automobile cabin interior, and thus serves as a sound absorbing body which contributes to quietness in the vehicle interior. Accordingly, this automobile sun visor can effectively reduce the infiltrating sound that enters the ears of a passenger during everyday driving when glare protection is not required while maintaining favorable levels of rigidity and safety, and can therefore improve quietness while driving.

Note that similar actions and effects are obtained even when the sun visor is not provided with the surface material and frame body.

(3) SECOND EMBODIMENT

Figure 8:
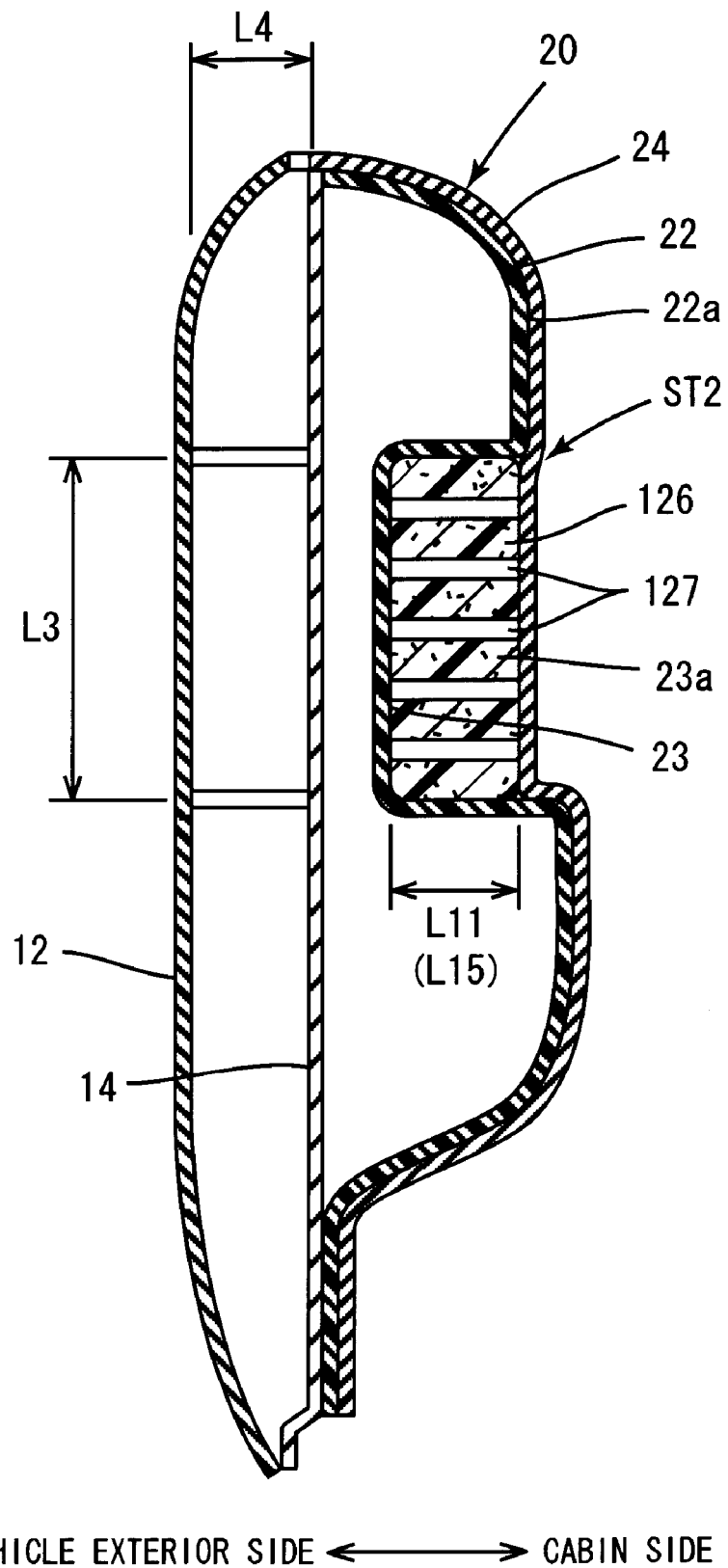
FIG. 8 is an exemplary illustration of a vertical sectional view showing the main parts of a driving seat door according to a second embodiment from a position corresponding to A1-A1 in FIG. 1.
Figure 9:
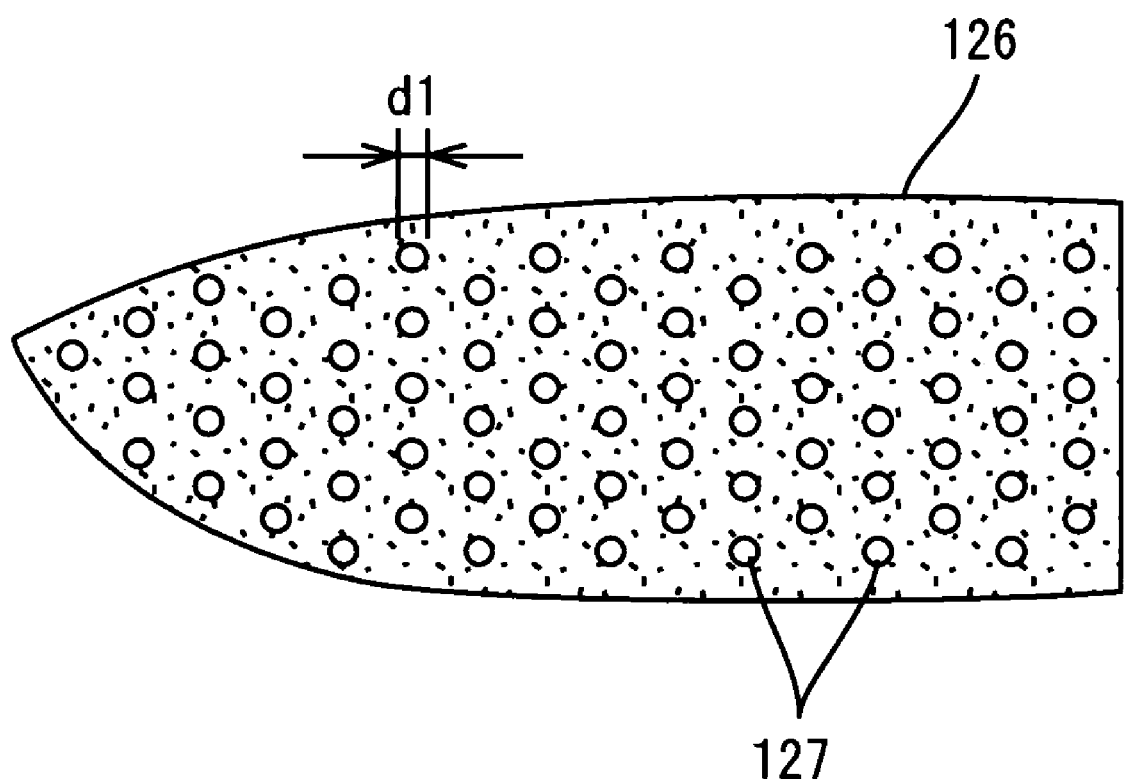
FIG. 9 is an exemplary illustration of a side view showing a perforated sound absorbing material from the same position as FIG. 1.

FIG. 8 is a vertical sectional view showing the main parts of a driving seat door from a position corresponding to A1-A1 in FIG. 1, and FIG. 9 is a side view showing a perforated sound absorbing material 126 from the same position as FIG. 1. In this embodiment, a perforated sound absorbing material 126 formed with through holes directly linking the cabin side and the vehicle exterior side is used instead of the sound absorbing material 26 of the first embodiment. The perforated sound absorbing material 126 shown in the drawing is formed with a plurality of through holes 127. In a sound absorbing structure ST2 of this embodiment, the perforated sound absorbing material 126 is buried in and fixed to the recessed portion 23, whereupon the main surface 22a of the interior base material and the perforated sound absorbing material 126 are covered continuously by the surface material 24 having high air permeability (low air resistance).

A depth L15 of the recessed portion 23 in the interior base material may be set at approximately 3.5 to 110 mm, and preferably approximately 3.5 to 70 mm. As the recessed portion becomes shallower, high-frequency sound is more likely to be absorbed, and as the recessed portion becomes deeper, low-frequency sound is more likely to be absorbed.

As in the first embodiment, a material formed by gathering synthetic fibers such as synthetic felt, a material formed by foaming a synthetic resin such as a thermoplastic resin or thermosetting resin, a combination thereof, or a similar material may be used as the material for the perforated sound absorbing material 126. Further, a foamed synthetic resin formed by gathering and foaming a large number of tubular synthetic resin particles may be used, and the parameters affecting the sound absorption performance are identical to those of the first embodiment.

A thickness L11 of the perforated sound absorbing material 126 in the direction linking the cabin side and the vehicle exterior side is preferably no greater than the depth L15 of the recessed portion 23 and no less than 3 mm. Accordingly, the thickness L11 of the sound absorbing material may be set at approximately 3 to 110 mm, and preferably approximately 3 to 70 mm. By making L11 at least 3 mm, a sufficient sound absorption performance is obtained.

The size of the perforated sound absorbing material 126 may be determined in accordance with the size of the recessed portion 23 in the interior base material.

The through holes 127 formed in the perforated sound absorbing material 126 are substantially circular.

The linearly-formed through holes 127 are oriented in a substantially horizontal direction linking the cabin side and vehicle exterior side.

Typically, as shown in FIG. 9, when the numerous through holes 127 formed in the perforated sound absorbing material 126 are dispersed evenly over the entire surface of the sound absorbing material 126, excluding the peripheral edges, a favorable sound absorption quality is obtained, but the through holes 127 may be offset in accordance with the shape of the interior material. For example, a large number of through holes may be disposed on the side near the position of the ears of the passenger, or a large number of through holes may be disposed on the side where sound waves infiltrate. Further, it is believed that the rigidity of the sound absorbing material can be improved by arranging the through holes in a staggered fashion, as shown in FIG. 9, rather than aligning the through holes vertically and horizontally.

The diameter (d1) of the through holes 127 formed in a large number in the sound absorbing material is preferably between 0.5 and 10 mm, and more preferably between 1.0 and 5.0 mm. When the diameter is no less than 0.5 mm (preferably no less than 1.0 mm), sound waves enter the through holes easily, ensuring favorable sound-absorbency, and when the diameter is no more than 10 mm (preferably no more than 5.0 mm), the passenger does not feel any surface irregularities when touching the surface material. Note that as the diameter d1 of the through holes decreases, the peak of the sound absorption characteristic shifts to the high frequency side such that high-frequency sound can be absorbed, and as the diameter d1 increases, the peak of the sound absorption-characteristic shifts to the low frequency side such that low-frequency sound can be absorbed. Hence, by adjusting the diameter d1 of the through holes, infiltrating sound can be absorbed in a desired frequency.

If the ratio of a total area S2 of the projected area of the through holes 127 to a projected area S1 of the sound absorbing material 126 when projected from the cabin side to the vehicle exterior side is referred to as a sound absorbing material opening ratio p=(S2/S1), then the opening ratio of the sound absorbing material is preferably set at 2 to 30% in percentage terms. By setting the opening ratio at no less than 2%, the sound absorption effect produced by the through holes 127 is sufficient, and by setting the opening ratio at no more than 30%, sufficient hardness is obtained to maintain the shape of the sound absorbing material. Assuming that the diameter of each through hole 127 is d1 and the number of through holes 127 is n1, p=n1×π(d1/2)$^2$/S1. The projected area S1 of this embodiment corresponds to the surface area of the sound absorbing material 126 depicted in FIG. 9, and the projected area S2 corresponds to the sum total of the surface area of the through holes 127 depicted in FIG. 9.

The perforated sound absorbing material 126 may be formed in a similar manner to the sound absorbing material 26 of the first embodiment.

The perforated sound absorbing material 126 of this embodiment is formed from at least one of a foamed synthetic resin material and a gathered synthetic fiber material, and has a density of 0.25 to 0.40 g/cm$^3$. By setting the density to at least 0.25 g/cm$^3$, a sound absorption effect is obtained by the through holes formed so as to link the cabin side and vehicle exterior side, and by setting the density to no more than 0.40 g/cm$^3$, a favorable sound absorption effect is obtained through the sound absorption effect of the through holes and the sound absorption effect of the material used for the sound absorbing material itself. Note that the density of the perforated sound absorbing material 126 corresponds to the density of the parts excluding the through holes 127, or in other words the density of the material prior to formation of the through holes.

Further, the perforated sound absorbing material 126 of this embodiment, formed from the material described above, has a Shore C hardness of 70 to 90. By setting the Shore C hardness to 70 at least, a sound absorption effect is obtained by the through holes formed so as to link the cabin side and vehicle exterior side, and by setting the Shore C hardness to 90 at most, a favorable sound absorption effect is obtained through the sound absorption effect of the through holes and the sound absorption effect of the material used for the sound absorbing material itself.

As described above, when the density is higher than 0.25 g/cm$^3$, the sound absorption characteristic of a non-perforated sound absorbing material does not peak between 400 to 4000 Hz. When an identical material to the non-perforated sound absorbing material is used to form the perforated sound absorbing material formed with through holes linking the cabin side and vehicle exterior side, the sound absorption characteristic of the perforated sound absorbing material has a peak occurring between 400 and 4000 Hz, which is more favorable since it is assumed that infiltrating sound enters the through holes and is reflected repeatedly such that the energy of the infiltrating sound attenuates.

According to the above, the perforated sound absorbing material may be formed by forming a plurality of through holes linking the cabin side and vehicle exterior side at a diameter of 0.5 to 10 mm (preferably 1.0 to 5.0 mm) in a material which is capable of absorbing sound and has a sound absorption characteristic which peaks at a frequency between 400 and 4000 Hz, but is not formed with through holes linking the cabin side and vehicle exterior side. By forming the through holes at this diameter, the peak of the sound absorption characteristic occurs at a frequency between 400 and 4000 Hz, and hence a favorable sound absorption quality can be obtained in a wider frequency range, enabling an improvement in the sound absorption characteristic.

FIG. 10 is a graph comparing the normal incidence sound absorption coefficients of a non-perforated sound absorbing material which does not peak between 400 to 4000 Hz and a perforated sound absorbing material manufactured by forming through holes linking the cabin side and vehicle exterior side in the non-perforated sound absorbing material, in ⅓ octave frequency bandwidths. A molded body formed by molding chip urethane into the shape of the non-perforated sound absorbing material was used as the non-perforated sound absorbing material. A material manufactured by forming a large number of through holes in the non-perforated sound absorbing material at a diameter of 2.0 mm and in the arrangement shown in FIG. 9 was used as the perforated sound absorbing material 126.

As shown in the graph, by forming through holes linking the cabin side and vehicle exterior side in the non-perforated sound absorbing material which does not peak between 400 and 4000 Hz, a sound absorption characteristic having a peak which occurs between 400 and 4000 Hz (in the vicinity of 1000 Hz in the illustrated example) is obtained. Note that an even more favorable sound absorption quality is obtained using a perforated sound absorbing material formed with through holes linking the cabin side and vehicle exterior side at a diameter of 0.5 to 10 mm (preferably 1.0 to 5.0 mm).

Figure 11:
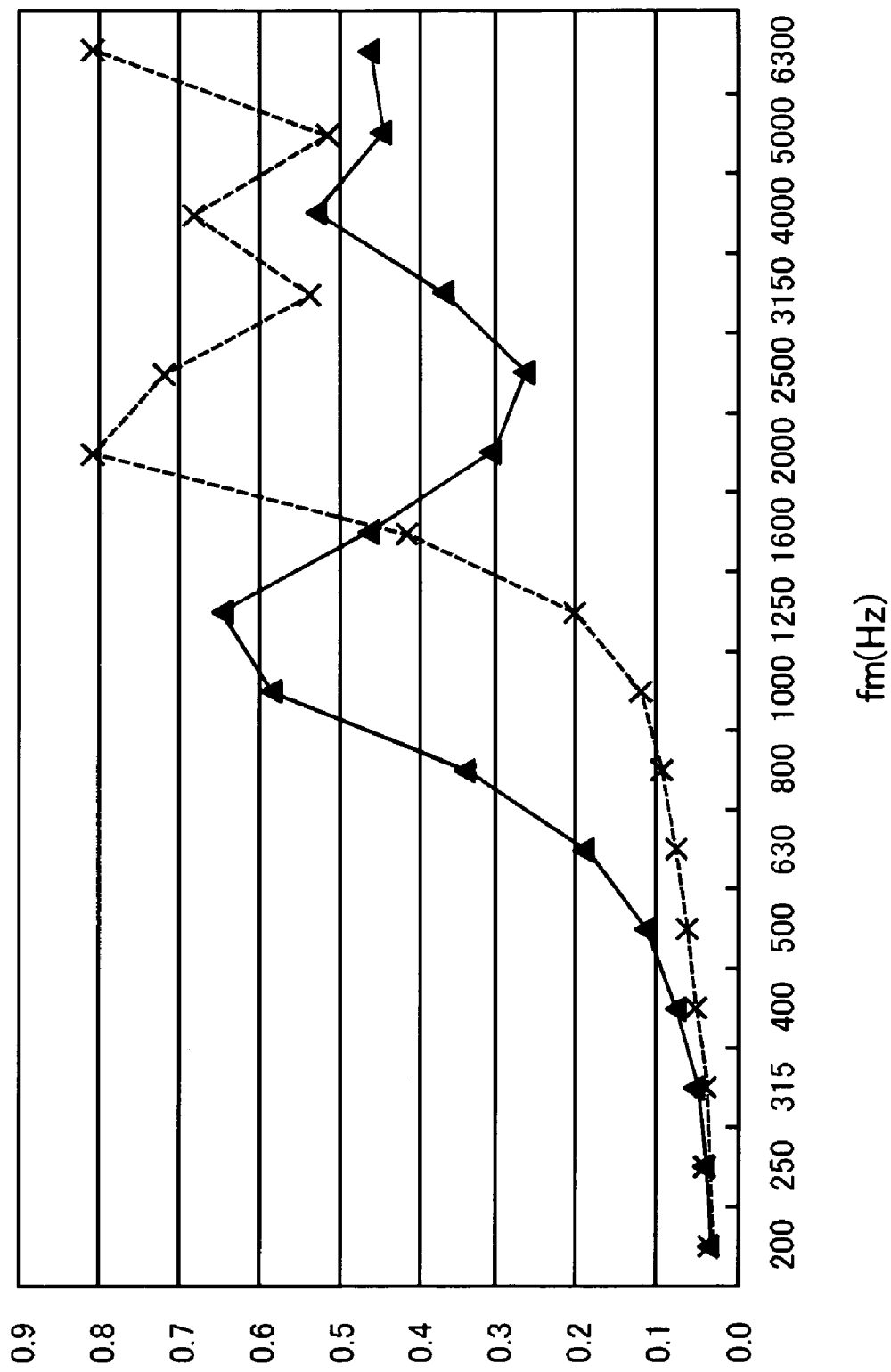
FIG. 11 is an exemplary illustration of a view showing a graph comparing normal incidence sound absorption coefficients.

FIG. 11 is a graph comparing the normal incidence sound absorption coefficients of two types of perforated sound absorbing material having different densities in ⅓ octave frequency bandwidths (unit: Hz). In the graph, the normal incidence sound absorption coefficient is plotted at each fm. Note that a similar testing method to that of FIG. 10 is used. A molded body formed by gathering a large number of PEPP tubular resin particles (porous EPP, tubular molded bead bodies with an inner diameter of 3 mm, an outer diameter of 5 mm, a length of 4 mm, and a density of 0.045 g/cm$^3$), manufactured by JSP Corporation using foamed polypropylene, and foam-molding the tubular resin particles into the shape of the perforated sound absorbing material 126 having a density of 0.03 g/cm$^3$ and a large number of through holes with a diameter of 2.0 mm, was used as the perforated sound absorbing material 126. A molded body formed by gathering a large number of the same tubular resin particles and foam-molding them into the shape of a non-perforated sound absorbing material at a density of 0.03 g/cm$^3$ was used as a comparative example.

When the through holes linking the cabin side and vehicle exterior side are not formed, the sound absorption characteristic of the sound absorbing material formed by gathering and foam-molding a large number of tubular resin particles is such that peaks occur in the vicinity of 1000 Hz frequency and between approximately 4000 and 5000 Hz frequency, as shown by the solid line in the graph. On the other hand, when through holes linking the cabin side and vehicle exterior side are formed at a diameter of 0.5 to 10 mm (preferably 1.0 to 5.0 mm), the sound absorption characteristic is such that the peak occurring in the vicinity of 1000 Hz shifts to the vicinity of 2000 Hz and the normal incidence sound absorption coefficient increases, and the peak in the vicinity of 4000 to 5000 Hz remains in the same frequency band while the normal incidence sound absorption coefficient increases.

Hence, a more favorable sound absorption quality is obtained using a perforated sound absorbing material formed with through holes linking the cabin side and vehicle exterior side at a diameter of 0.5 to 10 mm (preferably 1.0 to 5.0 mm).

Next, the actions and effects of the second embodiment will be described.

Infiltrating sound infiltrating the cabin interior passes through the highly air-permeable surface material 24 either directly or upon reflection on various components in the cabin interior, and thus enters the perforated sound absorbing material 126. The perforated sound absorbing material 126 attenuates the energy of the entered infiltrating sound, and hence the infiltrating sound entering the cabin interior is reduced. Further, the infiltrating sound enters the through holes and is repeatedly reflected thereby, causing the energy of the infiltrating sound to attenuate, and hence the infiltrating sound entering the cabin interior is further reduced.

The perforated sound absorbing material, which is buried in the recessed portion formed on the upper side of the seating surface, attenuates the sound, and hence infiltrating sound infiltrating the cabin interior is absorbed in a position on the side of the passenger near the ears of the passenger, and therefore reduced effectively. As a result, the material cost of the sound absorbing material is reduced and the cost of the operation to dispose the sound absorbing material is also reduced. Moreover, the perforated sound absorbing material 126 is inserted into the recessed portion 23 in the interior base material, and hence improvements in design quality and safety are also achieved.

Thus, in the road-running automobile, infiltrating sound entering the ears of a passenger can be reduced effectively by means of a simple constitution, in which the sound absorbing structure is formed simply by inserting the perforated sound absorbing material into the recessed portion of the interior base material, at low cost while maintaining a favorable design quality and a high level of safety, enabling an improvement in quietness while traveling. Moreover, the air permeability of the surface material is sufficiently large, and hence a favorable design quality can be obtained in the cabin interior with no reduction in the sound absorption effect.

Note that various modified examples of the sound absorbing material described in the first embodiment, various modified examples of the through holes, and modified examples of the location in which the sound absorbing structure is provided may be applied to the second embodiment.

Figure 12:
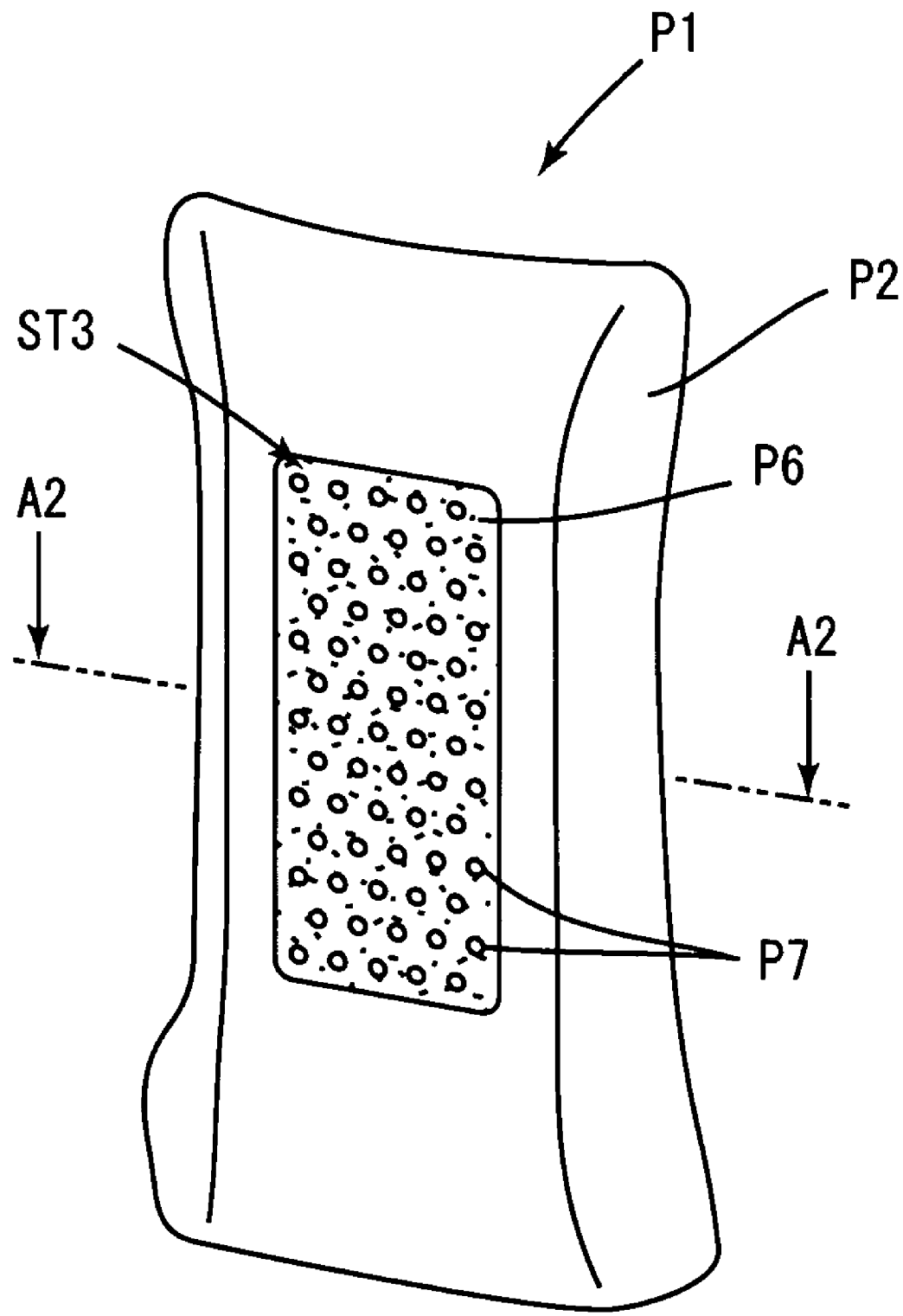
FIG. 12 is an exemplary illustration of a perspective view showing a pillar garnish interior material provided with the sound absorbing structure of the present invention.
Figure 13:
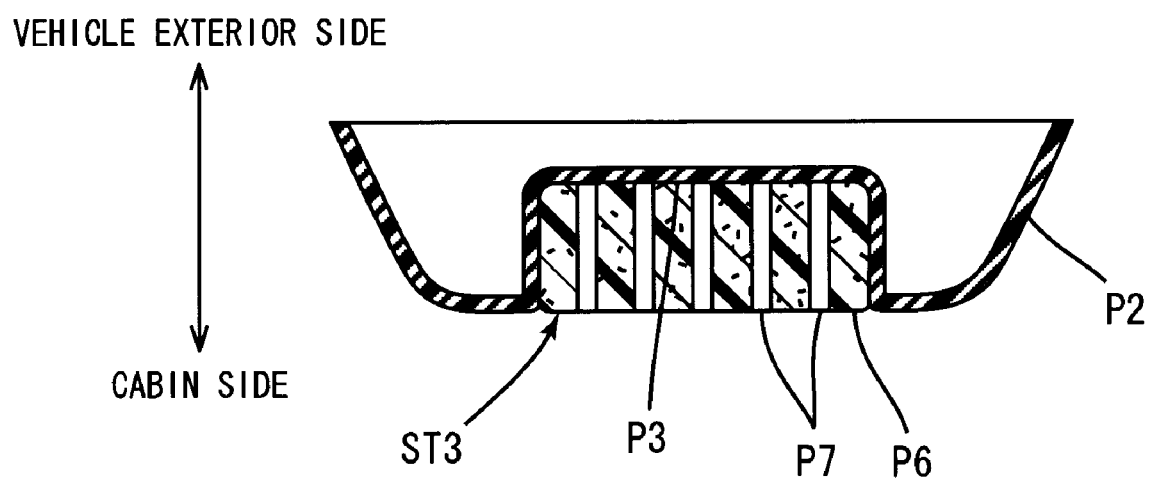
FIG. 13 is an exemplary illustration of a horizontal sectional view showing the pillar garnish interior material from the position of A2-A2 in FIG. 12.

FIG. 12 is a perspective view showing an example in which a sound absorbing structure ST3 of the present invention is provided in a pillar garnish interior material P1, and FIG. 13 is a horizontal sectional view showing the pillar garnish interior material P1 from the position of A2-A2 in FIG. 12. In this modified example, a recessed portion P3 is formed on the cabin side of an interior base material P2 of the pillar garnish interior material. A perforated sound absorbing material P6 formed with a large number of through holes P7 linking the cabin side and vehicle exterior side is inserted and buried into the recessed portion P3 from the cabin side.

The material and thickness of the interior base material, the depth of the recessed portion, the material and thickness of the perforated sound absorbing material, and the arrangement, diameter, and opening ratio of the through holes may be set identically to the conditions of a perforated sound absorbing material buried in the recessed portion of the door trim interior material. The size of the recessed portion when the vehicle exterior is viewed from the cabin interior and the size of the perforated sound absorbing material when the vehicle exterior is viewed from the cabin interior may be determined in accordance with the size of the interior base material within a size range that is smaller than the interior base material. In this modified example, no surface material is affixed to the surface, but a surface material may be affixed to enhance the design quality.

The recessed portion P3 is formed in the pillar garnish interior material P1 on the upper side of the seating surface (73a in FIG. 1) of the seat.

According to this constitution also, infiltrating sound infiltrating the cabin interior enters the perforated sound absorbing material P6 and the energy thereof is attenuated. Further, the infiltrating sound enters the through holes P7 linking the cabin side and vehicle exterior side, and is repeatedly reflected thereby, causing the energy of the infiltrating sound to attenuate effectively. Here, the perforated sound absorbing material, which is buried in the recessed portion formed on the upper side of the seating surface, attenuates the sound, and hence the infiltrating sound is absorbed in a position on the side of the passenger near the ears of the passenger, and therefore reduced effectively. Moreover, the sound absorbing material P6 is inserted into the recessed portion P3 in the interior base material, and hence improvements in design quality and safety are also achieved. Therefore, infiltrating sound entering the ears of a passenger can be reduced effectively at low cost while maintaining a favorable design quality and a high level of safety.

The through holes in the perforated sound absorbing material may be oriented in various directions in addition to a substantially horizontal direction linking the cabin side and vehicle exterior side, as in this embodiment.

Figure 14:
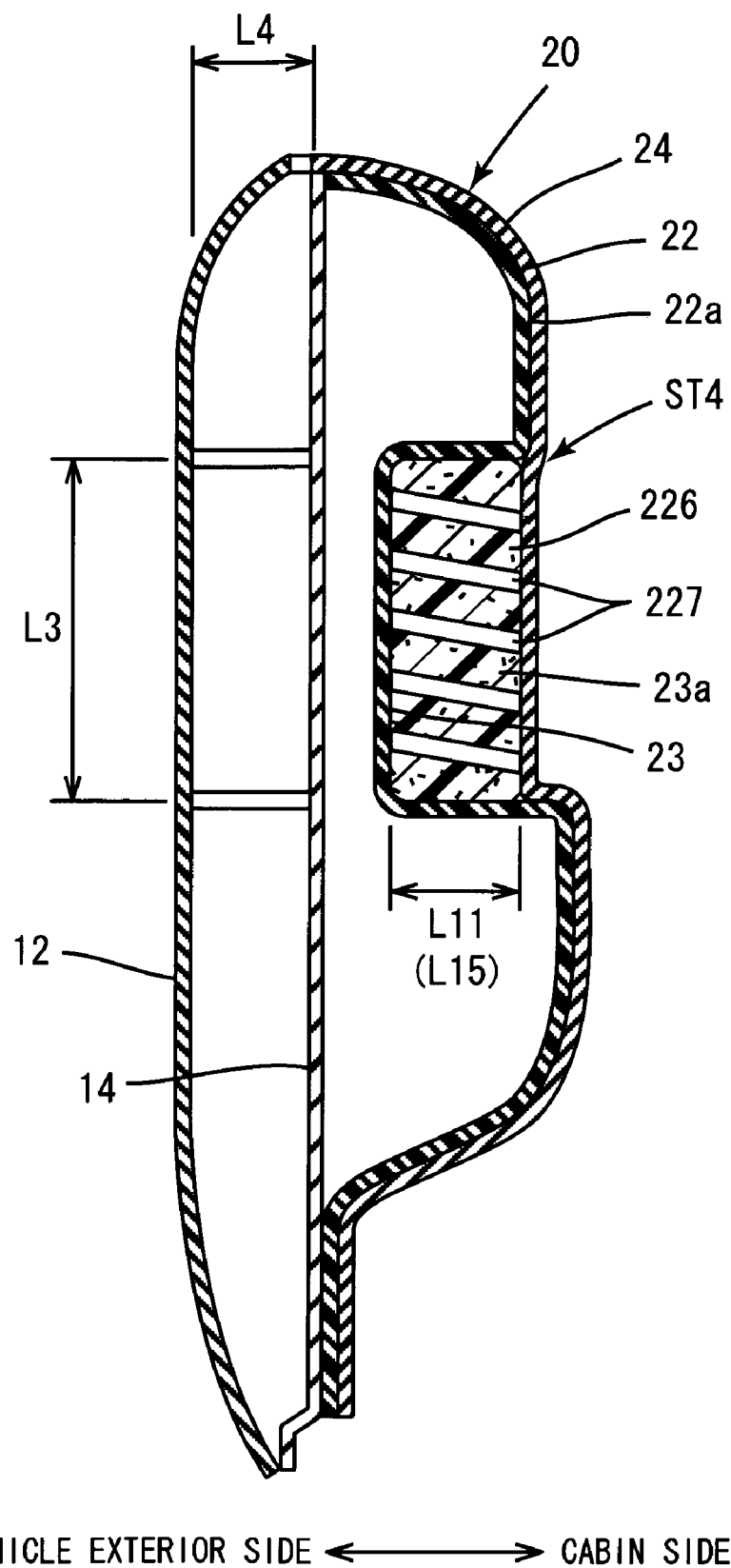
FIG. 14 is an exemplary illustration of a vertical sectional view of the main parts of a driving seat door according to a modified example from a position corresponding to A1-A1 in FIG. 1.

As shown in FIG. 14, for example, a sound absorbing structure ST4 may be formed using a perforated sound absorbing material 226 in which the cabin side of the through holes in the perforated sound absorbing material is set to be lower than the vehicle exterior side. When the perforated sound absorbing material 226 having through holes which are lower on the cabin side than the vehicle exterior side is used, infiltrating sound which infiltrates the cabin interior from below, such as road noise, is considered more likely to enter the through holes 227, and hence the sound absorption quality can be improved.

Figure 15:
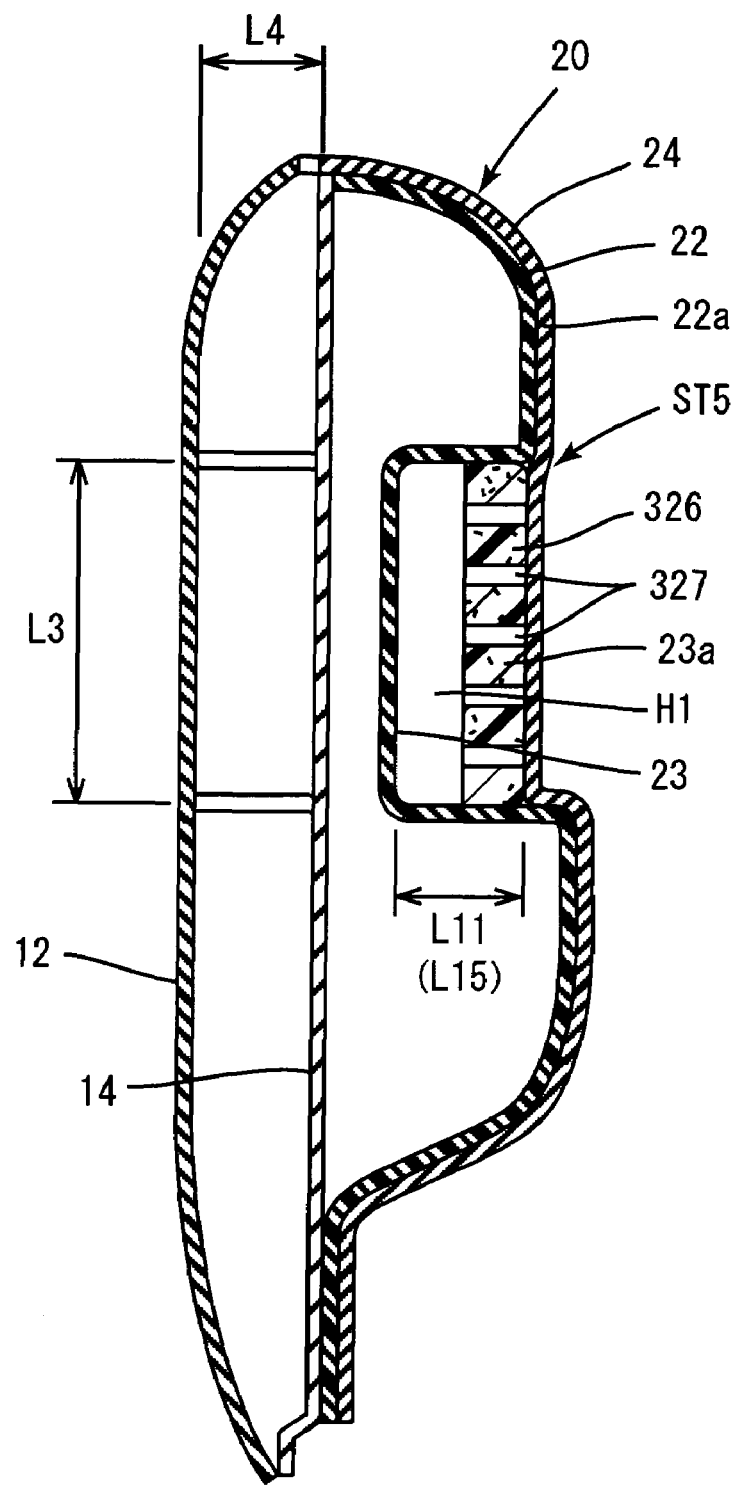
FIG. 15 is an exemplary illustration of a vertical sectional view of the main parts of the driving seat door according to the modified example from a position corresponding to A1-A1 in FIG. 1.

Further, as shown in FIG. 15, a sound absorbing structure ST5 may be formed by inserting a perforated sound absorbing material 326 formed with through holes 327 into the recessed portion 23 from the cabin side so as to form a hollow portion H1 in the recessed portion 23 in which sound entering through the through holes 327 resonates. The hollow portion H1 formed between the perforated sound absorbing material 326 and recessed portion 23 causes sound entering the through holes 327 to resonate, and thus the sound is attenuated in accordance with Helmholtz resonator theory. Therefore, infiltrating sound such as road noise which infiltrates the cabin interior can be reduced more effectively. Here, high-frequency sound can be absorbed more effectively as the thickness of the hollow portion H1 in the direction linking the cabin side and vehicle exterior side decreases, and low-frequency sound can be absorbed more effectively as the thickness of the hollow portion H1 increases.

Note that in the automobile sun visor SU1, a perforated sound absorbing material manufactured by forming a large number of dispersed air holes (through holes) penetrating in the thickness direction D1 in a sound-absorbent material may be used for the plate-form core material 602. It was found through experiment that when a perforated sound absorbing material was used, an improved sound absorption quality was obtained. The reason for the improved sound absorption quality is assumed to be that infiltrating sound is reflected repeatedly after entering the through holes such that the energy of the infiltrating sound attenuates. Note that the perforated sound absorbing materials 126, 26, 326, P6 may be employed similarly as the core material 602.

The perforated sound absorbing material may be manufactured by forming a large number of the air holes 603 at a diameter of 0.5 to 10 mm (preferably 1.0 to 5.0 mm) in the thickness direction D1 of a sound-absorbent material having no air holes and a sound-absorption characteristic according to which no peak occurs between frequency 400 to 4000 Hz. By forming the air holes 603 at the above diameter in a material having a sound absorption characteristic which does not peak at a frequency between 400 and 4000 Hz, a peak occurs in the sound absorption characteristic between 400 and 4000 Hz, and hence a favorable sound absorption quality is obtained in a wide frequency range. As a result, a favorable sound absorption quality can be obtained in a wider frequency range than that of a case where sound is absorbed by a sound absorbing material not formed with through holes penetrating in the thickness direction.

The perforated sound absorbing material may be formed from at least one of a foamed synthetic resin material and a gathered synthetic fiber material. In so doing, a perforated sound absorbing material exhibiting a favorable sound absorption effect can be provided.

The density of the perforated sound absorbing material may be set at 0.25 to 0.40 g/cm$^3$, and a large number of the air holes 603 may be formed in the thickness direction D1 at a diameter of 0.5 to 10 mm (preferably 1.0 to 5.0 mm). In so doing, a favorable sound absorption effect can be obtained with a perforated sound absorbing material which is sufficiently hard to maintain its shape.

(3) EXAMPLES OF FIRST AND SECOND EMBODIMENT

The present invention will be described specifically below using examples. However, the present invention is not limited by these examples.

FIRST EXAMPLE

A polypropylene resin door trim base material with a thickness of 2.5 mm was used as the interior base material. The interior base material was formed by molding the door trim base material into a shape having a recessed portion in the central portion of the front door trim. The recessed portion was formed with a rectangular opening portion, a length L2 in the automobile front-rear direction of 600 mm, a length L3 in the automobile height direction of 300 mm, and an average depth of 20 mm.

A non-perforated sound absorbing material formed at an average thickness of 20 mm by binding recycled fibers using a binder without through holes linking the cabin side and vehicle exterior side was used as the sound absorbing material. The density of the non-perforated sound absorbing material was set at 0.12 g/cm$^3$. The non-perforated sound absorbing material was buried in and fixed to the recessed portion in the interior base material.

Needle-punched nonwoven fabric made of polyester fiber was used as the surface material. The surface material had a mass per unit area of 400 g/m$^2$ and an air-permeability of 45 cc/cm$^2$/sec. The main surface of the interior base material and the cabin side surface of the non-perforated sound absorbing material were covered continuously by the surface material, and thus the test sample of the first example was formed.

SECOND EXAMPLE

The interior base material and surface material were constituted identically to those of the first example.

Chip urethane molded at an average thickness of 20 mm and having a large number of through holes formed evenly in a staggered form such as that shown in FIG. 9 at a diameter d1 of 2.0 mm and an opening ratio p of 5% was used as the sound absorbing material. This perforated sound absorbing material was buried in and fixed to the recessed portion in the interior base material. The density of the perforated sound absorbing material was set at 0.30 g/cm$^3$. The main surface of the interior base material and the cabin side surface of the perforated sound absorbing material were covered continuously by the surface material, and thus the test sample of the second example was formed.

COMPARATIVE EXAMPLE

An identical polypropylene resin door trim base material to that of the first and second examples, having a thickness of 2.5 mm, was used as the interior base material. However, the interior base material was formed by molding the door trim base material into a shape not having the recessed portion of the present invention. Also, no sound absorbing material was used. The same surface material as that of the first and second examples was used. The cabin side surface of the interior base material was covered by the surface material, and thus the test sample of the comparative example was formed.

Testing Method

The test samples of the first and second examples and the comparative example were carpeted in succession onto a 1500 cc displacement, front engine, front drive passenger automobile (a Sedan type passenger automobile), the test vehicle was placed in an anechoic room, and road noise was generated by creating smooth 60 km/h running conditions using a chassis dynamo. Then, the A-weighted sound pressure level (noise level) in a position corresponding to the position of the ears of a passenger was measured using a device corresponding to a ⅓ octave band analyzer defined by JIS C1513, with a normal sound level meter defined by JIS C1502 serving as an indicating mechanism.

Test Results

Figure 16:
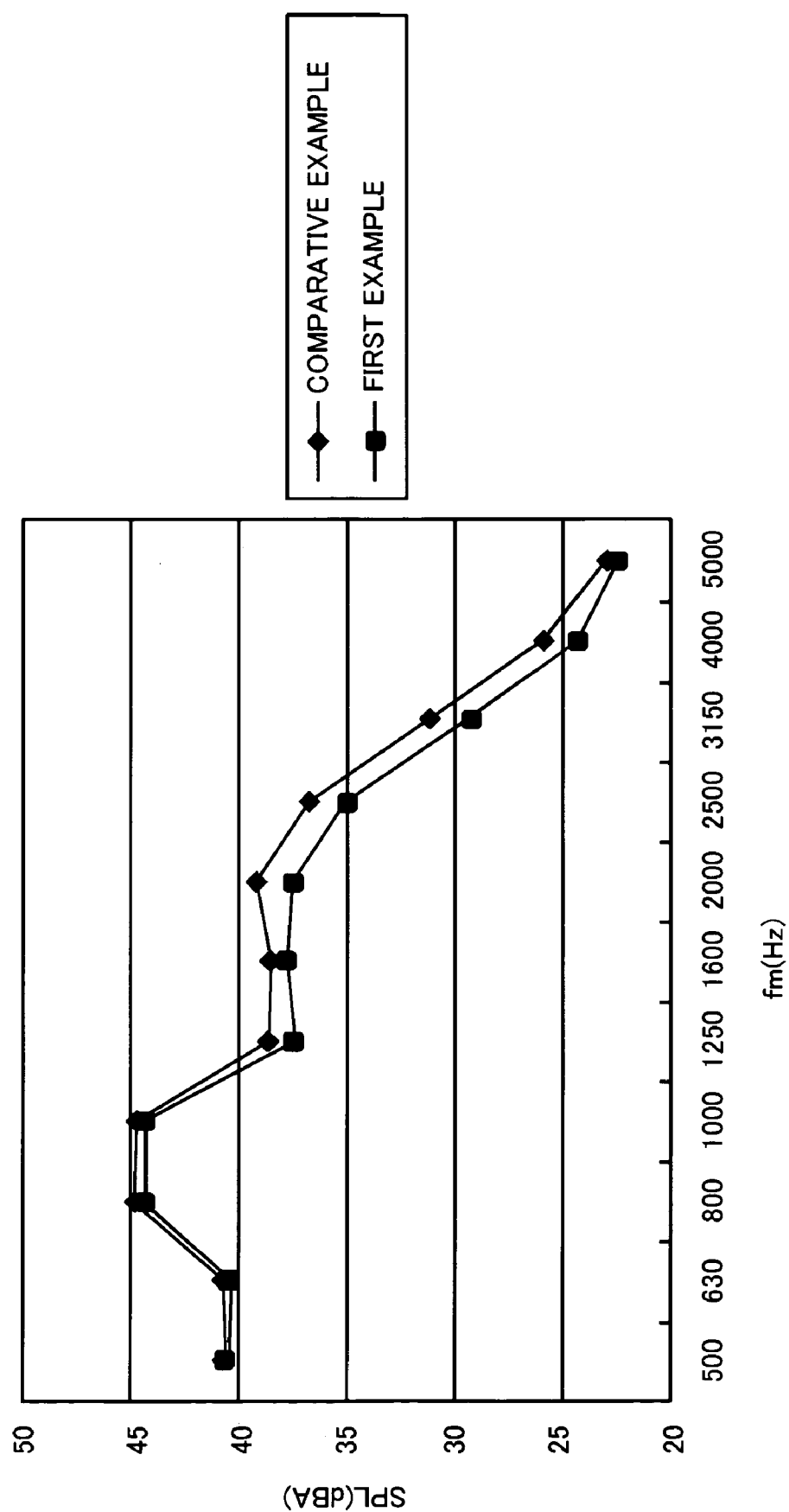
FIG. 16 is an exemplary illustration of a view showing a graph comparing an A-weighted sound pressure level in a position corresponding to the position of the ears of a driver in a first example and a comparative example.
Figure 17:
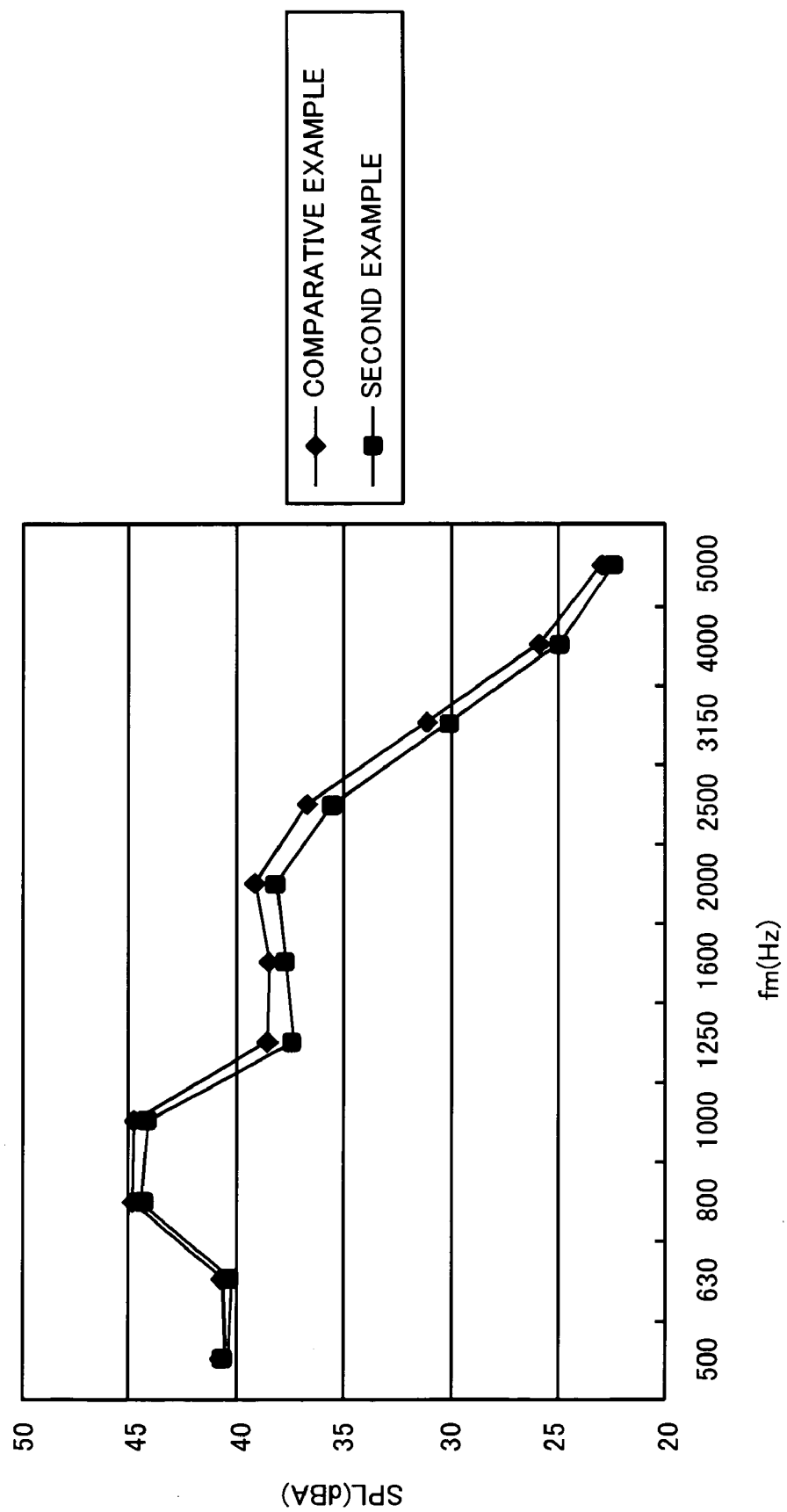
FIG. 17 is an exemplary illustration of a view showing a graph comparing the A-weighted sound pressure level in a position corresponding to the position of the ears of a driver in a second example and the comparative example.

FIG. 16 is a graph showing the A-weighted sound pressure level SPL (unit: dBA) in ⅓ octave frequency bandwidths (unit: Hz) in relation to the first example and the comparative example. FIG. 17 is a graph showing the A-weighted sound pressure level SPL (unit: dBA) in ⅓ octave frequency bandwidths (unit: Hz) in relation to the second example and the comparative example. In each graph, measured sound pressure level values are plotted at each fm.

In the first example, the sound pressure level became comparatively small at an fm of 1250 Hz and above, and hence it was confirmed that in a high-frequency region of 1250 Hz and above, a good sound absorption performance was obtained. Accordingly, it was confirmed that infiltrating sound was absorbed by means of a simple constitution in which the non-perforated sound absorbing material was inserted into the recessed portion of the interior base material to form a hollow portion.

In the second example, the sound pressure level became comparatively small at an fm of 800 Hz and above, and hence it was confirmed that a good sound absorption performance was obtained in a wider frequency range than that of the first example. Accordingly, it was confirmed that a compound effect was produced by the sound absorbing material and the through holes linking the cabin side and vehicle exterior side, enabling infiltrating sound to be absorbed over a wider frequency range.

(4) THIRD EMBODIMENT

Figure 18:
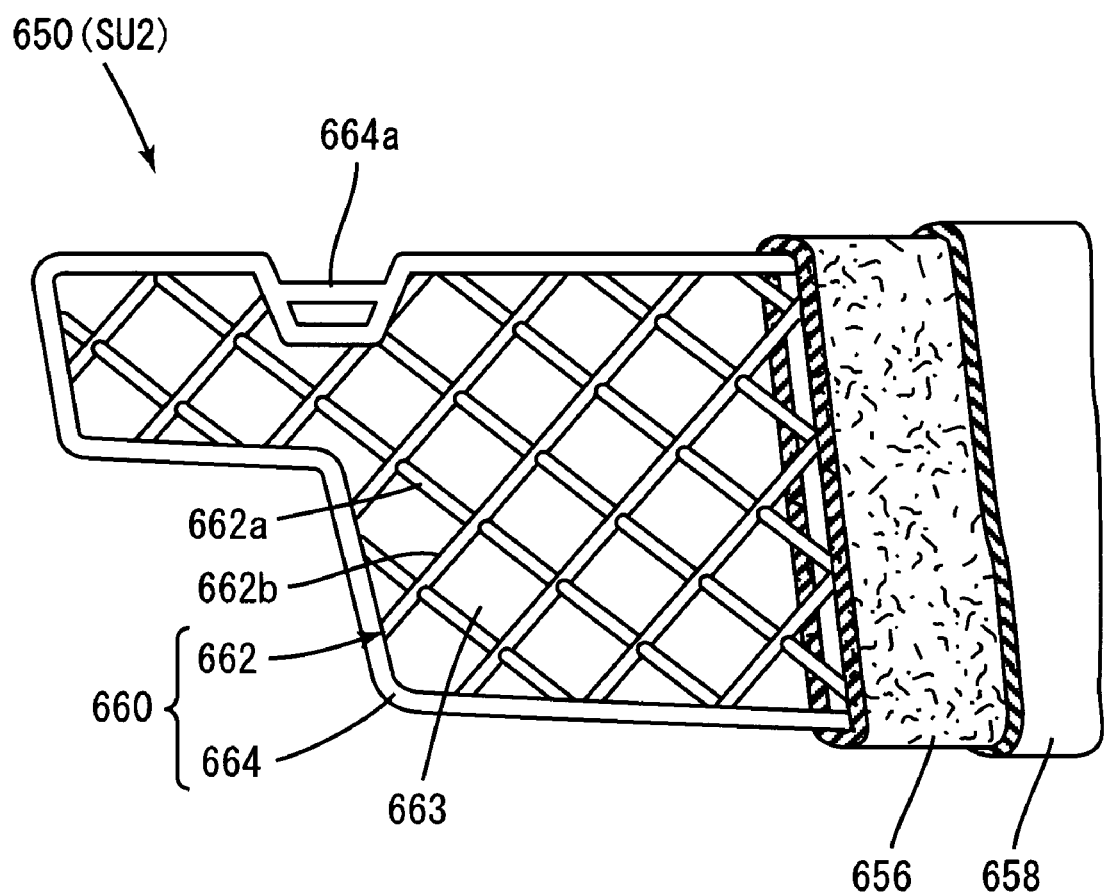
FIG. 18 is an exemplary illustration of a front view showing a partially fractured cross-section of a sun visor SU2 according to a third embodiment.

An automobile sun visor SU2 shown in FIG. 18 comprises a plate-form core material 660 and an air-permeable elastic cushioning body (cushioning material) 656 covering the surface of the core material, and a plurality of cavities (air holes) 663 penetrating in the thickness direction are formed in the plate-form core material 660. A sun visor main body 650 of the sun visor SU2 comprises the core material 660, the cushioning body 656, and an air-permeable surface material 658 covering the surface of the cushioning body 656.

The core material 660 may be formed by subjecting a synthetic resin (a thermoplastic resin, for example) or the like to injection molding, press molding, or similar. Polypropylene resin, polyamide resin, polyester resin, and so on may be used as the thermoplastic resin. The core material 660 shown in the drawing is constituted by a lattice portion 662 comprising a plurality of midribs 662a arranged from the upper left to the lower right and a plurality of midribs 662b arranged from the lower left to the upper right, and a frame portion 664 which is integrated with the outer periphery of the lattice portion 662 and surrounds the outer periphery in a perpendicular direction to the thickness direction of the lattice portion 662. The midribs 662a are disposed in parallel, and the midribs 662b are disposed in parallel, thereby forming the lattice-shaped lattice portion 662 having a large number of dispersed cavities 663 penetrating in the thickness direction. With this structure, the core material 660 is a minimal member capable of forming the outer shape of the sun visor, and is lightweight and extremely strong. The lattice portion 662 and frame portion 664 are preferably formed integrally by injection molding. The shape and thickness of the frame portion and the pitch of the midribs are determined by a strength analysis method. Preferably, the thickness of the frame portion is approximately 5 to 10 mm, the thickness of the midribs is approximately 4 to 8 mm, and the inner diameter of the cavity portion is approximately 20 to 50 mm.

The outside of the core material 660 is covered by the highly air-permeable elastic cushioning body 656, and the outside of the cushioning body 656 is covered by the highly air-permeable surface material 658. Note that an engaging portion 664a formed on the core material 660 is used to latch the sun visor main body 650 to the cabin interior of the automobile, and is therefore exposed to the exterior and not covered by the cushioning body 656 and surface material 658. The cushioning body 656 and surface material 658 may be constituted similarly to the cushioning material 606 and surface material 608 of the sun visor SU1 described above. The cushioning body and surface material are both formed to be highly air-permeable, and therefore sound waves are taken into the interior of the sun visor easily. The JIS L1096-defined air permeability of the cushioning body 656 is preferably at least 6.0 cc/cm$^2$/sec, and more preferably at least 8.0 cc/cm$^2$/sec. Thus, sound waves are taken into the interior of the cushioning body sufficiently, and a sufficient sound absorption quality is obtained.

The elastic cushioning body 656 has a thickness of at least 3 mm, a JIS L1096-defined compressibility between 5 and 25%, and a JIS L1096-defined compressive elasticity modulus of at least 70% (less than 100%). The cushioning body 656 has a sound absorbing function and a function for making the indentations of the core material 660 on the inside of the cushioning body difficult to sense when the passenger grips the sun visor in order to manipulate the sun visor. Accordingly, the cushioning body preferably has a high compression-related modulus of elasticity, and as a result of sensory analysis, it was learned that the compressive elasticity modulus should be set at 70% or more. In so doing, the cushioning body is not crushed when the sun visor is gripped at one end by a passenger in order to manipulate the sun visor, and the indentations of the core material are not felt by the fingertips of the passenger. It was also learned that the compressibility is preferably set between 5 and 25%.

The JIS L1096-defined air permeability of the surface material 658 is set at no less than 2.0 cc/cm$^2$/sec, preferably no less than 6.0 cc/cm$^2$/sec, and more preferably no less than 8.0 cc/cm$^2$/sec. Thus, sound waves are taken into the interior of the sun visor sufficiently, and a sufficient sound absorption quality is obtained. The main function of the surface material 658 is to ensure the design quality of the sun visor, but the surface material 658 is also used to protect the cushioning body 656 and make fine adjustments to the air permeability of the cushioning body 656.

When the cushioning body 656 is formed in nonwoven fabric using a needle punch method, the surface material 658 is also formed in nonwoven fabric using a needle punch method, and the two are integrated through lamination, a favorable texture is obtained when the surface of the sun visor main body is touched, and hence this formation method is preferable. Alternatively, the cushioning body may be formed by blowing fibers, fiber deposition through dispersal, joining fibers using a binder, and so on.

Fibers formed to have a comparatively high melting point, such as polyester or polyamide, may be used for the surface material. When fibers having a favorable design quality, such as dyed fibers or fibers subjected to crimping processing, are used in order to enhance the design quality, the appearance of the sun visor is improved, and hence these fibers are preferably used. Fibers having a diameter between 2 and 30 decitex and preferably between 3 and 15 decitex, and a fiber length between 30 and 80 mm and preferably between 38 and 76 mm, are suitable. The cushioning body is constituted by a mixture of fibers subjected to high crimping or hollow processing to provide bulkiness, which serve as a base material, and low-melting fibers (denatured polyester fibers, polypropylene fibers, polyamide fibers) dispersed in a proportion of 30 and 70%. The weight of the cushioning body per unit area is between 100 and 2000 g/m$^2$, and preferably between 500 and 1500 g/m$^2$. The thickness of the cushioning body is preferably at least 3 mm.

By forming the fibers of the surface material part and the fibers of the cushioning body part in web-form and performing needling thereon, nonwoven fabric is formed. The needle-punched nonwoven fabrics are then overlapped and needled so that the two layers are laminated and integrated. At this time, low-density needling using needles with few barbs is performed on the cushioning body part in order to reduce the compactness of the fibers, whereas high-density needling using needles having a comparatively large number of barbs is performed on the surface material part to increase the bonds between the fibers. Hence, of the cushioning material and surface material, the cushioning material is formed in nonwoven fabric using a needle punch method in which comparatively low-density needling is performed, and the surface material is formed in nonwoven fabric using a needle punch method in which comparatively high-density needling is performed. The two materials are then laminated and integrated. As a result, the surface material and cushioning body can be integrated with the surface material part formed to be thin and flat and the cushioning part formed to be bulky and have a high modulus of elasticity.

Low-melting fibers may be blended into the cushioning body and surface material.

Note that even without the surface material, the sun visor effectively reduces infiltrating sound entering the ears of the passenger during everyday driving when there is no need for glare protection while maintaining a favorable degree of rigidity and a high level of safety, thereby improving quietness while traveling.

(5) FOURTH EMBODIMENT (5-1) Constitution of Sound Absorbing Structure for Automobile In a sound absorbing structure ST11 for a road-running automobile according to this embodiment, a plate-form member 426 formed with through holes 427 is inserted into the recessed portion 23 from the cabin side and disposed so as to form a hollow portion H11 which causes sound entering the recessed portion through the through holes to resonate. The hollow portion is formed as an enclosed space except for the through hole 427 parts. The recessed portion 23 is formed in an ornamental portion of the interior base material 22 at a depth which anticipates the thickness of the plate-form member 426 and the hollow portion H11 from the main surface 22*a*.

Figure 19:
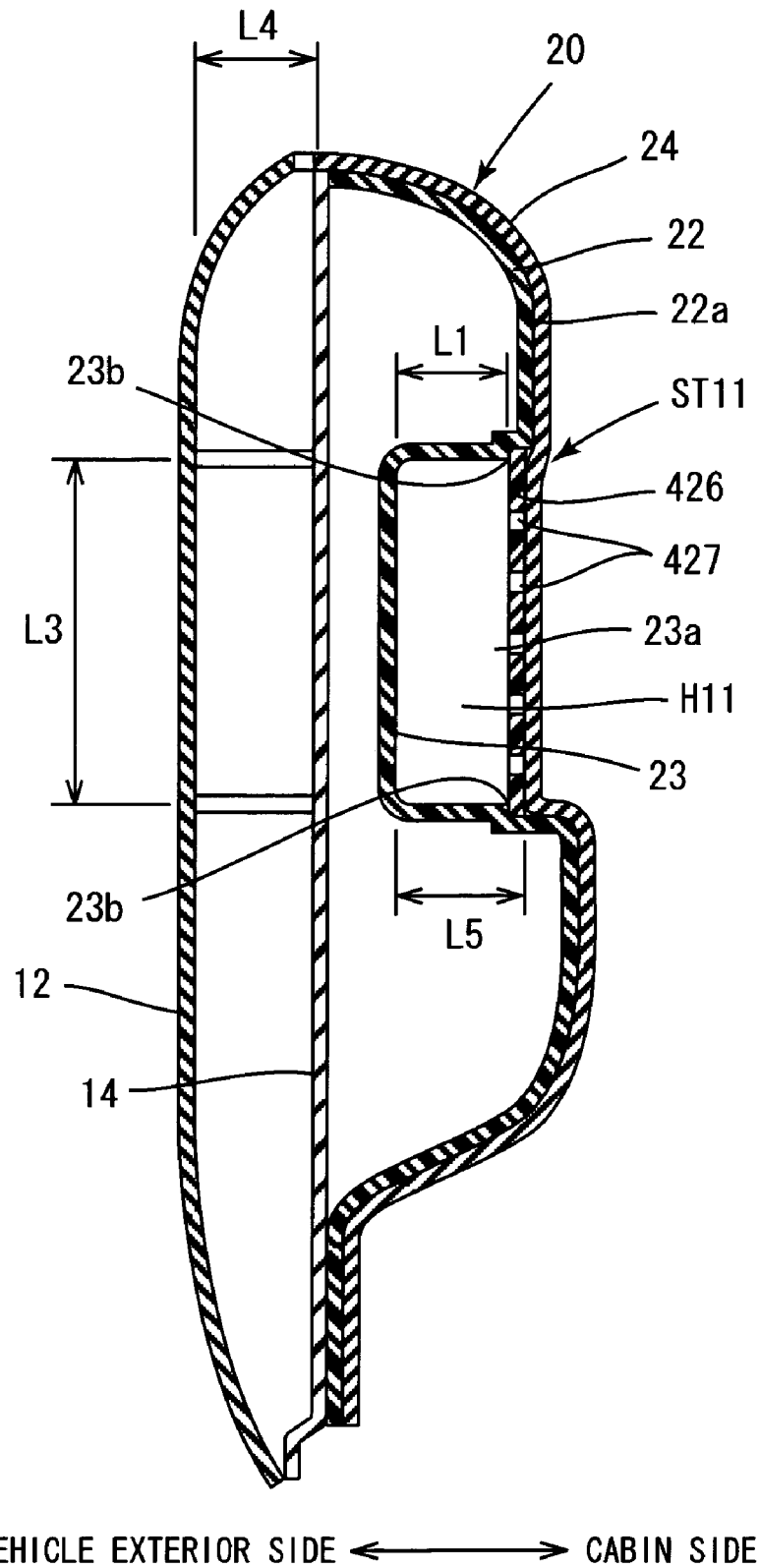
FIG. 19 is an exemplary illustration of a vertical sectional view showing the main parts of a driving seat door according to a fourth embodiment from the position of A1-A1 in FIG. 1.

FIG. 19 shows the sound absorbing structure ST11, in which the recessed portion 23 is formed by moving a part of the main surface 22*a* of the interior base material back from the main surface 22*a*, the flat plate-form member 426 is inserted into the recessed portion 23 from the cabin side and disposed so as to form the hollow portion H11 in the recessed portion, and the main surface 22*a* of the interior base material and the plate-form member 426 are covered continuously by the surface material 24 which possesses high air permeability (low air resistance).

The body panels of the first embodiment may be used as the body panels 12, 14. A substantially identical interior base material to that of the first embodiment may be used as the interior base material 22.

A stepped portion 23*a* formed in alignment with the outer periphery of the plate-form member 426 when the vehicle exterior is seen from the cabin interior is provided in the opening portion 23*b* of the recessed portion, and the recessed portion 23 is formed to be slightly smaller than the outer periphery of the plate-form member 426 on the vehicle exterior side of the stepped portion 23*b*. Thus, the plate-form member 426 is accommodated in the stepped portion 23*b* and does not move beyond the stepped portion toward the vehicle exterior side. In this embodiment, it is assumed that the plate-form member 426 is adhered and fixed to the stepped portion 23*b* using an adhesive, but the plate-form member 426 may be adhered and fixed to the stepped portion 23*b* using double-sided tape, or the stepped portion may be formed in a shape which enables engagement with the outer peripheral portion of the plate-form member such that the plate-form member is fixed to the stepped portion through engagement. Needless to say, the plate-form member may be fixed to the recessed portion without providing the stepped portion.

The size and depth L5 of the recessed portion 23 may be set identically to the size and depth of the first embodiment. Note that as the recessed portion becomes shallower, high-frequency sound is more likely to be absorbed, and as the recessed portion becomes deeper, low-frequency sound is more likely to be absorbed.

The gap between the interior base material 22 and the inner door panel 14 is approximately 0 to 60 mm at the main portion and approximately 0 to 30 mm at the recessed portion.

The surface material 24 may be identical to that of the first embodiment. Since the through holes 427 are formed in the plate-form member 426 from the surface material 24 to the hollow portion H11, infiltrating sound such as road noise and wind roar infiltrating the cabin interior enters the hollow portion H11 through the highly air-permeable surface material 24 and plate-form member 426. Here, the recessed portion 23 and plate-form member 426 constitute a Helmholtz resonator in which a resonance frequency component is attenuated and absorbed.

When the air permeability of the surface material is set at no less than 2.0 $cc/cm^2/sec$ (preferably no less than 6.0 $cc/cm^2/sec$), the sound absorption quality of the hollow portion H11 does not deteriorate, and hence the design quality of the cabin can be improved while maintaining a favorable sound absorption quality. It is assumed that the sound absorption quality is maintained substantially because substantially no sound waves traveling to the hollow portion from the cabin interior are reflected and the energy of the sound is absorbed sufficiently in the hollow portion.

As the material of the plate-form member 426, a thermoplastic resin (a type of synthetic resin) such as polypropylene (PP) or acrylonitrile butadiene styrene resin (ABS resin), various types of thermosetting resin (a type of synthetic resin), a metal, and so on may be used. Here, a favorable sound absorption quality is obtained when a synthetic resin member is used as the plate-form member having through holes.

The thickness of the plate-form member 426 is preferably between 0.5 and 10 mm. Sufficient rigidity is obtained at 0.5 mm or more, and a sufficiently low weight is obtained at 10 mm or less.

The size of the plate-form member 426 may be determined in accordance with the size of the recessed portion 23 in the interior base material.

The through holes 427 formed in the plate-form member 426 are substantially circular.

Figure 20:
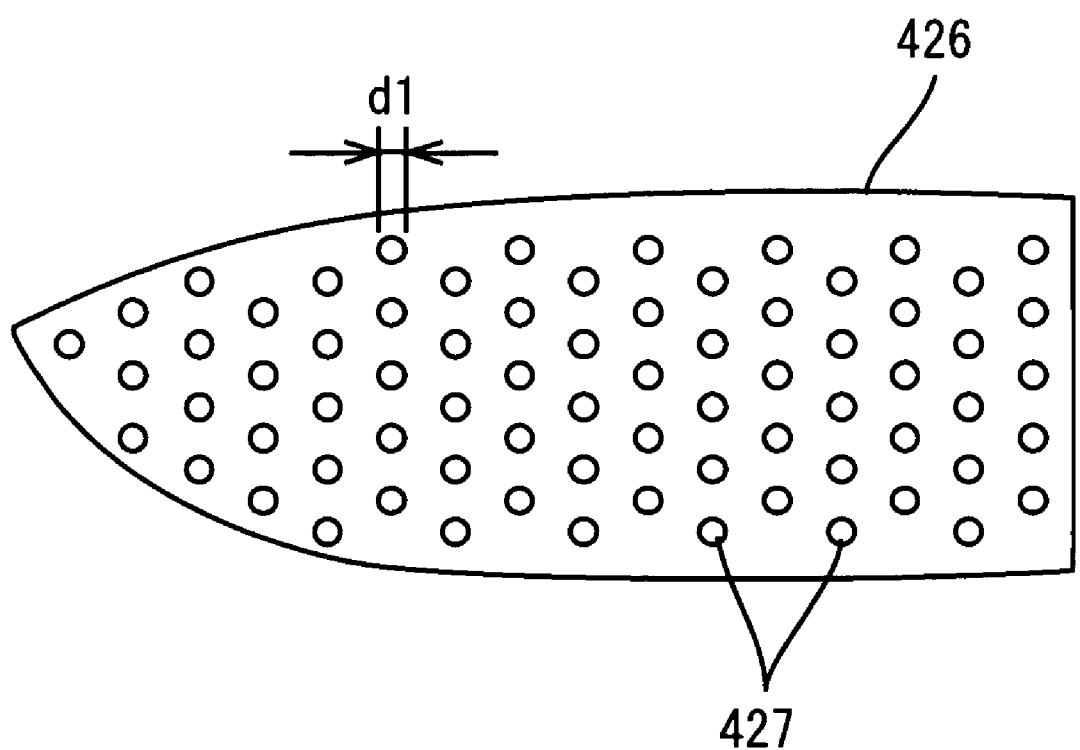
FIG. 20 is an exemplary illustration of a side view showing a resonance member from the same position as FIG. 1.

Typically, as shown in FIG. 20, when the numerous through holes 427 formed in the plate-form member 426 are dispersed evenly over the entire surface of the plate-form member 426, excluding the peripheral edges, a favorable sound absorption quality is obtained, but the through holes 427 may be offset in accordance with the shape of the interior material. For example, a large number of through holes may be disposed on the side near the position of the ears of the passenger, or a large number of through holes may be disposed on the side where sound waves infiltrate. Further, it is believed that the rigidity of the plate-form member can be improved by arranging the through holes in a staggered fashion, as shown in FIG. 20, rather than aligning the through holes vertically and horizontally.

The diameter (d1) of the through holes 427 formed in a large number in the plate-form member is preferably between 0.5 and 5.0 mm, and more preferably between 1.0 and 5.0 mm. When the diameter is no less than 0.5 mm (preferably no less than 1.0 mm), the permeability of the sound waves improves, ensuring a favorable sound absorption quality, and when the diameter is no more than 5.0 mm, sufficient rigidity is obtained in the plate-form member.

If the ratio of a total area S2 of the projected area of the through holes 427 to a projected area S1 of the plate-form member 426 when projected from the cabin side to the vehicle exterior side is referred to as a plate-form member opening ratio p=(S2/S1), then the opening ratio of the plate-form member is preferably set at 2 to 30% in percentage terms. By setting the opening ratio at no less than 2%, a favorable sound absorption effect is obtained, and by setting the opening ratio at no more than 30%, sufficient rigidity is obtained in the plate-form member. The projected area S1 of this embodiment corresponds to the surface area of the plate-form member 426 depicted in FIG. 20, and the projected area S2 corresponds to the sum total of the surface area of the through holes 427 depicted in FIG. 20.

Various well-known methods may be employed to form the plate-form member 426. For example, the plate-form member 426 may be formed by supplying a heater-equipped injection molding machine with a particulate thermoplastic resin raw fabric, such as polypropylene, heating and melting the raw fabric using the heater, injecting the molten thermoplastic resin into a predetermined die in the shape of the plate-form member 426, and cooling the die to harden the resin. When the plate-form member 426 is formed using a thermosetting resin, it may be formed by injecting a liquid thermosetting resin into the predetermined die and then heating the die so that the resin is hardened, or by adding a curing agent to a liquid thermosetting resin, injecting the resin into the die, and leaving the resin to harden for a predetermined time period. Needless to say, the plate-form member 426 may also be formed by means of press molding or the like.

The thickness L1 of the hollow portion in the direction linking the cabin side and the vehicle exterior side may be set between approximately 3 and 100 mm, and preferably between approximately 3 and 60 mm. At approximately 3 mm or more, a favorable sound absorption quality is obtained, and at approximately 100 mm or less (preferably approximately 60 mm or less), the hollow portion space can be secured easily.

On the basis of the experiment results shown in FIG. 3, the sound absorbing structure was provided by forming the recessed portion on the cabin interior side of the door trim interior base material above a passenger seating surface of a seat having a seating portion, the upper surface of which forms this passenger seating surface, and forming the hollow portion using the plate-form member having the through holes.

Figure 21:
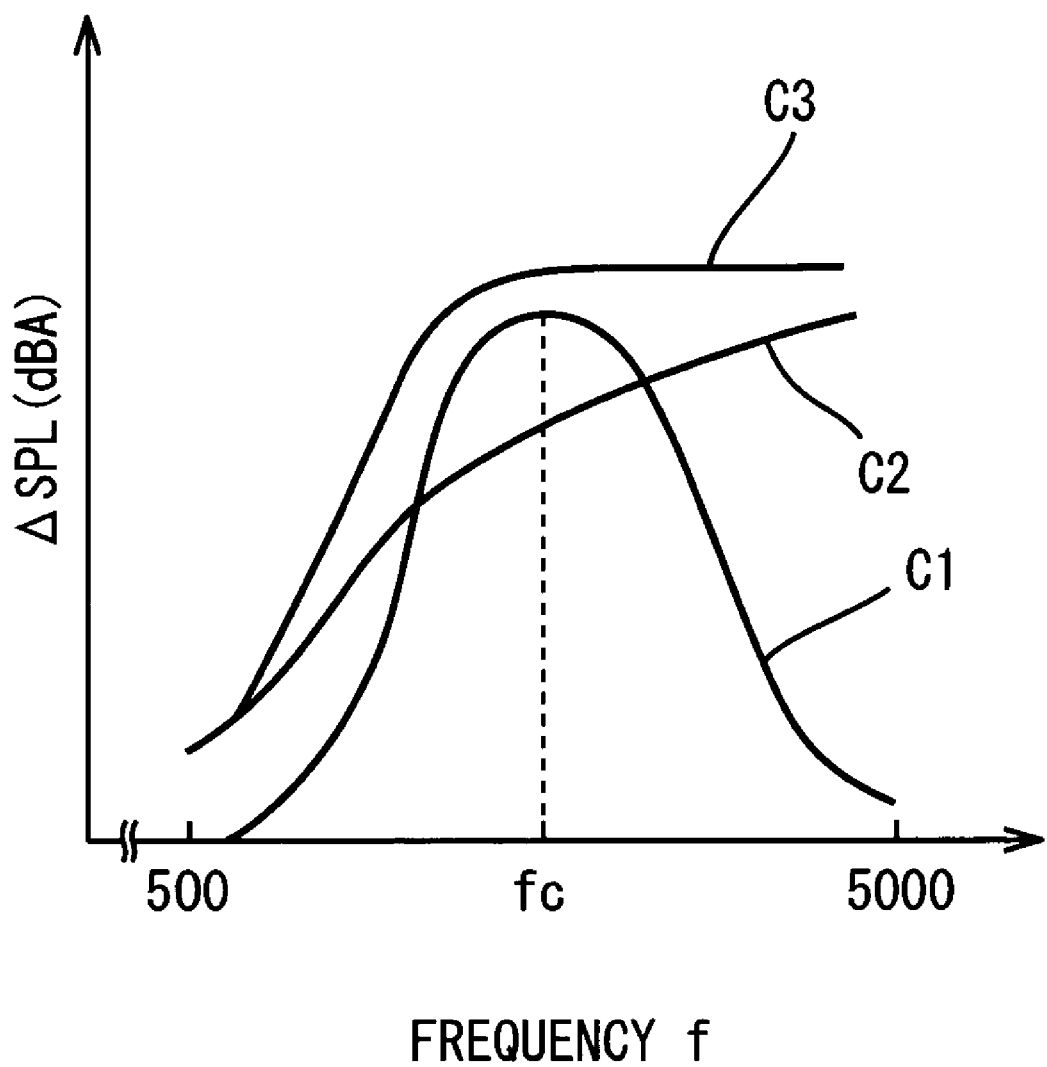
FIG. 21 is an exemplary illustration of a view showing a graph which illustrates the sound absorption characteristic of the sound absorbing structure.

The sound absorption characteristic of the sound absorbing structure ST11 is shown on the graph in FIG. 21. The abscissa of the graph shows the frequency f (Hz), and the ordinate shows a reduction rate $\Delta$SPL (dBA) in the A-weighted sound pressure level (noise level) SPL. The abscissa is a logarithmic axis. The frequency-corresponding $\Delta$SPL of the sound absorbing structure ST11 is shown by a curve C1. As shown by the curve C1, the sound absorption characteristic when sound is absorbed by the hollow portion H11 is distributed centering on a central absorption frequency (a resonance frequency fc). Accordingly, infiltrating sound infiltrating the cabin interior is absorbed about the frequency fc.

Here, the resonance frequency fc (Hz) serving as the central absorption frequency is determined by Numeral 1

$$fc = \frac{c}{2\pi} \sqrt{\frac{p}{(t+0.8\phi)Lt}} \text{ (Hz)} \quad (1)$$

where the opening ratio of the plate-form member is p, the thickness of the plate-form member is t (m), the diameter of the through holes is $\phi$ (m), the thickness of the hollow portion is Lt (m), and the acoustic velocity is c (m/sec). Hence, by adjusting the parameters p, t, $\phi$, Lt, sound infiltrating the cabin interior can be absorbed about a desired frequency, enabling an improvement in the quietness of the cabin interior.

The following method may be employed to form the sound absorbing structure ST11.

First, the interior base material 22 is molded in a predetermined shape having the recessed portion 23, and the molded interior base material 22 is attached to the inner panel 14. The plate-form member 426 is then formed into a predetermined shape having the through holes 427. Next, the plate-form member 426 is fitted into the stepped portion 23b of the recessed portion and fixed to the opening portion 23a of the recessed portion. As a result, the hollow portion H11 for causing sound entering through the through holes 427 to resonate is formed. At this stage, the sound absorbing structure functions as the sound absorbing structure of the present invention. However, in this embodiment, the highly air-permeable surface material 24 is adhered to the cabin side surface of the main surface 22a of the interior base material and the plate-form member 426, thereby forming the sound absorbing structure ST11.

(5-2) Actions and Effects of Sound Absorbing Structure for Automobile

Infiltrating sound, such as road noise, wind roar, and engine noise, which infiltrates the cabin interior passes through the highly air-permeable surface material 24 either directly or upon reflection on various components in the cabin interior, and thus enters the hollow portion H11 through the through holes 427. The hollow portion H11 attenuates the energy of the infiltrating sound that has entered through the through holes 427 by causing the infiltrating sound to resonate in accordance with Helmholtz resonator theory, and hence the infiltrating sound entering the cabin interior is reduced. Further, the plate-form member 426 is inserted into the recessed portion 23 in the interior base material, and hence a favorable design quality and a high level of safety are achieved. Therefore, in the road-running automobile, infiltrating sound such as road noise and wind roar entering the ears of a passenger can be reduced effectively by means of a simple constitution, in which a resonance member is inserted into the recessed portion in the interior base material to form a hollow portion, while achieving a favorable design quality and a high level of safety, thus enabling an improvement in quietness while traveling. Furthermore, the air permeability of the surface material is sufficient, and therefore a favorable design quality can be obtained in the cabin interior with no reduction in the sound absorption effect.

Further, the sound absorbing structure is formed in the door trim interior material above the seating surface, and hence sound is absorbed in a position near the ears of the passenger. Therefore, the sound absorption quality can be improved more effectively, enabling a further improvement in quietness while traveling.

Note that the resonance member formed with the through holes may be a plate-form member having a curved cross-section, such as a wave-form member, or a member having a curved surface, instead of a flat plate-form member. The through holes formed in the resonance member may be elliptical, polygonal, or another shape rather than being substantially circular. Furthermore, only one through hole may be formed in the resonance member.

The sound absorbing structure may be provided in the various locations described in the first embodiment.

Figure 22:
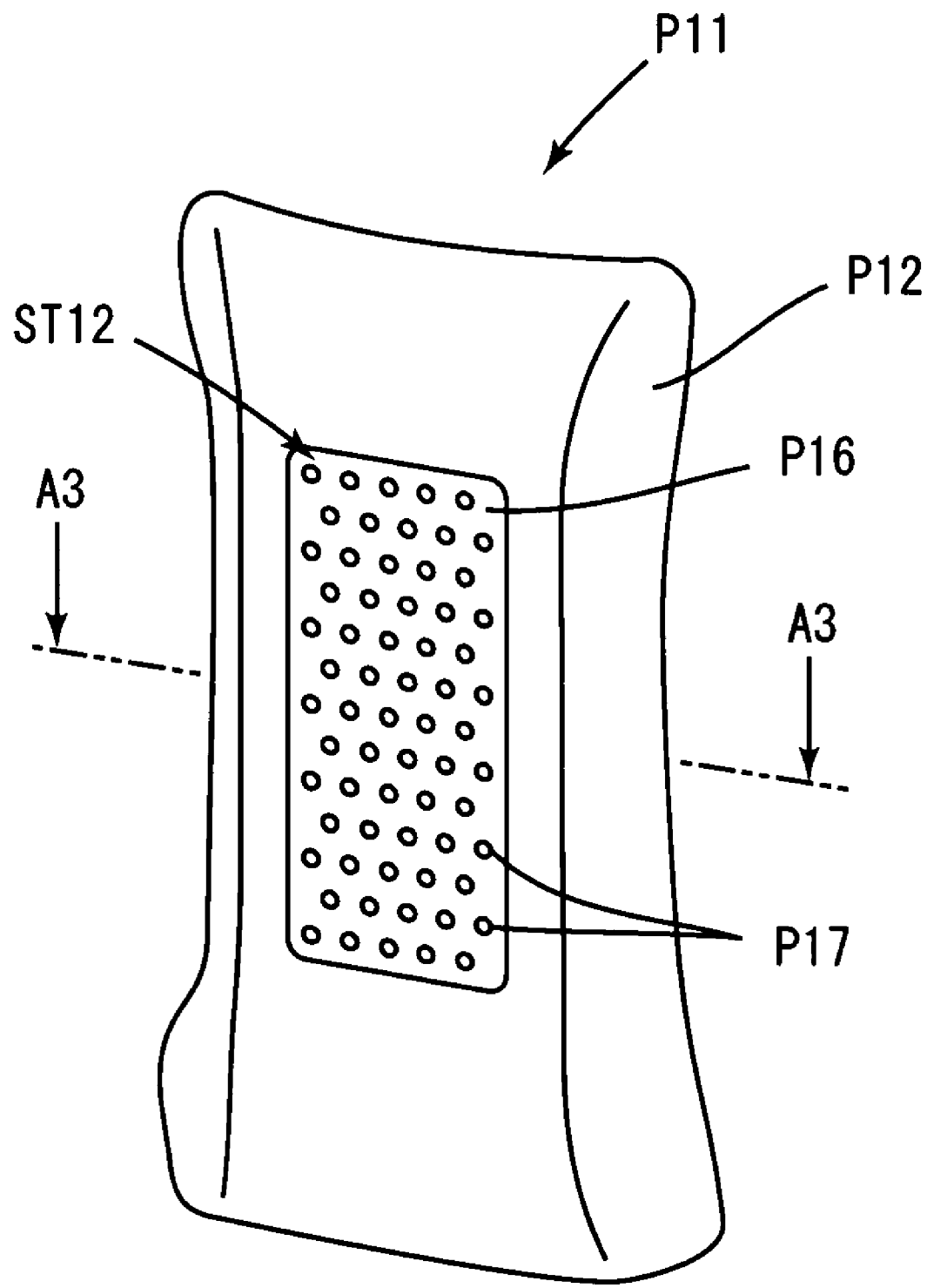
FIG. 22 is an exemplary illustration of a perspective view showing a pillar garnish interior material provided with the sound absorbing structure of the present invention.
Figure 23:
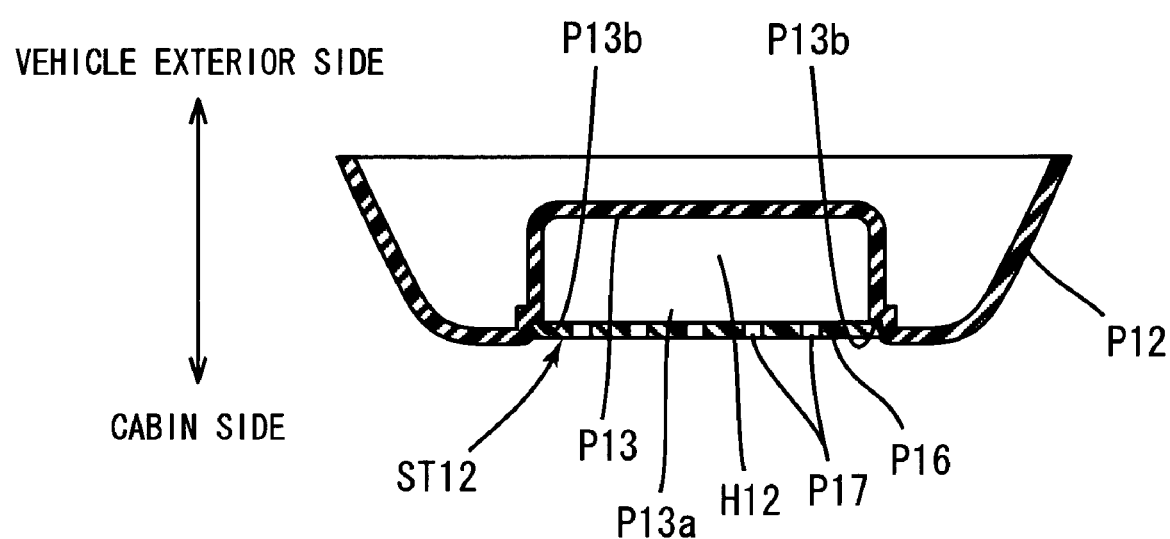
FIG. 23 is an exemplary illustration of a horizontal sectional view showing the pillar garnish interior material from the position of A3-A3 in FIG. 22.

FIG. 22 is a perspective view showing an example in which a sound absorbing structure ST12 of the present invention is provided in a pillar garnish interior material P11, and FIG. 23 is a horizontal sectional view showing the pillar garnish interior material P11 from the position of A3-A3 in FIG. 22. In this modified example, a recessed portion P13 having a stepped portion P13b is formed in the cabin side of an interior base material P12 of the pillar garnish interior material. A flat plate-form member (resonance member) P16 formed with a large number of through holes P17 is inserted into the recessed portion from the cabin side and fitted into the stepped portion P13b. An opening portion P13a of the recessed portion is disposed so as to form a hollow portion H12 in the recessed portion, which causes sound entering through the through holes P17 to resonate.

The material and thickness of the interior base material, the depth of the recessed portion, the material and thickness of the plate-form member, the arrangement, diameter, and opening ratio of the through holes, and the thickness of the hollow portion (corresponding to L1 in FIG. 19) may be set identically to the conditions of the third embodiment. The size of the recessed portion when the vehicle exterior is viewed from the cabin interior and the size of the plate-form member when the vehicle exterior is viewed from the cabin interior may be determined in accordance with the size of the interior base material within a size range that is smaller than the interior base material. In this modified example, no surface material is affixed to the surface, but a surface material may be affixed to enhance the design quality.

The recessed portion P13 is formed in the pillar garnish interior material P11 on the upper side of the seating surface (73a in FIG. 1) of the seat.

According to this constitution also, infiltrating sound infiltrating the cabin interior enters the hollow portion H12 through the through holes P17, and the energy thereof is attenuated by resonance produced in accordance with Helmholtz resonator theory. Further, the plate-form member P16 is inserted into the recessed portion P13 in the interior base material, and hence a favorable design quality and a high level of safety are achieved. Therefore, infiltrating sound entering the ears of a passenger can be reduced effectively while achieving a favorable design quality and a high level of safety.

(6) FIFTH EMBODIMENT

Figure 24:
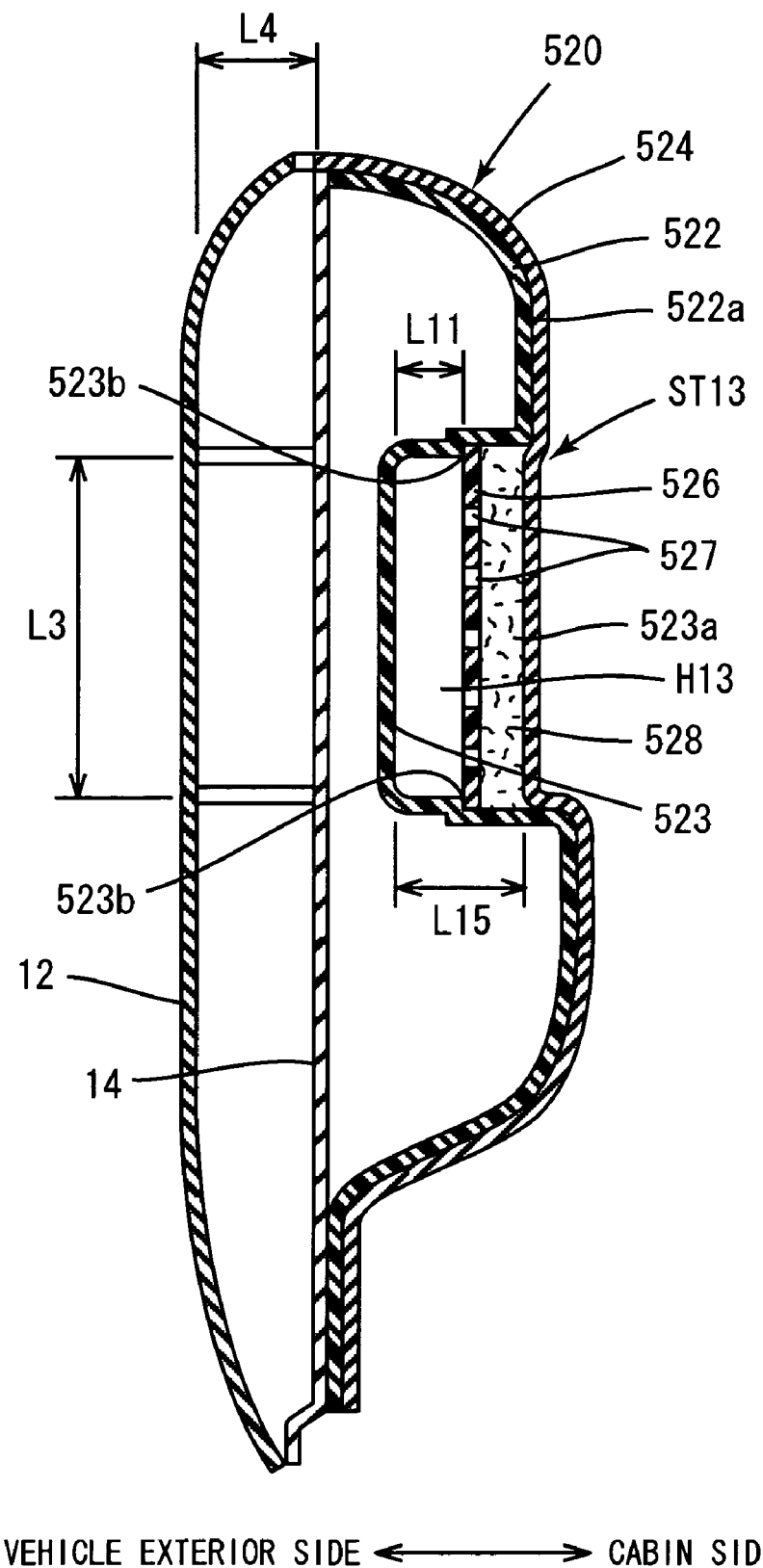
FIG. 24 is an exemplary illustration of a vertical sectional view showing the main parts of a driving seat door according to a fifth embodiment from a position corresponding to A1-A1 in FIG. 1.

FIG. 24 is a vertical sectional view showing the main parts of a driving seat door from a position corresponding to A1-A1 in FIG. 1. In a door trim interior material 520 of this embodiment also, a recessed portion 523 is formed on the cabin side of an interior base material 522 as a recess from a main surface 522a of the interior base material, and an opening portion 523a is provided with a stepped portion 523b having a shape which aligns with the outer periphery of a plate-form member 526 when the vehicle exterior is seen from the cabin interior. The plate-form member (resonance member) 526, which is formed with a large number of through holes 527, is inserted into the recessed portion 523 from the cabin side and fitted into the stepped portion 523b so as to form a hollow portion H13 in the recessed portion 523. In a sound absorbing structure ST13 of this embodiment, a sound absorbing material 528 is disposed on the cabin side of the plate-form member 526, and the main surface 522a of the interior base material and the sound absorbing material 528 are covered continuously with a surface material 524 having high air permeability (low air resistance).

The material and thickness of the interior base material 522, the size L2×L3 of the recessed portion 523, the material and air permeability of the surface material 524, the material and size of the plate-form member 526, the arrangement, diameter d1, and opening ratio p of the through holes 527, and the gap L4 between the inner base material 522 and the inner door panel 14 may be set identically to the conditions of the fourth embodiment.

The thickness L11 of the hollow portion H13 in the direction linking the cabin side and vehicle exterior side may be set between approximately 3 and 100 mm, and preferably between approximately 3 and 60 mm, for identical reasons to those described in the fourth embodiment.

The depth L15 of the recessed portion in the interior base material may be set to a length obtained by adding the thickness of the plate-form member 526 and the thickness of the sound absorbing material 528 in the direction linking the cabin side and the vehicle exterior side, to the thickness L11 of the hollow portion. Note that as the recessed portion becomes shallower, high-frequency sound is more likely to be absorbed, and as the recessed portion becomes deeper, low-frequency sound is more likely to be absorbed.

Any material having a sound absorption effect may be used as the sound absorbing material 528, and a porous sound absorbing material may be employed. A synthetic felt made of PET fibers, PP fibers, wool fibers, or the like, a resin foamed body possessing air permeability, or a similar material may be used as the sound absorbing material. A foamed synthetic resin formed by gathering and foaming a large number of tubular synthetic resin particles may also be used. The individual tubular resin particles impregnated with a foaming material may be formed in a cylindrical shape having an inner diameter d of approximately 2 to 4 mm, an outer diameter D (D>d) of approximately 4 to 6 mm, and a length L of approximately 3 to 6 mm. These parameters affect the sound absorption performance of the sound absorbing material, and by setting the inner diameter d, outer diameter D, and length L within these ranges, the sound absorbing material exhibits an extremely favorable sound absorption performance. PEPP (porous EPP), manufactured by JSP Corporation, may be used as the tubular resin particles. Needless to say, the tubular resin particles may take a form other than a cylindrical form, such as a form having a cross-section which is flattened into a substantially elliptical shape.

The size of the sound absorbing material 528 may be determined in accordance with the size of the recessed portion 523 in the interior base material.

In the fifth embodiment also, the sound absorbing structure ST13 is manufactured by forming the recessed portion 523 in the door trim interior material 520 above the seating surface of the seat, forming the hollow portion H13, and disposing the sound absorbing material 528 in the opening portion 523a of the recessed portion. As a result, infiltrating sound entering the ears of the passenger can be effectively reduced, enabling an improvement in quietness while traveling.

The sound absorption characteristic of the hollow portion H13 is distributed centering on the resonance frequency fc determined according to Equation (1) above. The frequency characteristic of the sound absorbed by the hollow portion H13 and the frequency characteristic of the sound absorbed by the sound absorbing material 528 differ from each other due to different sound absorption principles, but by determining the parameters p, t, $\phi$, Lt of Equation (1) such that the resonance frequency fc differs from the main sound absorption frequency range of the sound absorbing material 528, and forming the recessed portion 523 and plate-form member 526 at the determined parameters, sound such as road noise is absorbed by the sound absorbing material 528 mainly in the sound absorption frequency range, and the resonance frequency component is absorbed mainly in the hollow portion H13. Note that in FIG. 21, a curve C2 shows the frequency-corresponding reduction rate $\Delta$SPL in the A-weighted sound pressure level when felt is used as the sound absorbing material, while a curve C3 shows the frequency-corresponding reduction rate $\Delta$SPL in the A-weighted sound pressure level when felt and the hollow portion H13 are used in conjunction. In the example shown in the drawing, the comparatively high frequency components of the infiltrating sound are absorbed by the felt, whereas the comparatively low frequency components are absorbed by the hollow portion H13, and hence when felt and the hollow portion H13 are used in conjunction, sound can be absorbed in a wide frequency range.

Next, the actions and effects of the fifth embodiment will be described.

Infiltrating sound infiltrating the cabin interior passes through the highly air-permeable surface material 524 either directly or upon reflection on various components in the cabin interior, and then passes through the sound absorbing material 528. As a result, the energy of the infiltrating sound is attenuated in accordance with the sound absorption characteristic of the sound absorbing material 528, as shown in FIG. 21. When a porous sound absorbing material is used, the infiltrating sound is diffusely reflected upon entering the narrow holes in the sound absorbing material, and hence the energy of the infiltrating sound is attenuated, enabling a favorable sound absorption quality. Having passed through the sound absorbing material 528, the infiltrating sound enters the hollow portion H13 through the through holes 527, where the energy thereof is attenuated about the resonance frequency fc by means of resonance produced in accordance with Helmholtz resonator theory. Accordingly, sound is absorbed in a wider frequency range than a case in which sound is absorbed only by the hollow portion. Furthermore, the plate-form member 526 and sound absorbing material 528 are inserted into the recessed portion 523 in the interior base material, and therefore a favorable design quality and a high level of safety are obtained. Thus, in the road-running automobile, infiltrating sound entering the ears of a passenger can be reduced effectively while maintaining a favorable design quality and a high level of safety, enabling an improvement in quietness while traveling. Moreover, the air permeability of the surface material is sufficiently large, and hence a favorable design quality can be obtained in the automobile interior with no reduction in the sound absorption effect.

Note that the various modified examples of the resonance member, various modified examples of the through holes, and modified examples of the location of the sound absorbing structure, described in the fourth embodiment, may also be applied to the fifth embodiment. When the sound absorbing structure is provided in the pillar garnish interior material, as shown in FIG. 23, the plate-form member P16 may be inserted slightly further toward the back of the recessed portion P13 and the sound absorbing material may be disposed on the cabin side of the plate-form member P16.

Figure 25:
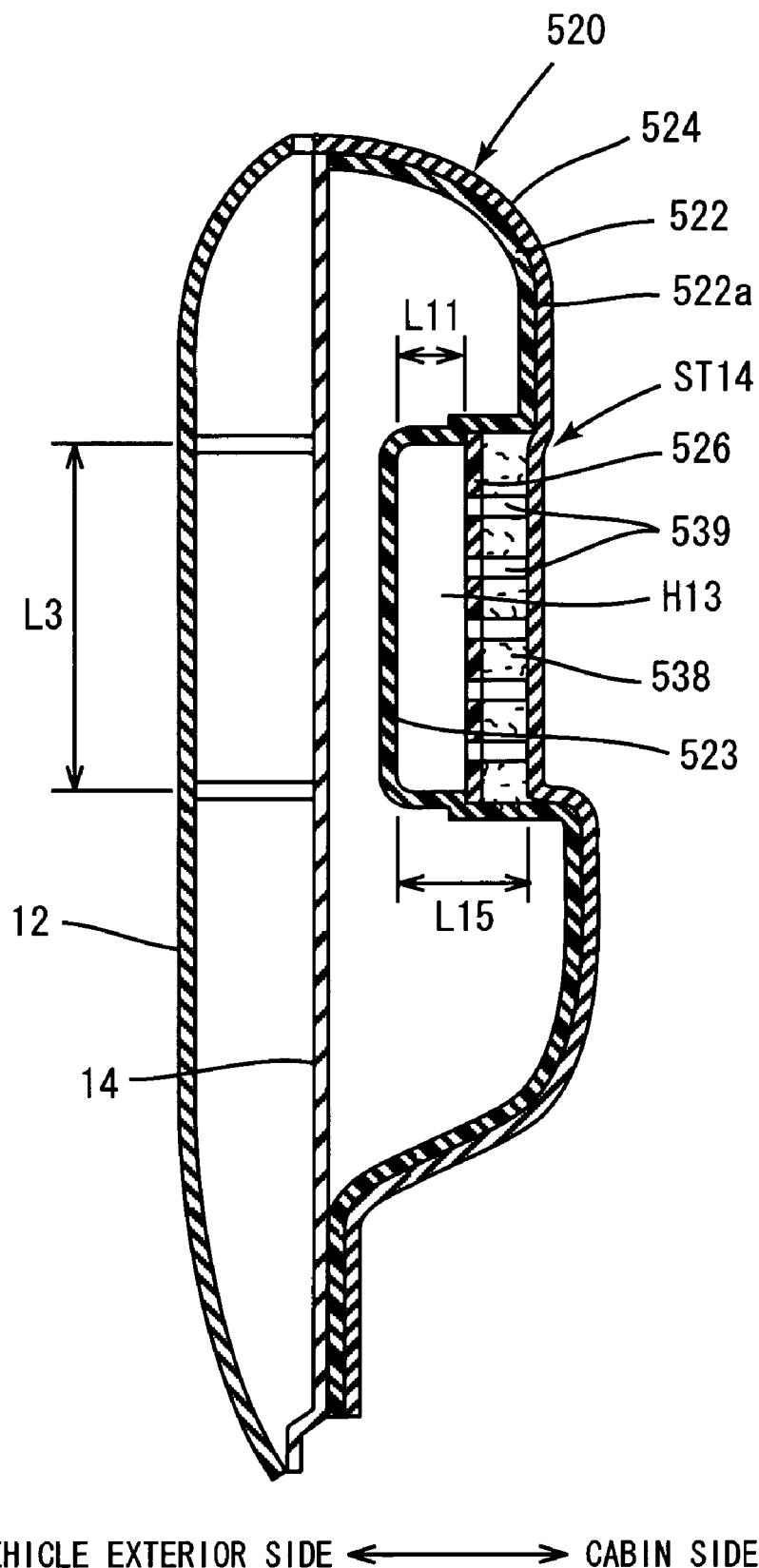
FIG. 25 is an exemplary illustration of a vertical sectional view showing the main parts of a driving seat door according to a modified example from a position corresponding to A1-A1 in FIG. 1.

Further, a perforated sound absorbing material 538 formed with through holes 539 linking the cabin side and the vehicle exterior side on the opposite side of the cabin side may be used as the sound absorbing material, as in a sound absorbing structure ST14 shown in FIG. 25. In the example shown in the drawing, the sound absorbing material 538 is formed with a plurality of the through holes 539. When infiltrating sound infiltrating the cabin interior passes through the highly air-permeable surface material 524 and the perforated sound absorbing material 538, the infiltrating sound enters the through holes 539 and is reflected repeatedly, whereby the energy of the infiltrating sound attenuates. Thus, a favorable sound absorption quality is obtained. Therefore, infiltrating sound entering the ears of a passenger can be reduced effectively while maintaining a favorable design quality and a high level of safety, enabling an improvement in quietness while traveling.

(7) EXAMPLES OF FOURTH AND FIFTH EMBODIMENT

THIRD EXAMPLE

A polypropylene resin door trim base material with a thickness of 2.5 mm was used as the interior base material. The interior base material was formed by molding the door trim base material into a shape having a recessed portion in the central portion of the front door trim. The recessed portion was formed with a rectangular opening portion, a length L2 in the automobile front-rear direction of 600 mm, a length L3 in the automobile height direction of 300 mm, and an average depth of 22.5 mm.

A polypropylene resin plate with a thickness of 2.5 mm was used as the resonance member. The polypropylene resin plate was provided with a large number of through holes formed evenly in a staggered form such as that shown in FIG. 20 at a diameter d1 of 2.5 mm and an opening ratio p of 16%. The cabin side surface of the resonance member was aligned with the main surface of the interior base material, whereupon the resonance member was attached and fixed to the opening portion of the recessed portion. The average thickness L1 of the hollow portion formed by the resonance member and recessed portion was 20 mm.

Needle-punched nonwoven fabric made of polyester fiber was used as the surface material. The surface material had a mass per unit area of 400 g/m$^2$ and an air-permeability of 45 cc/cm$^2$/sec. The main surface of the interior base material and the cabin side surface of the resonance member were covered continuously by the surface material, and thus the test sample of the third example was formed.

FOURTH EXAMPLE

The interior base material, resonance member, and surface material were all constituted identically to those of the third example. Note, however, that the resonance member was inserted into the recessed portion and attached and fixed thereto such that the average thickness L11 of the hollow portion formed by the resonance member and recessed portion was 10 mm.

Polyester staple fibers having a density of 0.15 g/cm$^2$ were used as the sound absorbing material. The polyester staple fibers were laminated onto the cabin side surface of the resonance member to a thickness of 10 mm. The main surface of the interior base material and the cabin side surface of the resonance member were then covered continuously by the surface material, and thus the test sample of the fourth example was formed.

COMPARATIVE EXAMPLE

An identical polypropylene resin door trim base material to that of the third and fourth examples, having a thickness of 2.5 mm, was used as the interior base material. However, the interior base material was formed by molding the door trim base material into a shape not having the recessed portion of the present invention. Also, no resonance member was used. The same surface material as that of the third and second examples was used. The cabin side surface of the interior base material was covered by the surface material, and thus the test sample of the comparative example was formed.

Testing Method

The testing method used in the examples of the first and second embodiments was followed.

Test Results

Figure 26:
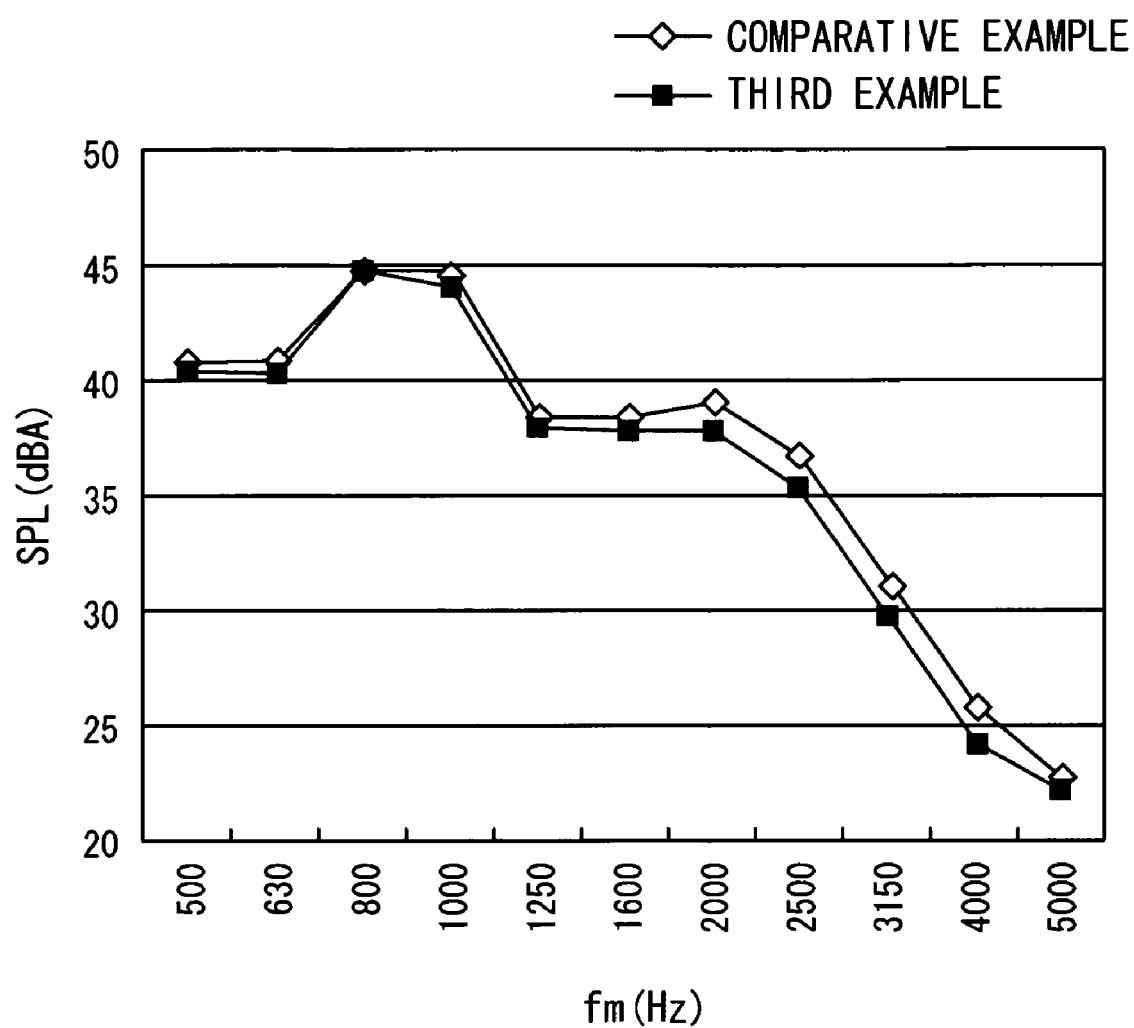
FIG. 26 is an exemplary illustration of a view showing a graph comparing the A-weighted sound pressure level in a position corresponding to the position of the ears of a driver in a third example and a comparative example.
Figure 27:
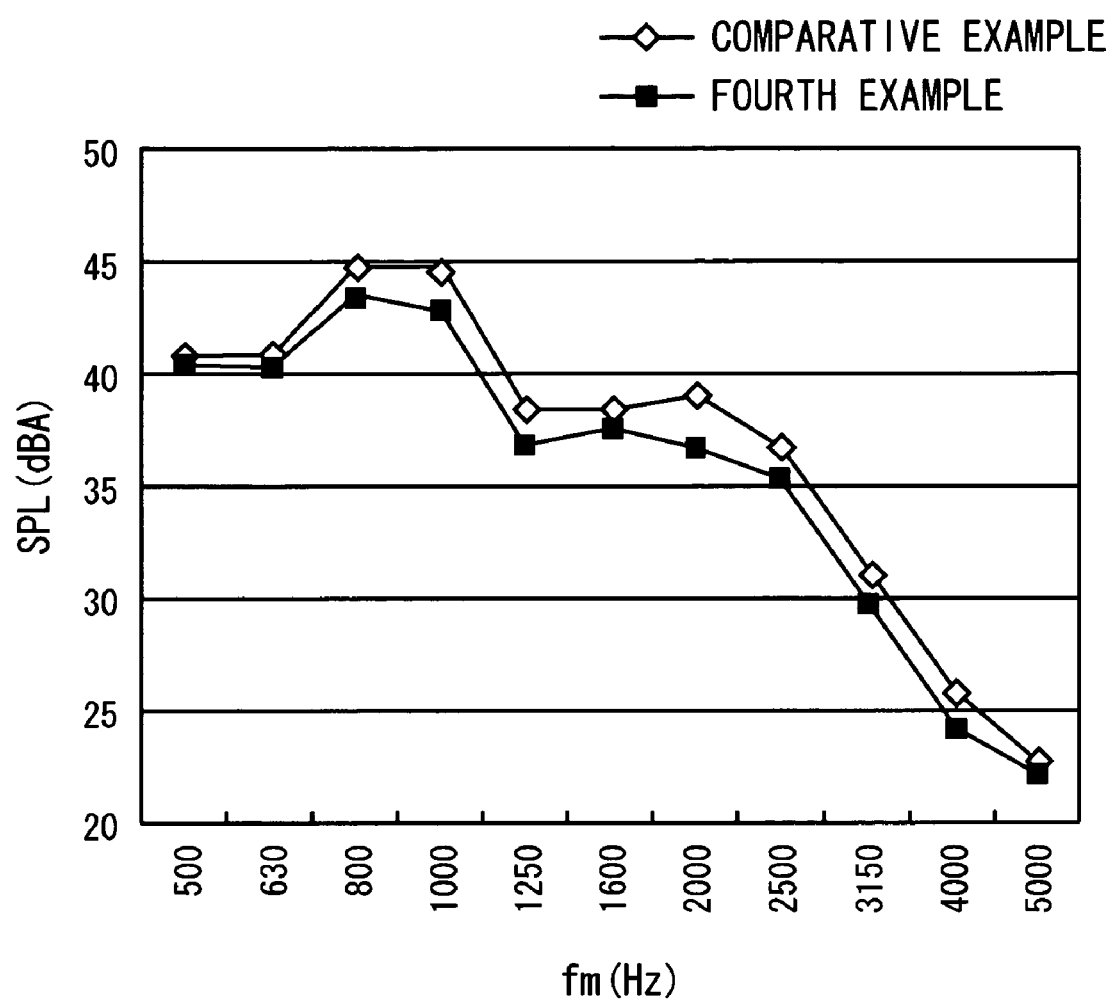
FIG. 27 is an exemplary illustration of a view showing a graph comparing the A-weighted sound pressure level in a position corresponding to the position of the ears of a driver in a fourth example and the comparative example.

FIG. 26 is a graph showing the A-weighted sound pressure level SPL (unit: dBA) in ⅓ octave frequency bandwidths (unit: Hz) in relation to the third example and the comparative example. FIG. 27 is a graph showing the A-weighted sound pressure level SPL (unit: dBA) in ⅓ octave frequency bandwidths (unit: Hz) in relation to the fourth example and the comparative example. In each graph, measured sound pressure level values are plotted at the center frequency fm of each ⅓ octave band.

In the third example, the sound pressure level became comparatively small at an fm of 1250 Hz and above, and hence it was confirmed that in a high-frequency region of 1250 Hz and above, a good sound absorption performance was obtained. Accordingly, it was confirmed that of the infiltrating sound, a specific frequency range component centering on the resonance frequency fc was absorbed by means of a simple constitution in which the resonance member is inserted into the recessed portion of the interior base material to form a hollow portion.

In the fourth example, the sound pressure level became comparatively small at an fm of 800 Hz and above, and hence it was confirmed that a good sound absorption performance was obtained in a wider frequency range than that of the third example. Accordingly, it was confirmed that a compound effect was produced by the hollow portion and sound absorbing material, enabling infiltrating sound to be absorbed over a wider frequency range.

(8) Sixth Embodiment

Figure 28:
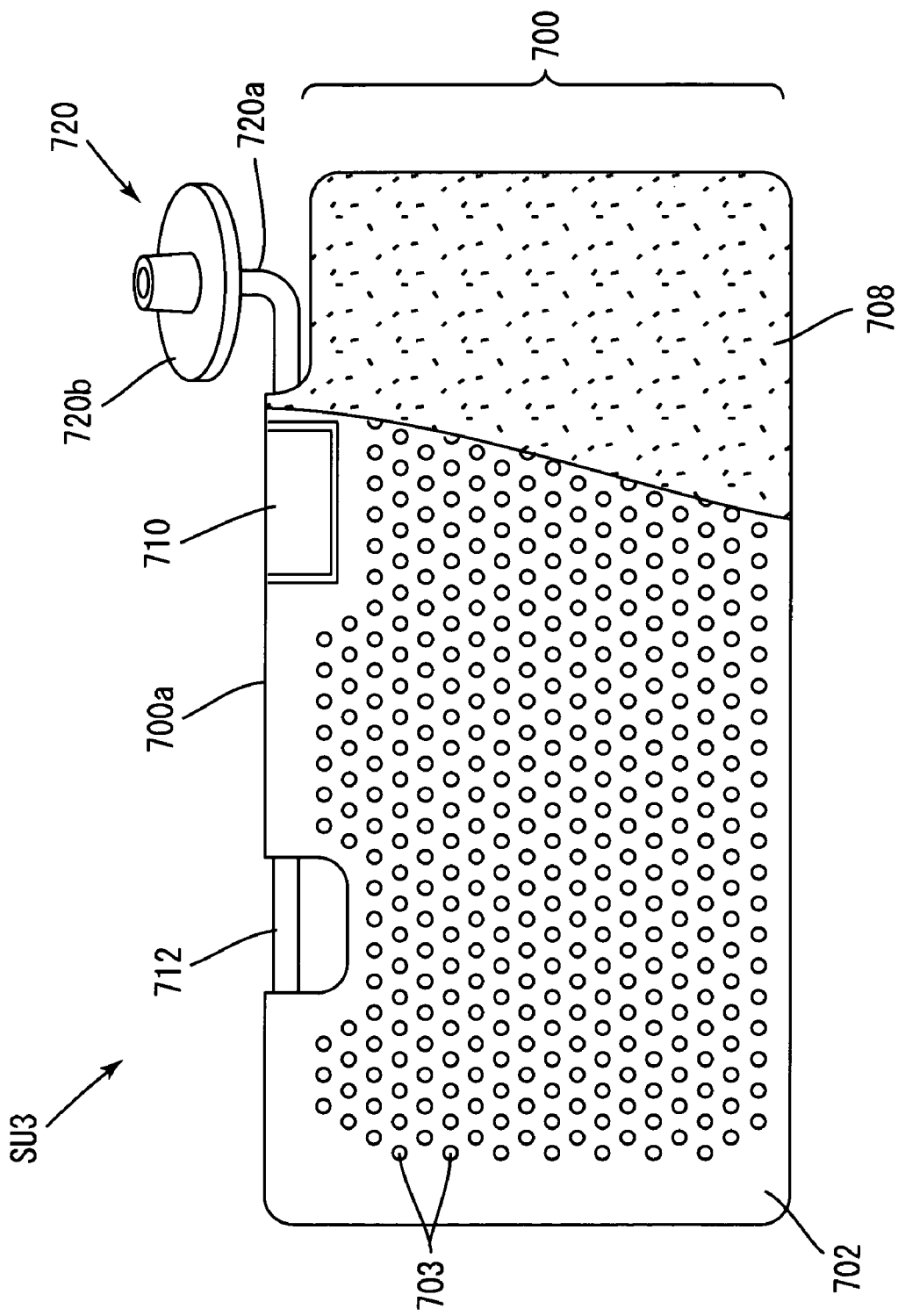
FIG. 28 is an exemplary illustration of a front view showing a partially fractured cross-section of a sun visor SU3 according to a sixth embodiment.
Figure 31:
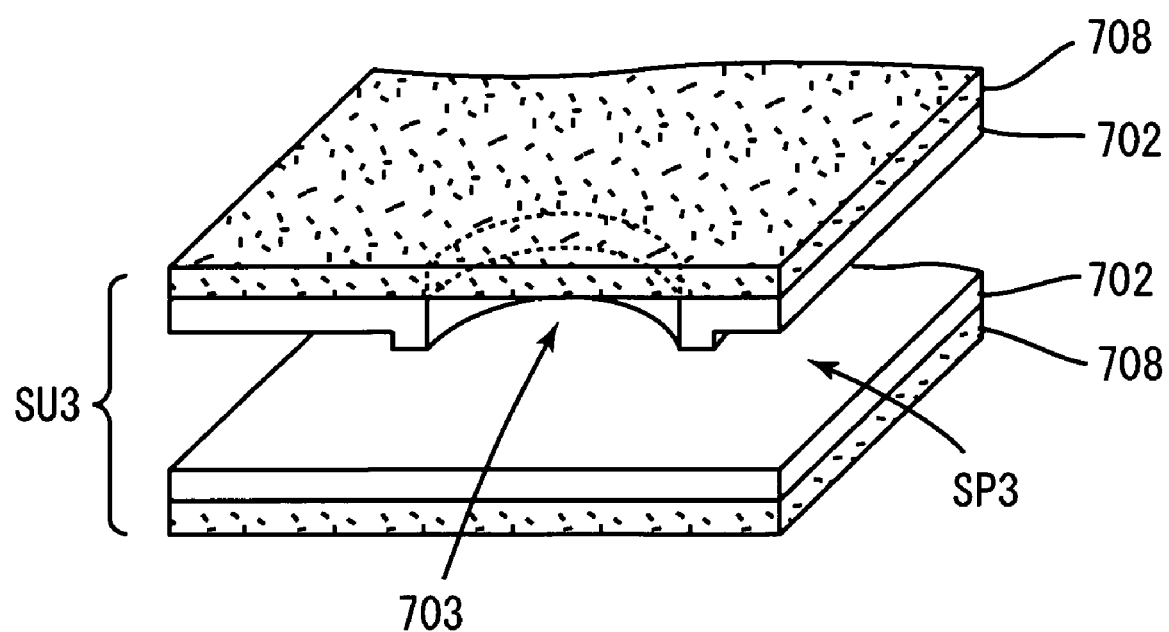
FIG. 31 is an exemplary illustration of a sectional view showing an enlarged cross-section of a sun visor main body.

The automobile sun visor SU3 shown in FIGS. 28 and 31 comprises a core material 702 formed flat with an interior space SP1, and a large number of small air holes (through holes) 703 formed in dispersed fashion in the core material 702 so as to connect the interior space SP1 to the outside. A sun visor main body 700 of the sun visor SU3 comprises the core material 702 and an air-permeable surface material 708 covering the surface of the core material 702. In addition to the sun visor main body 700, the sun visor SU3 comprises similar components 720, 610, 612 to the spindle member, plate spring, and knob provided in the sun visor SU1 described above.

The core material 702, which forms the outer shape of the sun visor, may be formed by molding a material possessing plasticity, such as a synthetic resin (for example, a thermoplastic resin). Polypropylene, polyamide, polyester, and so on may be used as the thermoplastic resin. The core material 702 is molded into a shape comprising the interior space SP1 using the plastic material. Blow molding is preferably employed to mold the core material 702 into the shape comprising the interior space, but injection molding, press molding, and so on may also be used. The core material 702 having a hollow interior is formed such that sound entering through the through holes 703 is caused to resonate in the interior space SP1.

As shown in FIG. 31, in the sun visor SU3, the air holes 703 are formed in only one of opposing core materials 702, 702 sandwiching the space SP1, and air-permeable surface materials 708, 708 are laid onto the outer surfaces of the cores 702, 702. When the sun visor main body 700 is disposed in a storage position parallel to the ceiling (the position shown by the dot-dot-dash line in FIG. 1), the sound absorption characteristic can be improved by forming the large number of air holes 703 in the side face of the core material 702 at the passenger side. Needless to say, a large number of air holes may be formed in both surfaces of the core material.

The air holes 703 can be formed in various shapes, but by making them circular or substantially circular, the physical characteristics thereof can be controlled easily, which is preferable. The diameter of the air holes 703 is preferably between 0.5 and 5.0 mm, and more preferably between 1.0 and 5.0 mm. When the diameter is no less than 0.5 mm (preferably no less than 1.0 mm), sound waves enter the air holes easily, ensuring favorable sound-absorbency, and when the diameter is no more than 5.0 mm, the passenger does not feel any surface irregularities when touching the sun visor, and good rigidity is obtained.

If the ratio of a total area Ss2 of the projected area of the air holes 703 to a projected area Ss1 of the core material 702 when projected in the thickness direction of the flatly-formed core material is referred to as an opening ratio ps=(Ss2/Ss1), then the opening ratio ps of the core material 702 is set at 2 to 30% in percentage terms. By setting the opening ratio ps between 2 and 30%, the sun visor SU1 obtains a favorable sound absorption effect while maintaining good rigidity. Note that through experiment, it was confirmed that the opening ratio is preferably no less than 2% so that the air permeability is sufficient to achieve a favorable sound absorption performance, and the opening ratio is preferably no more than 30% so that the rigidity is sufficient to maintain the shape of the core material.

Figure 32:
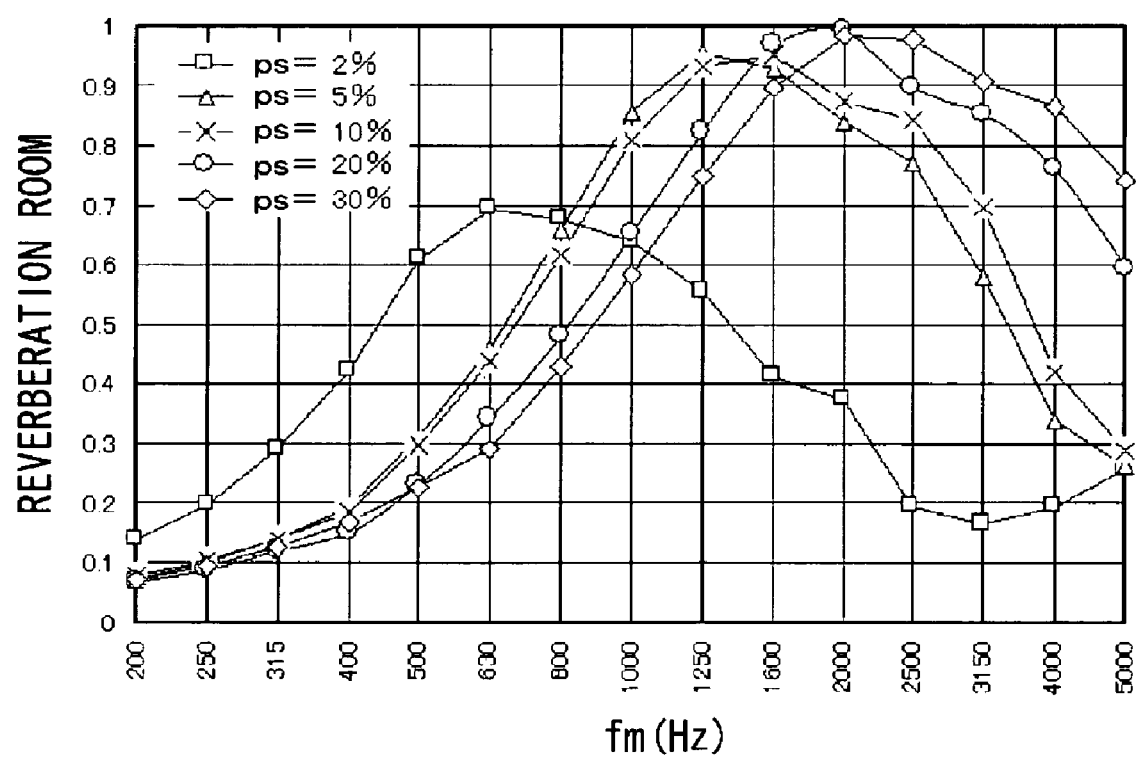
FIG. 32 is an exemplary illustration of a view showing a graph of the sound absorption characteristic when the opening ratio of the core material is varied.

FIG. 32 shows results obtained when the sound absorption coefficient in ⅓ octave frequency bandwidths was measured (measurement condition: transfer function method). The abscissa shows the central frequency fm (unit: Hz) of each ⅓ octave band, and the ordinate shows the sound absorption coefficient. As shown in the drawing, the sound absorption coefficient increases as the opening ratio ps increases, and a preferable sound absorption effect is obtained when the opening ratio is at least 2% and the sound absorption ratio relative to a maximum sound absorption ratio is at least 50%.

Figure 33:
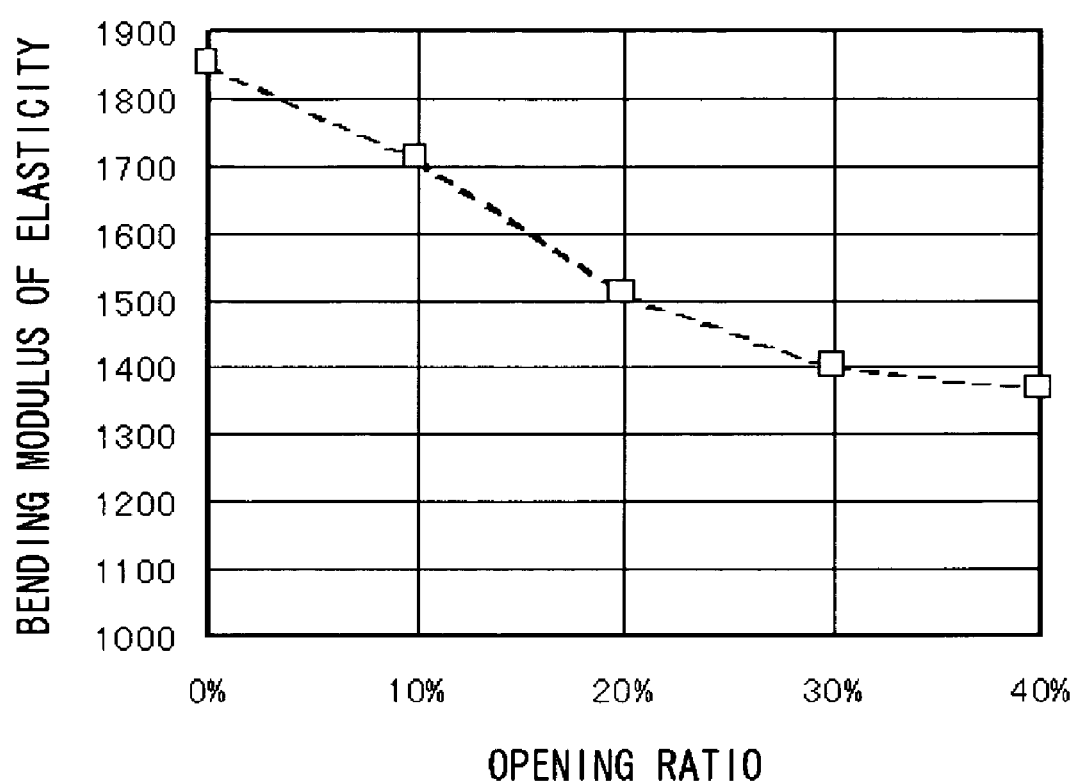
FIG. 33 is an exemplary illustration of a view showing a graph of the bending modulus of elasticity of the core material relative to the opening ratio.

FIG. 33 shows results obtained when the bending modulus of elasticity relative to the opening ratio was measured (measurement condition: three-point bending test with a distance of 50 mm between supporting points). The abscissa shows the opening ratio ps, and the ordinate shows the bending modulus of elasticity (unit: MPa) of the core material 702. As shown in the drawing, the bending modulus of elasticity decreases (the flexural rigidity decreases) as the opening ratio increases, and a favorable rigidity is obtained when the opening ratio is no more than 30% and the bending modulus of elasticity is no less than 1400 MPa. When the passenger rotates the sun visor main body 700 and the opening ratio is 30% or less, the core material 702 is unlikely to bend or deform under the stress applied from one end of the sun visor main body 700 gripped by the passenger to the tip end of a spindle 720*a* (the location which is supported by the plate spring 710) which forms the center of the rotation operation. The rigidity of the core material 702 improves as the diameter of the air holes 703 decreases, and hence the diameter of the air holes is preferably 5.0 mm or less.

The air holes 703 are preferably formed at the same time as the core material 702 is blow-molded or immediately after the core material 702 is blow-molded.

The surface material 708 covers the surface of the core material 702 so as to conceal the air holes 703, thereby improving the design quality of the sun visor. The surface material 708 may also be used as a member for adjusting the air permeability of the air holes 703.

The JIS L1096-defined air permeability of the surface material 708 is at least 2.0 cc/cm$^2$/sec (preferably at least 6.0 cc/cm$^2$/sec), and by employing a material possessing high air permeability, such as a nonwoven fabric or a knitted fabric made of polyester fiber or the like, sound waves can be made to enter the interior of the sun visor easily while providing a design quality that is suitable for the interior material of an automobile cabin. By raising the air permeability of the surface material, sound waves pass through the surface material without being reflected, and therefore enter the interior of the sun visor and are absorbed easily. Further, the air permeability of the surface material 708 is set at no more than 140.0 cc/cm$^2$/sec. In so doing, the appearance of the sun visor can be made favorable, and the sun visor is less likely to become soiled by the air passing through.

Figure 29:
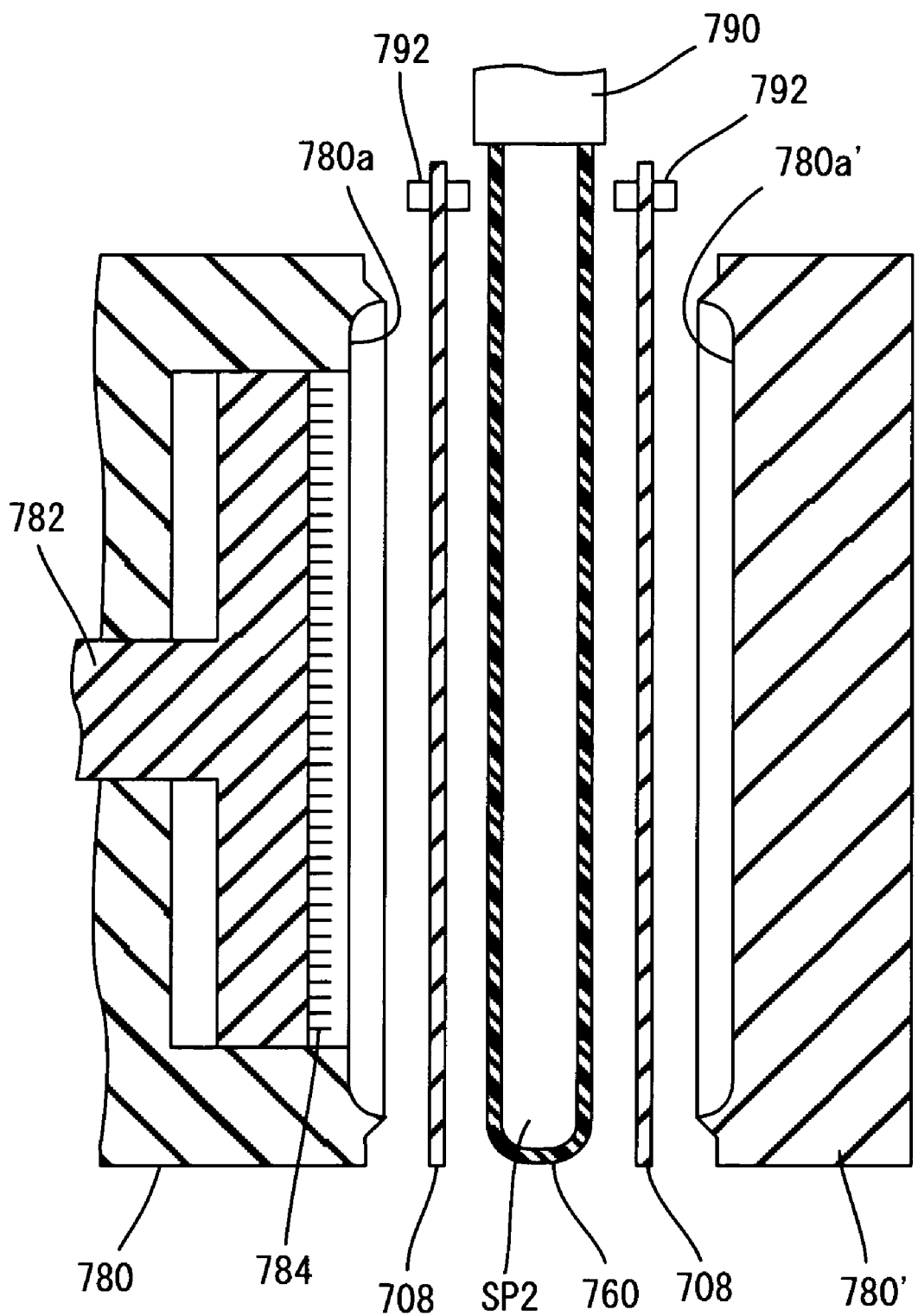
FIG. 29 is an exemplary illustration of a schematic diagram of an apparatus for manufacturing a core material covered in a surface material.
Figure 30:
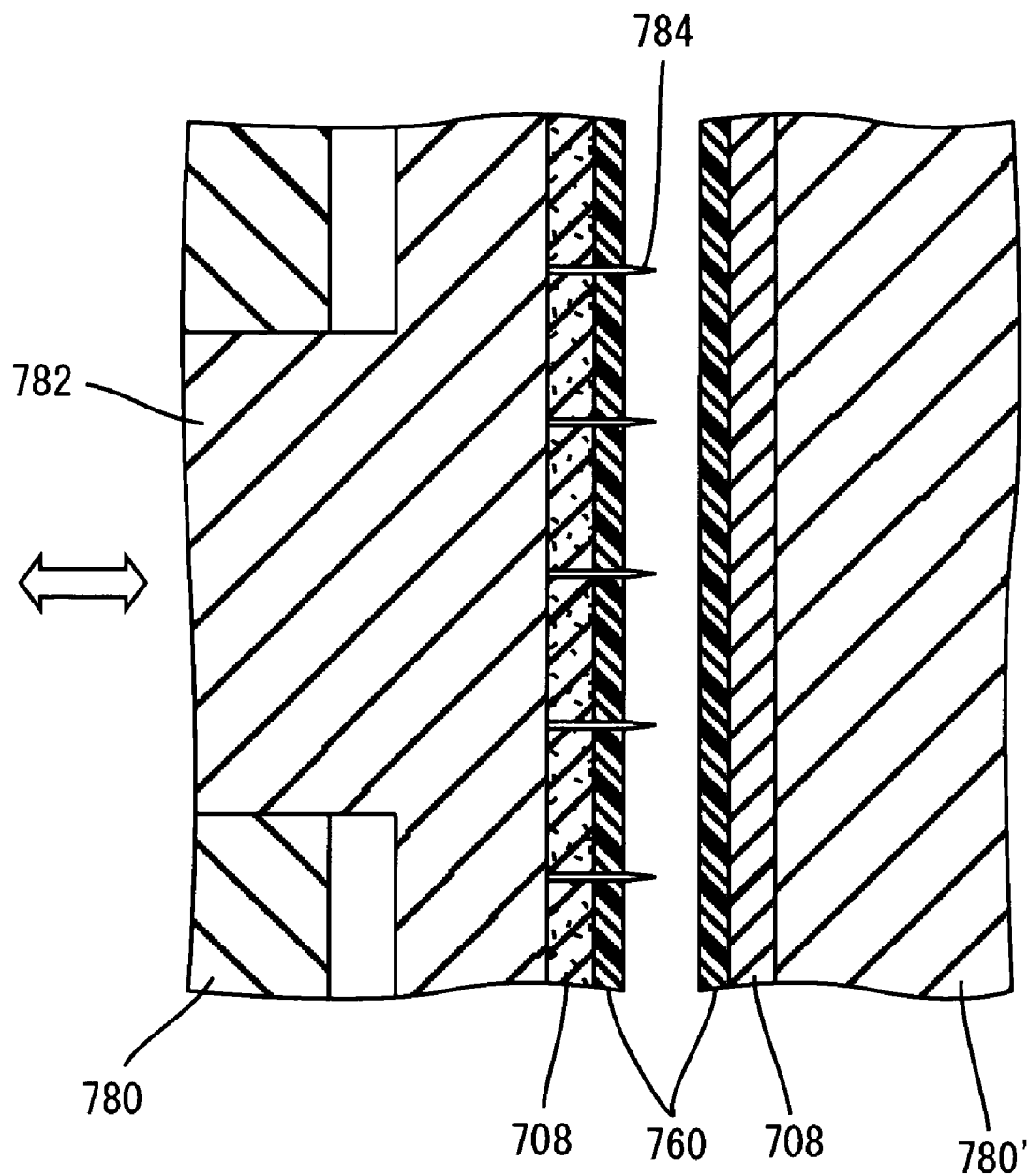
FIG. 30 is an exemplary illustration of a view showing a part of FIG. 29 in detail.

Next, a preferred method and apparatus for manufacturing the automobile sun visor SU3 will be described with reference to FIGS. 29 and 30, which show an apparatus for manufacturing a core material covered in a surface material. In this manufacturing apparatus, a pair of shaping dies 780, 780' are disposed such that die surfaces 780*a*, 780*a*' oppose each other, and so as to be capable of sliding in a horizontal direction. A circular die 790 is disposed above the pair of shaping dies 780, 780', and surface material holding mechanisms 792, 792 are disposed movably between the circular die 790 and the shaping dies 780, 780'. A sliding core 782 provided such that a large number of punching pins 784 (having a diameter of 5.0 mm, for example) faces the opposing die surface 780*a*' is attached to the shaping die 780 slidably. Note that by reducing the diameter of the punching pins, small air holes with a diameter of 0.5 to 1.0 mm can be formed in the core material.

First, the shaping dies 780, 780' are opened, and a thermoplastic resin such as polypropylene, serving as the material of the core material, is heated and plasticized. The plasticized thermoplastic resin is then pushed downward from the circular die 790 disposed above the shaping dies 780, 780' to form a flat parison 760 having an interior space SP2, and suspended between the opened shaping dies 780, 780'. The air-permeable surface materials 708, 708, constituted by an elastic fibrous material such as a needle-punched nonwoven fabric, are then disposed between the parison 760 and the die surfaces 780a, 780a' of the shaping dies so as to face the vertical direction.

Next, the shaping dies 780, 780' are closed while air is blown into the parison 760. Thus, the parison 760 is pushed against the die surfaces 780a, 780a' via the surface materials 708, 708, and as the surface materials 708, 708 are adhered to the surface of the parison 760, a visor core shape is formed.

Once the temperature of the parison has fallen to a certain extent, the sliding core 782 is caused to slide toward the opposing die surface 780a' such that the punching pins 784 protrude from the die surface 780a. As a result, the tip end of each punching pin 784 penetrates one surface of the parison 760 via the surface material 708 and enters the interior space SP2. The sliding core 782 is then withdrawn such that the punching pins 784 are pulled back from the die surface 780a. As a result, the small through holes 703 are formed in a large number in the parison 760. Here, the elastic surface material 708 is penetrated by the narrow punching pins 784, but when the punching pins 784 withdraw, the fluff of the surface material 708 regroups so as to fill the through holes, and hence the through holes 703 formed in the parison are covered by the surface material 708, thereby becoming invisible from the outside. After cooling and removal from the dies, the surface material-covered core material is obtained.

Then, by implementing surface material end processing on the surface material-covered core material and performing small finishing processes such as the addition of the spindle member 720, the plate spring 710, the knob 712, and so on, an automobile sun visor having an excellent sound absorption characteristic can be obtained easily and speedily without the need for a separate process for affixing the surface material.

Needless to say, instead of the blow molding method described above, a parison blow molding process and a surface material adhesion process may be performed separately, and the surface material may be carpeted onto the molded body removed from the dies through adhesion or deposition.

Further, a parison blow molding process and an air hole formation process may be performed separately. In this case, the air hole formation process is performed by disposing the molded body removed from the dies in an air hole-forming die to form the air holes, and then a covering process is performed for covering the core material with the surface material.

(9) MODIFIED EXAMPLES

The various sound absorbing structures for an automobile described above may be applied to a sun visor, and the various sound absorbing structures for a sun visor described above may be applied to a sound absorbing structure for an automobile. Furthermore, a different sound absorbing structure may be combined with each of the sound absorbing structures for an automobile described above, and a different sun visor structure may be combined with each of the sun visors described above. For example, the elastic cushioning body 656 of the sun visor SU2 may be used as the cushioning material 606 of the sun visor SU1, and the sun visor SU3 may further comprise the elastic cushioning body 656. Moreover, the cushioning body and surface material of the sun visors SU1, SU3 may be integrated through lamination.

In each of the embodiments described above, shock-absorbing ribs for absorbing an impact may be formed on the vehicle exterior side surface of the interior base material so that an impact is absorbed by the buckling of the ribs when an impact is generated. Ribs formed in lattice form, box form, or another form may be employed as these ribs. By providing such ribs, more impact energy is absorbed upon contact with the interior material when an impact is generated.

In each of the embodiments described above, when a tubular space is formed between the outer panel and inner panel, the space may be blocked by a shielding material in order to reduce the transmission of sound waves. As disclosed in Japanese Unexamined Patent Application Publication 2001-341592, this type of shielding material may be constituted by a foamed body having a heat foaming property and a base material which supports the peripheral edge of the foamed body. A protruding bar is formed on the peripheral edge of the base material, and a body panel sealing material supported by the foamed body is used while covering at least a part of the protruding bar. A non-foamed substance is held in a tubular space (cavity) prior to a coating process, and the non-foamed substance is foamed by heat (140 to 210° C.) necessarily applied to the body in an electrodeposition and baking finish process, whereby the volume of the foamed body increases. As a result, the tubular space can be sealed by the foamed body serving as a shielding member. Since the tubular space is blocked by the shielding member, the transmission of sound waves through the tubular space can be reduced to the greatest extent possible. Note that an olefin type foamed body raw material with a product name of SikaBaffle (grade number SB240), disclosed in Japanese Unexamined Patent Application Publication 2001-341592 and manufactured by Sika Corporation, may be used as a preferred foaming material.

According to the various aspects of the present invention described above, a sound absorbing structure which is useful for effectively reducing infiltrating sound entering the ears of a passenger while maintaining a favorable design quality and a high level of safety, thereby improving quietness while traveling and so on, can be provided.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, proximal, distal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

What is claimed is:

1. A sound absorbing structure for an automobile having a seating portion, an upper surface of which serves as a passenger seating surface in a cabin, the structure comprising:
   an interior base material provided on the cabin side of a body panel;
   the interior base material forming a side face when seen from a passenger seated on the seating portion;
   the interior base material having a recessed portion formed in the cabin side of the interior base material;
   the recessed portion of the interior base material is formed on an upper side of the seating surface; and
   a sound absorbing material buried in the recessed portion of the interior base material.

2. The sound absorbing structure for an automobile according to claim 1,
   wherein the interior base material, which forms the side face when seen from the passenger seated on the seating portion, is a member provided on at least one of a door trim interior material and a pillar garnish interior material; and
   wherein the recessed portion is formed in the cabin side of the interior base material on the upper side of the seating surface.

3. The sound absorbing structure for an automobile according to claim 1,
   wherein the sound absorbing material is a perforated sound absorbing material formed with a through hole linking the cabin side and a vehicle exterior side on an opposite side of the cabin side.

4. The sound absorbing structure for an automobile according to claim 3,
   wherein the perforated sound absorbing material is formed from at least one of a material produced by foaming a synthetic resin and a material produced by gathering synthetic fibers;
   wherein a plurality of the through holes are formed;
   wherein a thickness of the perforated sound absorbing material in a direction linking the cabin side and the vehicle exterior side is no more than a depth of the recessed portion and no less than 3 mm; and
   wherein a ratio of a total area of a projected area of the through holes to a projected area of the perforated sound absorbing material when projected from the cabin side to the vehicle exterior side is set between 2 and 30%.

5. The sound absorbing structure for an automobile according to claim 1,
   wherein the sound absorbing material is formed from at least one of a material produced by foaming a synthetic resin and a material produced by gathering synthetic fibers; and
   wherein the sound absorbing material has a density of 0.02 to 0.25 g/cm$^3$.

6. The sound absorbing structure for an automobile according to claim 1,
   wherein the sound absorbing material is formed from at least one of a material produced by foaming a synthetic resin and a material produced by gathering synthetic fibers; and
   wherein the sound absorbing material has a Shore hardness, according to a spring type hardness testing machine type C, of 10 to 70.

7. The sound absorbing structure for an automobile according to claim 1, further comprising:
   a surface material disposed on the cabin side of the interior base material so as to seal an opening portion of the recessed portion; and
   the surface material having an air permeability of no less than 2.0 cc/cm$^2$/sec.

8. A sound absorbing structure for an automobile, the structure comprising:
   an interior base material provided on a cabin side of a body panel;
   the interior base material having a recessed portion formed in the cabin side of the interior base material;
   a resonance member formed with a through hole;
   the resonance member inserted into the recessed portion from the cabin side; and
   the resonance member disposed so as to form a hollow portion in the recessed portion, in which sound entering through the through hole is caused to resonate.

9. The sound absorbing structure for an automobile according to claim 8, further comprising:
   a sound absorbing material disposed on the cabin side of the resonance member.

10. The sound absorbing structure for an automobile according to claim 8,
    wherein the recessed portion is formed in at least one of a door trim interior material and a pillar garnish interior material on an upper side of a passenger seating surface of a seat having a seating portion, an upper surface of which forms the seating surface; and
    wherein the resonance member is inserted into the recessed portion and disposed so as to form the hollow portion in the recessed portion.

11. The sound absorbing structure for an automobile according to claim 8,
    wherein the resonance member is a plate-form member made of synthetic resin and formed with the through hole.

12. The sound absorbing structure for an automobile according to claim 8,
    wherein a large number of the through holes are formed in the resonance member; and
    wherein a diameter of each through hole is between 0.5 and 5.0 mm.

13. The sound absorbing structure for an automobile according to claim 12,
    wherein a ratio of a total area of a projected area of the through holes to a projected area of the resonance member when projected from the cabin side to a vehicle exterior side is between 2 and 30%.

14. The sound absorbing structure for an automobile according to claim 8,
    wherein a thickness of the hollow portion in a direction linking the cabin side and a vehicle exterior side is between 3 and 100 mm.

* * * * *